(12) United States Patent
Casey et al.

(10) Patent No.: US 8,290,847 B2
(45) Date of Patent: Oct. 16, 2012

(54) METHODS, APPARATUS AND COMPUTER PROGRAM PRODUCTS FOR USE IN ASSOCIATION WITH JOINT VENTURES AND/OR POTENTIAL JOINT VENTURES

(75) Inventors: Kevin M. Casey, Trumbull, CT (US); Michael Gareth Scott, London (GB); Patrick M. Daley, Mahopac, NY (US); Brian John Mellen, Millbury, MA (US)

(73) Assignee: General Electric Capital Corporation, Stamford, CT (US)

( * ) Notice: Subject to any disclaimer, the term of this patent is extended or adjusted under 35 U.S.C. 154(b) by 119 days.

(21) Appl. No.: 12/031,177

(22) Filed: Feb. 14, 2008

(65) Prior Publication Data

US 2008/0201246 A1 Aug. 21, 2008

Related U.S. Application Data

(60) Provisional application No. 60/890,999, filed on Feb. 21, 2007.

(51) Int. Cl.
*G06Q 40/00* (2012.01)

(52) U.S. Cl. ............ 705/36 R; 705/35; 705/37; 705/38; 705/40

(58) Field of Classification Search .............. 705/35, 705/36 R, 37, 30, 38, 10; 706/25, 26, 41
See application file for complete search history.

(56) References Cited

U.S. PATENT DOCUMENTS

| | | | |
|---|---|---|---|
| 5,504,839 A * | 4/1996 | Mobus .......................... | 706/26 |
| 7,263,504 B2 * | 8/2007 | Galai et al. .................. | 705/36 R |
| 7,660,735 B1 * | 2/2010 | Breeden et al. .............. | 705/7.33 |
| 2003/0036989 A1 * | 2/2003 | Bhatia ......................... | 705/36 |
| 2003/0177078 A1 * | 9/2003 | Koziol et al. ................ | 705/35 |
| 2004/0002908 A1 * | 1/2004 | James .......................... | 705/35 |
| 2004/0098329 A1 * | 5/2004 | Tilton .......................... | 705/36 |
| 2004/0143530 A1 * | 7/2004 | Galai et al. .................. | 705/35 |
| 2004/0153388 A1 * | 8/2004 | Fisher et al. ................. | 705/36 |
| 2004/0177030 A1 * | 9/2004 | Shoham ....................... | 705/38 |
| 2004/0267651 A1 * | 12/2004 | Jenson et al. ................ | 705/36 |
| 2005/0004856 A1 * | 1/2005 | Brose et al. ................. | 705/35 |
| 2005/0010510 A1 * | 1/2005 | Brose et al. ................. | 705/35 |
| 2005/0209943 A1 * | 9/2005 | Ballow et al. ............... | 705/35 |

(Continued)

OTHER PUBLICATIONS

"Weingarten Realty Investors and AEW Capital Management, L.P. Form Acquisition Joint Venture." PR Newswire Dec. 19, 2002 Business Dateline, ProQuest.*

(Continued)

*Primary Examiner* — Olusegun Goyea
(74) *Attorney, Agent, or Firm* — Buckley, Maschoff & Talwalker LLC

(57) ABSTRACT

An apparatus, computer product, and a method for use in association with a joint venture are disclosed. The method including receiving information associated with a joint venture; determining an amount of a distribution based at least in part on an agreement; determining financial information for the joint venture based at least in part on the amount of the distribution; storing the financial information in a database; retrieving the financial information from the database using a processing system; providing a graphical user interface to allow a user to define a hurdle set; defining one or more hurdle sets in response to input to the graphical user interface; and determining, in the processing system, an amount of a distribution based at least in part on the financial information and one or more hurdle set.

24 Claims, 29 Drawing Sheets

U.S. PATENT DOCUMENTS

| | | | |
|---|---|---|---|
| 2005/0209945 A1* | 9/2005 | Ballow et al. | 705/35 |
| 2005/0256793 A1* | 11/2005 | Hamilton et al. | 705/35 |
| 2005/0262002 A1* | 11/2005 | Manning et al. | 705/36 |
| 2005/0273414 A1* | 12/2005 | Michaud et al. | 705/36 |
| 2006/0074786 A1* | 4/2006 | Zusy et al. | 705/35 |
| 2007/0156576 A1* | 7/2007 | Imrey et al. | 705/38 |
| 2007/0156580 A1* | 7/2007 | Imrey et al. | 705/39 |
| 2007/0156581 A1* | 7/2007 | Imrey et al. | 705/39 |
| 2007/0198378 A1* | 8/2007 | Gordon | 705/35 |
| 2008/0177672 A1* | 7/2008 | Brunner et al. | 705/36 R |
| 2008/0201246 A1* | 8/2008 | Casey et al. | 705/30 |
| 2009/0012909 A1* | 1/2009 | Shniberg et al. | 705/36 R |
| 2009/0271223 A1* | 10/2009 | Lange et al. | 705/4 |

OTHER PUBLICATIONS

"Partners Announce Development Plans for Guyana Gold Project." PR Newswire Apr. 19, 1999 Business Dateline, ProQuest.*

Kothavala, Kazbi Zareer. Financial reporting for interests in joint ventures. Diss. Stanford University, 2002. ABI/INFORM Global, ProQuest. Web. Mar. 4, 2011.*

"Weingarten Realty Investors and AEW Capital Management, L.P. Form Acquisition Joint Venture." PR Newswire Dec. 19, 2002 Business Dateline, ProQuest.*

"Partners Announce Development Plans for Guyana Gold Project." PR Newswire Apr. 19, 1999 Business Dateline, ProQuest.*

"Heritage Property Investment Trust, Inc. Forms First Acquisition Joint Venture With Intercontinental Real Estate Corporation." PR Newswire Apr. 25, 2005 Business Dateline, ProQuest. Web. Mar. 4, 2011.*

* cited by examiner

| Segment | Accounting Segment |
|---|---|
| JV Investment | Entity |
| Property | Entity |
| Account | Account Code |
| 3rd Party Segment | Owners |
| Analysis/Other | Department |

Previous Period

Financial Summary
YTD Net Income — 1,000,000
NBV — 11,125,283

| | Ptr 1 | Ptr 2 | GE Real Estate | Total |
|---|---|---|---|---|
| 554 Contributions | | | | |
| 556   Initial | 447,091.00 | 49,677.00 | 4,470,914.00 | 4,967,682 |
| 558   Additional | 554,184.11 | 61,576.01 | 5,541,841.14 | 6,157,601 |
| 560   Default | - | - | - | - |
| 562   Developer | - | - | - | - |
| 563   Cost Overrun | - | - | - | - |
| | 1,001,275 | 111,253 | 10,012,755 | 11,125,283 |
| 564 Distributions | Ptr 1 | Ptr 2 | GE Real Estate | Total |
| 566   Initial | - | - | - | - |
| 568   Additional | - | - | - | - |
| 570   Developer | - | - | - | - |
| 572   Cost Overrun | - | - | - | - |
| | - | - | - | - |
| 574 Waterfall Hurdles | Ptr 1 | Ptr 2 | GE Real Estate | Total |
| 575 Pref Return: Initial | 35,767.28 | 3,974.16 | 357,673.12 | 397,415 |
| 576 Return: Additional | 44,334.73 | 4,926.08 | 443,347.29 | 492,608 |
| o Sharing Ratio's | 921,173.45 | 102,352.61 | 9,211,734.55 | 10,235,261 |
| | 1,001,275 | 111,253 | 10,012,755 | 11,125,283 |
| 577 Investor Claim | Ptr 1 | Ptr 2 | GE Real Estate | Total |
|   | 90,000.00 | 10,000.00 | 900,000.00 | 1,000,000 |
| 578 Percentage | 9% | 1% | 90% | 100% |

Current Period

Financial Summary
Net Operating Income — 548 — 750,000
NBV — 550 — 13,500,000

| | Ptr 1 | Ptr 2 | GE Real Estate | Total | Movement 506 |
|---|---|---|---|---|---|
| 514 Contributions | | | | | 579 |
| 516   Initial | 447,091.00 | 49,677.00 | 4,470,914.00 | 4,967,682 | 580 (250,000) |
| 518   Additional | 767,908.62 | 85,323.18 | 7,679,086.20 | 8,532,318 | 581 2,374,717 |
| 520   Default | - | - | - | - | 583 - |
| 522   Developer | - | - | - | - | 584 - |
|   Cost Overrun | - | - | - | - | 585 - |
| | 1,215,000 | 135,000 | 12,150,000 | 13,500,000 | 2,374,717 |
| 524 Distributions | Ptr 1 | Ptr 2 | GE Real Estate | Total | |
| 526   Initial | - | - | - | - | 587 - |
| 528   Additional | - | - | - | - | 588 - |
| 530   Developer | - | - | - | - | 589 - |
| 532   Cost Overrun | - | - | - | - | 590 - |
| | - | - | - | - | 591 - |
| 533 Waterfall | Ptr 1 | Ptr 2 | GE Real Estate | Total | 592 |
| 534 Preferred Return: Initial | 35,767.28 | 3,974.16 | 357,673.12 | 397,415 | 593 - |
| 536 ref Return: Additional | 61,432.69 | 6,825.85 | 614,326.90 | 682,585 | 594 189,977 |
| 538 o Sharing Ratio's | 1,117,800.00 | 124,200.00 | 11,178,000.00 | 12,420,000 | 2,184,739 |
| | 1,215,000 | 135,000 | 12,150,000 | 13,500,000 | 595 2,374,717 |
| 540 Investor Claim | Ptr 1 | Ptr 2 | GE Real Estate | Total | 597 |
|   | 67,500.00 | 7,500.00 | 675,000.00 | 750,000 | (250,000) |
| 542 Percentage | 9% | 1% | 90% | 100% | 598 |

Distribution of Capital Proceeds

| Portfolio Test Not Satisfied | POOLED BASIS | y | | |
|---|---|---|---|---|
| Default Capital Contributions – Pref Return | | Prorata | | 6,298,976 |
| Default Capital Contributions | | Prorata | | 6,298,976 |
| Additional Capital Contributions – Pref Return | | Prorata | | 6,298,976 |
| Additional Capital Contributions | | Prorata | | 6,298,976 |
| Initial Capital Contributions – Pref Return | | Prorata | 398,170   98,627 | 5,802,179 |
| Initial Capital Contributions | | Prorata | 4,644,191   1,157,988 | |
| IRR @GECC 15% | | Prorata | | - |
| Special Contributions | | Prorata | | - |
| Did a Removal Event Occur? | (page 13) | N | | - |
| Developer partner (to Satisfy Portfolio test) | | | | - |
| Residual Sharing Profits | | | | ███████ |
| | | | | |
| If Portfolio Test Satisfied | | | | |
| | PROJECT BY PROJECT BASIS | | | |
| Default Capital Contributions – Pref Return | | Prorata | | - |
| Default Capital Contributions | | Prorata | | - |
| Additional Capital Contributions – Pref Return | | Prorata | | - |
| Additional Capital Contributions | | Prorata | | - |
| Initial Capital Contributions – Pref Return | | Prorata | | - |
| Initial Capital Contributions | | Prorata | | - |
| IRR @GECC 15% | | Prorata | | - |
| Did a Removal Event Occur? | (page 13) | N | | - |
| Residual Sharing Profits | | | 5,042,361   1,256,615 | 6,298,976 |

FIG. 5B

Owner Details

- Owner Details: GERE0001  ☑ Active Flag (808)
- Type: Investor (806)
- Name: GERE (802)
- Description: GE Commercial Real Estate (804)

Member (902)

- Entity/Code: XXXX (908)
- Member: GECC (912)

Hurdle Rate Configuration

| Hurdle Type | | Percent | Compound |
|---|---|---|---|
| ☑ Initial Capital Contributions | | 9% | Quarter |
| ☑ Additional Capital Contributions | 24 | 10% | Quarter |
| ☑ Default Capital Contributions | 34 | 18% | Quarter |
| ☐ Cost Overrun Contributions | 44 | 0% | Quarter |
| ☐ Developer Priority Contributions | 54 | 0% | Quarter |
| ☐ ???????? Contributions | 64 | 0% | Quarter |

Hurdle Configuration — *1002*

Name *1008* [Initial Capital Contributions] *1016* ☑ Active Flag

Description *1012* [Initial Capital Contributions made by joint venture members]

Distribution — *1004*

Debit *1020* [WF-Return on ICC Contributions ▼]

Credit [WF-Return on ICC Contributions ▼] *1022*

Compound [WF-Return on ICC Contributions ▼]

*1024*

Hurdle Configuration — *1006*

*1028* [Actuals] [Budget & Forecast] *1032*

From Account | To Account
*1036*
[ICC ▼] | [ICC ▼] *1040*
[ICC- Pref Compounded ▼] | [ICC- Pref Compounded ▼] *1048*
[ICC- Pref Returns Paid ▼] | [ICC- Pref Returns Paid ▼] *1056*

Hurdle Set Configuration — 1202, 1214

Entity Code 1208 [J12345]  ☑ Active Flag
Name 1212 [Venture XYZ]

[Copy From Entity] 1282  [Copy From Template] 1284  1230

Hurdle Sequence — 1216, 1220, 1224

| SEQ | Type | Hurdle | Claim Priority |
|---|---|---|---|
| 10 | Hurdle | ICC Pref Return | Prorata |
| 20 | Hurdle | DCC Pref Return | Prorata |
| 30 | Hurdle | To GE IRR | Specific Order |
| 40 | Hurdle | Residual Sharing Ratio | Prorata |

Investors Claim Priority — 1302, 1312

| SEQ | Type | Hurdle |
|---|---|---|
| 30 | Hurdle | To GE IRR |

1316, 1308

Order — 1324, 1320

| SEQ | Member |
|---|---|
| 10 | GE Real Estate |
| 20 | Member A |

METHODS, APPARATUS AND COMPUTER PROGRAM PRODUCTS FOR USE IN ASSOCIATION WITH JOINT VENTURES AND/OR POTENTIAL JOINT VENTURES

CROSS-REFERENCE TO RELATED APPLICATION

This application claims priority to U.S. Provisional Patent Application No. 60/890,999, entitled "METHODS AND APPARATUS FOR USE IN ASSOCIATION WITH INVESTMENTS AND/OR POTENTIAL INVESTMENTS" filed on Feb. 21, 2007, which is hereby incorporated by reference herein.

FIELD

The present invention relates to methods and apparatus for use in association with joint ventures and/or potential joint ventures.

BACKGROUND

Two or more entities may enter into an agreement for a joint venture. The agreement may include terms that specify how to determine amounts to be distributed to each of the entities on a distribution date.

A spreadsheet may be generated and used to determine the amounts to be distributed to each of the entities on the distribution date. The results may thereafter be entered into another spreadsheet, which in turn may be used to determine amounts to be distributed to each of the entities on a subsequent distribution date. This method may be repeated, until all of the assets and/or liabilities of the joint venture have been distributed as specified in the agreement.

Notwithstanding the availability of the above method, additional methods, apparatus and/or computer program products for use in association with joint ventures and/or potential joint ventures are desired.

SUMMARY

In accordance with some aspects, methods, apparatus and/or computer program products are provided for use in association with joint ventures and/or potential joint ventures.

In one aspect, a method includes: receiving information associated with a joint venture; determining an amount of a distribution based at least in part on the information; determining financial information for the joint venture based at least in part on the amount of the distribution; storing the financial information in a database; retrieving the financial information from the database using a processing system; and determining, in the processing system, an amount of a distribution based at least in part on the financial information.

In one aspect, apparatus includes a processing system to receive information associated with a joint venture, determine an amount of a distribution based at least in part on the information; determine financial information for the joint venture based at least in part on the amount of the distribution; store the financial information in a database, retrieve the financial information from the database, and determine an amount of a distribution based at least in part on the financial information.

In one aspect, a computer program product includes: a storage medium having stored thereon instructions that if executed by a machine, result in the following: receiving information associated with a joint venture; determining an amount of a distribution based at least in part on the information; determining financial information for the joint venture based at least in part on the amount of the distribution; storing the financial information in a database; retrieving the financial information from the database using a processing system; and determining, in the processing system, an amount of a distribution based at least in part on the financial information.

In one aspect, apparatus includes: means for receiving information associated with a joint venture; means for determining an amount of a distribution based at least in part on the information; means for determining financial information for the joint venture based at least in part on the amount of the distribution; means for storing the financial information in a database; means for retrieving the financial information from the database using a processing system; and means for determining, in the processing system, an amount of a distribution based at least in part on the financial information.

Although various features, attributes and/or advantages may be described herein and/or may be apparent in light of the description herein, it should be understood that unless stated otherwise, such features, attributes and/or advantages are not required and need not be present in all aspects and/or embodiments.

BRIEF DESCRIPTION OF THE DRAWINGS

FIG. 3D is a schematic diagram of a database, in accordance with some embodiments.

FIG. 5A is a schematic representation of a report, in accordance with some embodiments.

FIG. 5B is a schematic representation of a report, in accordance with some embodiments.

FIG. 8 is a schematic diagram of a window that provides a view in a graphical user interface, in accordance with some embodiments.

FIG. 9 is a schematic diagram of a window that provides a view in a graphical user interface, in accordance with some embodiments.

FIG. 10 is a schematic diagram of a window that provides a view in a graphical user interface, in accordance with some embodiments.

FIG. 12 is a schematic diagram of a window that provides a view in a graphical user interface, in accordance with some embodiments.

FIG. 13 is a schematic diagram of a window that provides a view in a graphical user interface, in accordance with some embodiments.

DETAILED DESCRIPTION

In accordance with some aspects, methods, apparatus and/or computer program products are provided for use in association with joint ventures and/or potential joint ventures.

Hereinafter, and unless states otherwise, the term joint venture includes a joint venture and/or a potential joint venture. In addition, and unless stated otherwise, information associated with a joint venture may include, but is not limited to, performance information, budget information, and/or forecast information.

Figure 1A:
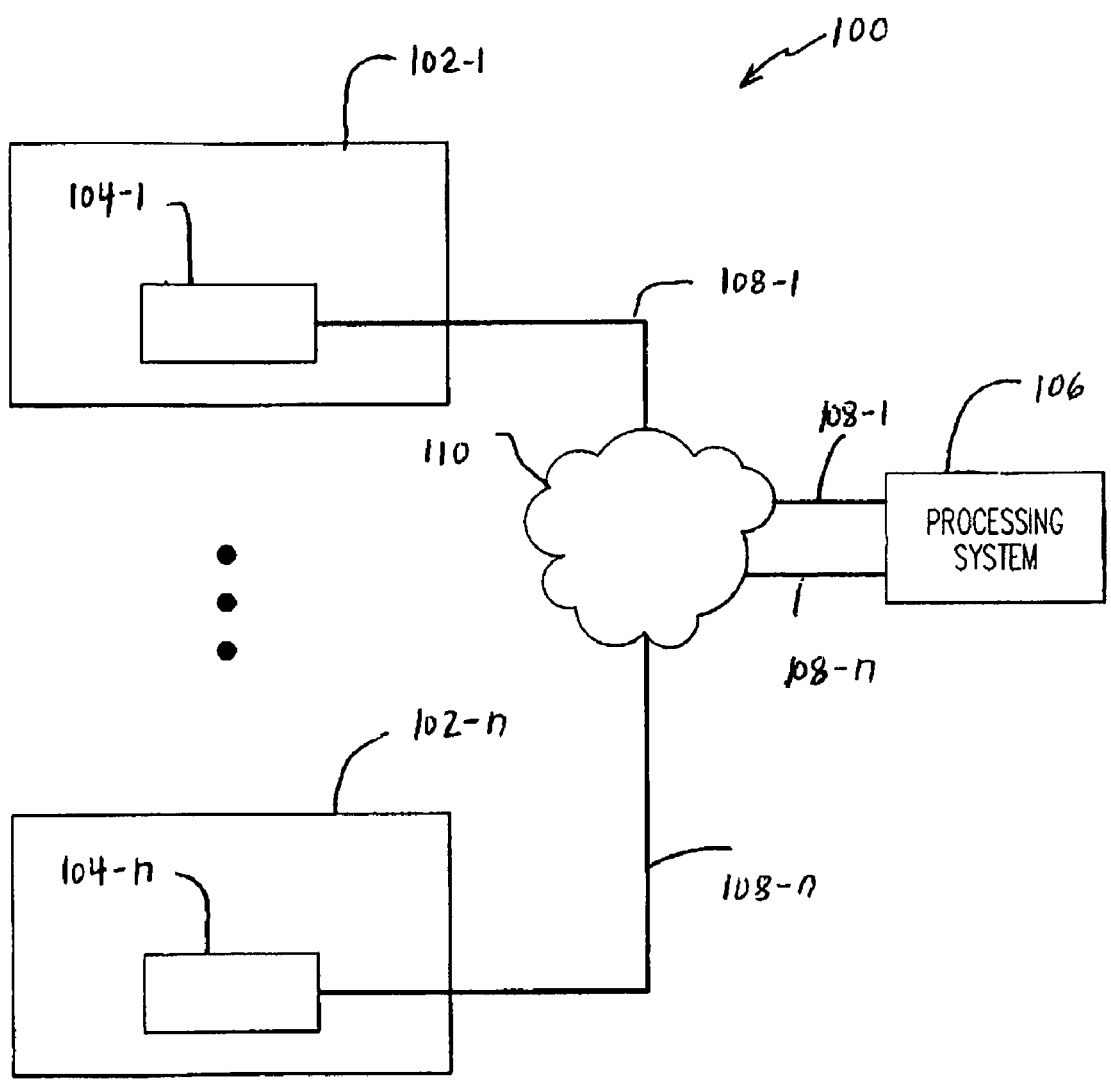
FIG. 1A is a block diagram of system, in accordance with some embodiments.

FIG. 1A is a block diagram of a system 100 for use in association with one or more joint ventures. In some embodiments, one or more of the joint ventures may involve real property and/or real estate.

Referring to FIG. 1A, in accordance with some embodiments, the system 100 may serve one or more entities 102-1 to 102-n. As used herein, an entity may be any type of entity, including but not limited to, a company or a person. A company may be public or private, incorporated or unincorporated and/or any other type of company. If a company is a public company, such company may have issued publicly traded shares of common stock. In some embodiments, an entity may comprise a lending institution and/or any other type of financial institution. In some embodiments, the financial institution may be an institution that is regulated by one or more authorities (e.g., an authority that regulates finance and/or securities).

In some embodiments, the entities 102-1 to 102-n comprise only one or two entities. In some other embodiments, the entities 102-1 to 102-n comprise tens, hundreds, or even thousands of entities.

The one or more entities 102-1 to 102-n may have access to one or more computers 104-1 to 104-n, respectively. In some embodiments, one or more of the computers 104-1 to 104-n comprises a conventional personal computer.

The computers 104-1 to 104-n may be coupled to the processing system 106 by communication links 108-1 to 108-n, respectively. One or more portions of the communication links 108-1 to 108-n may be provided by one or more portions of a network 110.

In some embodiments, one or more of computers 104-1 to 104-n sends data to and/or receives data from the processing system 106 via the respective one of communication links 108-1 to 108-n. In some embodiments, one or more of the computers 104-1 to 104-n may include browser software, a display screen and a mouse or other pointing device (none of which is separately shown) to allow the computers 104-1 to 104-n to interact as client devices with screen display pages downloaded from the processing system 106.

As used herein, a processing system may be any type of processing system. For example, a processing system may be programmable or non programmable, digital or analog, general purpose or special purpose, dedicated or non dedicated, distributed or non distributed, shared or not shared, and/or any combination thereof. A processing system may employ continuous signals, periodically sampled signals, and/or any combination thereof. If the processing system has two or more distributed portions, the two or more portions may communicate with one another through a communication link. A processor system may include, for example, but is not limited to, hardware, software, firmware, and/or any combination thereof. Hardware may include, but is not limited to off the shelf integrated circuits, custom integrated circuits and/or any combination thereof. Software may include, but is not limited to, instructions that are storable and/or stored on a computer readable medium, such as, for example, punch cards, paper tape, magnetic or optical disk, magnetic or optical tape, CD-ROM, DVD, RAM, EPROM, or ROM.

A processing system may comprise one or more processors. Unless stated otherwise, a processor may comprise any type of processor. For example, a processor may be programmable or non programmable, general purpose or special purpose, dedicated or non dedicated, distributed or non distributed, shared or not shared, and/or any combination thereof. If the processor has two or more distributed portions, the two or more portions may communicate with one another through a communication link. A processor may include, for example, but is not limited to, hardware, software, firmware, hardwired circuits and/or any combination thereof.

Unless stated otherwise, a communication link may comprise any type of communication link, for example, but not limited to wired (e.g., conductors, fiber optic cables) or wireless (e.g., acoustic links, electromagnetic links or any combination thereof including, for example, but not limited to microwave links, satellite links, infrared links), and/or any combinations thereof. A communication link may be public or private, dedicated and/or shared (e.g., a network) and/or any combination thereof. A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

In some embodiments, one, some or all of the entities 102-1 to 102-n comprise a party to one or more joint ventures. An entity that is a party to a joint venture is sometimes referred to herein as a member, owner and/or partner.

A joint venture may be defined by an agreement. The agreement may include terms that obligate one or more of the members to contribute capital, sometimes referred to herein as a capital contribution. In some embodiments, a capital contribution comprises an initial capital contribution, an additional capital contribution and/or a default capital contribution. Initial capital contributions may be used to cover one or more initial costs of a joint venture. In some embodiments, an additional capital contribution is made by one or more of the members. In the event that a member does not make a required capital contribution, one or more of the other members may make a capital contribution, sometimes referred to as a default capital contribution, in the amount of the shortfall.

The agreement may further include terms that specify how to distribute a distributable portion of the total capital within a joint venture. Such terms are sometimes referred to herein as distribution plan. The distribution plan may specify that one or more portions of the net cash flow of the joint venture is to be distributed on one or more distribution dates, e.g., quarterly. The distribution plan may further specify how the one or more portions of the net cash flow are to be distributed between the entities.

In some embodiments, a distribution plan for a joint venture having two members may specify that the net cash flow for any particular period shall be subject to distribution to members in the order of priority defined by paragraphs (1) through (8) set forth below:

(1) first, to the Members in proportion to and in payment of their Default Preferred Returns until their Default Capital Contribution Preferred Return Balances have been reduced to zero;

(2) next, to the Members in proportion to and in return of their Default Capital Contributions until their Default Capital Contribution Balances have been reduced to zero;

(3) next, to the Members in proportion to and in payment of their Preferred Returns on their Additional Capital Contributions until their Additional Capital Contribution Preferred Return Balances have been reduced to zero;

(4) next, to the Members in proportion to and in return of their Additional Capital Contributions until their Additional Capital Contribution Balances have been reduced to zero;

(5) next, to the Members in proportion to and in payment of their Preferred Returns on their Initial Capital Contributions until their Initial Capital Contribution Preferred Return Balances have been reduced to zero;

(6) next, to GECC Member in return of its Initial Capital Contribution until its Initial Capital Contribution Balance has been reduced to zero;

(7) next, to the Developer Member in return of its Initial Capital Contribution, including the Deemed Contribution Amount, until its Initial Capital Contribution Balance has been reduced to zero; and (8) finally, to the Members in accordance with their Residual Sharing Ratios.

Paragraph (1) specifies that the net cash flow is first used to pay the members interest on any default capital contributions that have been made by the members, where the amount of interest paid to each member is proportional to the amount of the default capital contribution made by the member and for which the member has not yet been paid back.

Paragraph (2) specifies that after all the interest has been paid on the default capital contributions, any remaining net cash flow is next used to pay back any default capital contributions that have been made by the members, where the amount of default capital contributions paid back to each member is proportional to the amount of the default capital contribution made by the member and for which the member has not yet been paid back.

Paragraph (3) specifies that after all the default capital contributions have been paid back, any remaining net cash flow is next used to pay the members interest on any additional capital contributions that have been made by the members, where the amount of interest paid to each member is proportional to the amount of the additional capital contribution made by the member and for which the member has not yet been paid back.

Paragraph (4) specifies that after all the interest has been paid on the additional capital contributions, any remaining net cash flow is next used to pay back any additional capital contributions that have been made by the members, where the amount of additional capital contributions paid back to each member is proportional to the amount of the additional capital contribution made by the member and for which the member has not yet been paid back.

Paragraph (5) specifies that after all the additional capital contributions have been paid back, any remaining net cash flow is next used to pay the members interest on any initial capital contributions that have been made by the members, where the amount of interest paid to each member is proportional to the amount of the initial capital contribution made by the member and for which the member has not yet been paid back.

Paragraph (6) specifies that after all the interest has been paid on the initial capital contributions, any remaining net cash flow is next used to pay back a first member for any initial capital contributions made by the first member and for which the first member has not yet been paid back.

Paragraph (7) specifies that after the first member has been paid back for the initial capital contribution of the first member, any remaining net cash flow is next used to pay back a second member for any initial capital contributions made by the second member and for which the second member has not yet been paid back.

Paragraph (8) specifies that after the members have been paid back for the initial capital contribution of the members, any remaining net cash flow (i.e., profit) is next used to pay profit to the members, where the amount of profit paid to each member is proportional to the residual sharing ratios of the members.

A distribution plan is not limited to the distribution plan set forth above. Some distribution plans include fewer or more than the distribution plan set forth above. Numerous types of distribution plans may exist. Many distribution plans may be complex and/or unique to a specific joint venture. Some distribution plans specify that an internal rate of return will be paid to one or more of the members, before any residual sharing. In some distribution plans, one of the members has residual sharing ratio that is higher than a residual sharing ration of one or more other members.

In some embodiments, a distribution may be a pro rata distribution, a priority distribution, or a percentage split distribution. A pro-rata distribution may be distributed between the entities based upon each entity's interest in the joint venture as a percentage of the total interest, by interest or contribution type. For example, if a first entity has a fifty percent interest, a second entity has a second interest and a third entity has a twenty percent interest, then fifty percent of the distribution may be to the first entity, thirty percent of the distribution may be to the second entity and twenty percent of the distribution may be to the third entity. Applying a distribution of Initial Capital Contributions Preferred Returns, on a Pro-rata basis, would apply the calculated preferred return (interest) based upon the total Initial Contributions of each member as a percentage of the total initial capital contributions in the joint venture. If the "Residual Distributable Capital" balance, at the point of distribution is less than the computed claim, the calculation is based upon the remaining "Residual Distributable Capital" as a percentage (pro-rata) of each members total Initial Capital Contributions.

In a priority distribution, one or more entities of the joint venture may take priority in the distribution on a hurdle by hurdle basis. For example, if a first entity has priority of default capital contributions over all other entities, with other entities thereafter allocated on a pro-rata basis, then initially the first entity's preferred return is taken. The residual distributable capital declines and the remainder is used to compute the other entities' claim on a pro-rata basis. If a member has priority of Default Capital Contributions over all other members, with other members thereafter allocated on a pro-rata basis, then initially, the member's preferred return is taken, "Residual Distributable Capital" declines, the remainder is used to compute the other members claim on a pro-rata basis. Note that a complete sequence may be applied for all partners in the joint venture.

A percentage split distribution may be a direct percentage split of equity for one, some or all entities. For example, in a percentage split based distribution, a first entity may take seventy percent of the residual distributable capital at the hurdle and the other entity or entities may take the remaining thirty percent. Some embodiments apply a percentage of "Residual Distributable Capital" at the hurdle, by member, as a percentage of other types of capital contribution. An example of this approach applies a percentage, by member, as a claim of "Residual Distributable Capital", e.g. one member taking 70% whilst other member(s) taking the remaining 30%.

Thresholds may be applied in lieu of and/or in addition to one or more of the above priorities. Thresholds may be applied to any type of investment contribution, distribution and/or returns. For example, a common threshold may be defined as, Split first member 70%, other member 30% until first member IRR. In this case, the "Residual Distributable Capital" is shared on a 70/30% basis until the "Residual Distributable Capital" is reduced to a threshold of amount of computed first member's IRR on current "Residual Distributable Capital".

In some embodiments, a threshold is applied before another calculation. For example if the "Residual Distributable Capital" balance were $1 MM at hurdle step 4; and a threshold calculation applied, for example a fixed value of $250K, then the actual amount of declining balance, to be used in the investors claim for step 4, is the result of $1 MM-$250K. The claim calculation may then be performed on the remaining $750K.

In some embodiments, the amount that a member receives (or is obligated to pay) is called the "investor's claim" on the joint venture's book value. The difference between this amount at the end of the period and the "investor's claim" at the beginning of the period represents the investor's share of the joint venture earnings or losses for the period. The difference excludes the effects of any capital contributions or investments the investor had made during the period and any distributions it had received during the period.

In some embodiments, the amount that a member receives (or is obligated to pay) is called the "investor's claim" on the joint venture's book value. The difference between this amount at the end of the period and the "investor's claim" at the beginning of the period represents the investor's share of the joint venture earnings or losses for the period. The difference excludes the effects of any capital contributions or investments the investor had made during the period and any distributions it had received during the period.

As further described below, some distribution plans may also include a portfolio test.

In addition, under some agreements, members may share the depreciation and amortization expense.

A process to determine a distributable portion of the total capital within a joint venture is sometimes referred to herein as a waterfall or waterfall process. A step within such a process is sometimes referred to herein as a hurdle, or waterfall hurdle. A group of waterfall hurdles is sometimes referred to herein as a hurdle set or waterfall hurdle set.

In some embodiments, a hurdle set comprises a combination of hurdles, in a contractual sequence that forms the entirety of a waterfall process. For example, a waterfall process having a single combination of hurdles may be used to carry out the distribution plan set forth above in paragraphs (1)-(8). Such a waterfall may include eight hurdles that carry out the distribution set forth in the eight paragraphs (1)-(8), respectively. In some other embodiments, there may be multiple hurdle sets for a contract, partnership or property.

In some embodiments, a waterfall may use a sequence of hurdles and a declining total distributable capital balance approach, in that, for each hurdle or step within the waterfall agreement, the total distributable capital balance of the joint venture (or property where applicable) reduces by the amount, shared between members, of the previous hurdle.

In some embodiments, a waterfall is used to determine the distribution of net available cash to the joint venture partners. Such a waterfall may be run on a quarterly basis and may distribute net available cash after consideration of future expenditures and debt payments. In some embodiments, such a waterfall is performed primarily by asset managers.

In some embodiments, a waterfall may be used to determine capital distributions. In some embodiments, such a waterfall may be used when assets are sold or when hypothetical liquidated book value (HLBV) is used to determine the partners' distribution amount of net income. HLBV differs from the conventional income statement approach whereby an investor applies its "percentage ownership interest" to the JV's GAAP net income to determine the investor's share of earnings or losses. HLBV takes into account all forms of financial interest GE/Partners have with respect to the JV; including common stock, preferred stock, partnership interests, debt securities, loans, advances, notes receivable and other obligations. Under HLBV, members of the investment determine their share of the JV's earnings or losses for a period by answering the following question: How much better (or worse) off are the investors at the end of the period than they were at the beginning, taking into consideration only those transactions and other events the JV recognizes under GAAP? In some embodiments, members calculate the amount it would receive (or be obligated to pay) if the joint venture (JV) had liquidated all of its assets at recorded GAAP? amounts and distributed the resulting cash to its creditors and investors in accordance with their respective priorities, including amounts distributed to investors to satisfy any loans, receivables or preferred securities they hold.

In some embodiments, a waterfall may have a differing subset of hurdles depending on whether the agreement has a portfolio test. There are two common types of portfolio tests: remaining project and member value. The remaining project test implies that there has to be at least n number of projects (properties) left within the joint venture to have calculate distributions on a project basis. The member value test implies that all members of the joint venture must have a specific value or interest within the investment at the time of proposed distribution of proceeds. An example may be; that each member's interest in the joint venture must be greater than 115% of the sum of their unreturned capital contributions. In some embodiments, the results of the above tests may determine whether the waterfall in performed on a pooled or project basis and may be subject to different waterfall hurdles.

In accordance with some embodiments, the processing system 106 may be used to determine one or more distributions for a joint venture.

Figure 1B:
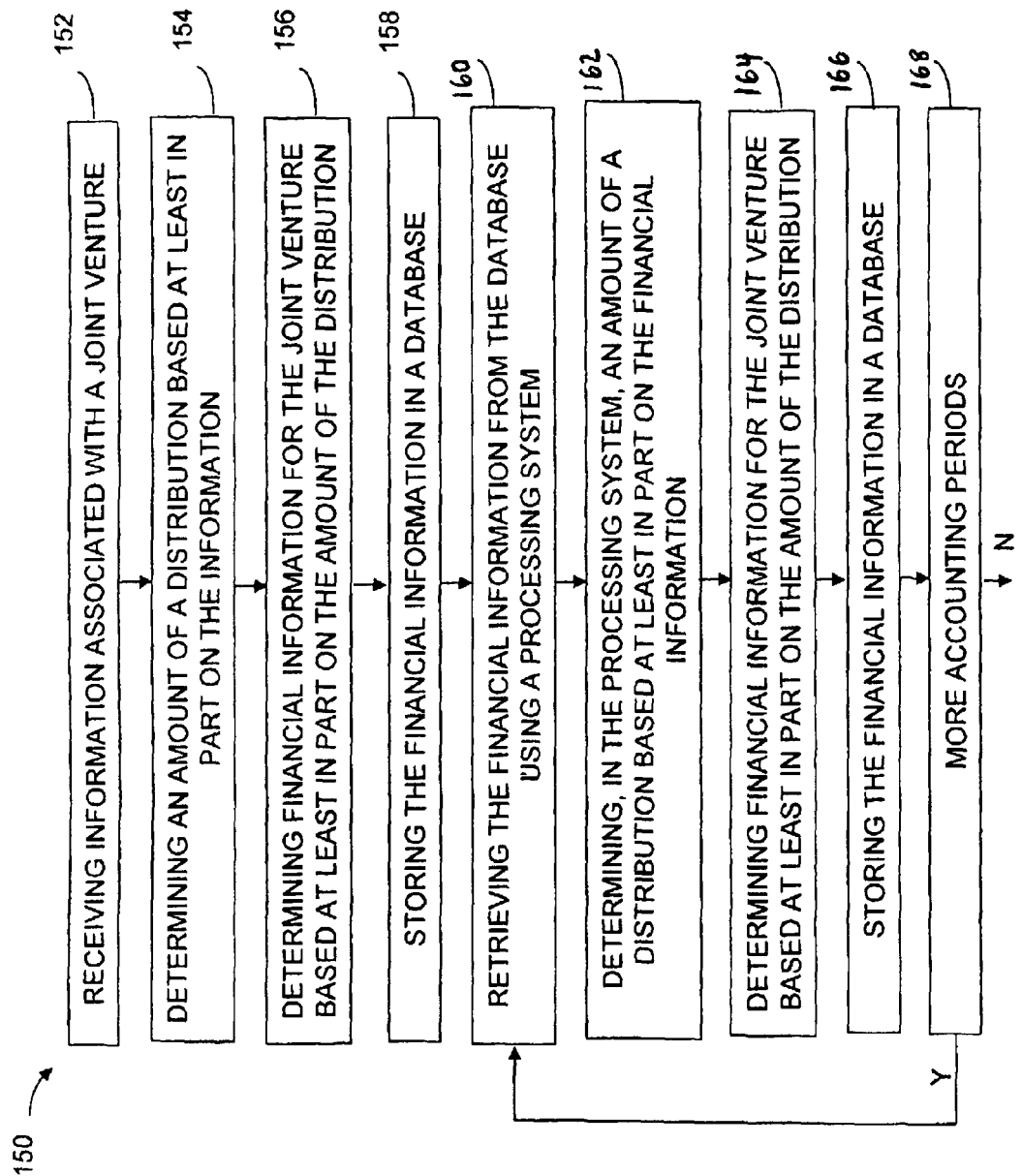
FIG. 1B is a flow chart of a method, in accordance with some embodiments.

FIG. 1B is a flow chart of a method 150 according to some embodiments. In some embodiments, one or more portions of the method 150 may be performed by one or more portions of one or more embodiments of the processing system 106 (FIG. 1A).

Referring to FIG. 1B, at 152, the method may include receiving information associated with a joint venture. In some embodiments, the information includes information indicative of one or more terms of the joint venture. In some embodiments, the information includes information indicative of a performance of the joint venture. The information may be received from any source(s). In some embodiments, one or more portions of the information are supplied via a graphical user interface.

At 154, the method may further include determining an amount of a distribution based at least in part on the information. In some embodiments, this includes determining an amount of interest based at least in part on a capital contribution to the joint venture. In some embodiments, the amount of the distribution comprises an amount of a distribution to be made to a member of the joint venture. In some embodiments, the information comprises information indicative of financial performance of the joint venture for an accounting period. Some embodiments may include determining the amount of the distribution based at least in part on the information indicative of financial performance of the joint venture for the accounting period.

At 156, the method may further include determining financial information for the joint venture based at least in part on the amount of the distribution. This may comprise determining an amount of a capital contribution to the joint venture based at least in part on the amount of the distribution.

At 158, the method may further include storing the financial information in a database. In some embodiments this includes storing a posting for a ledger in the database. In some embodiments, the posting for the ledger comprises a posting for a general ledger.

At 160, the method may further include retrieving the financial information from the database using a processing system.

At 162, the method may further include determining, in the processing system, an amount of a distribution for a subsequent period of the joint venture, based at least in part on the financial information. In some embodiments, this includes determining an amount of interest based at least in part on a capital contribution to the joint venture. In some embodiments, the amount of the distribution comprises an amount of a distribution to be made to a member of the joint venture.

At 164, the method may further include determining financial information for the joint venture based at least in part on the amount of the distribution. This may comprise determining an amount of a capital contribution to the joint venture based at least in part on the amount of the distribution.

At 166, the method may further include storing the financial information in a database. This may include storing a posting for a ledger in the database. In some embodiments, the posting for the ledger comprises a posting for a general ledger.

At 168, the method may further include determining whether there are any more accounting periods, and if so, at 160, the method may further include retrieving the financial information from the database using a processing system.

The method may include repeating one or more portions of 160-168 until there are no further accounting periods.

The method 150 is not limited to the order shown in the flow chart. Rather, embodiments of the method 150 may be performed in any order that is practicable. For that matter, unless stated otherwise, any method disclosed herein may be performed in any order that is practicable. In addition, unless stated otherwise, the method 150 may be performed in any manner. In that regard, in some embodiments, one or more portions of the method 150 may be performed by a processing system. In some embodiments, one or more portions of one or more methods disclosed herein may be performed by a processing system such as the processing system 106 (FIG. 1A). Notably, some embodiments may employ one or more portions of the method without one or more other portions of the method.

In some embodiments, the method may help reduce the need for manual processes such as those employed when waterfall calculations are completed using customized spreadsheets and calculations.

In some embodiments, information received by the processing system 106 includes information indicative of members and/or capital contributions made by such members. In some embodiments, the capital contributions may comprise initial capital contributions, additional capital contributions, default capital contributions, developer capital contributions, special capital contributions and/or any other type of capital contributions.

The information received by the processing system may further include information indicative of a preferred rate of return for initial capital contributions, a preferred rate of return for additional capital contributions, a preferred rate of return for deferred capital contributions and/or preferred rates of return for any other type of capital contributions, internal rate of return rates (IRR rates), sharing ratios, residual sharing ratios and/or number of days in fiscal year.

The information received by the processing system 106 may further include financial information for the one or more joint ventures. In some embodiments, the financial information is in the form of financial statements for the one or more joint ventures.

In some embodiments, the information received by the processing system includes information indicative of net operating income, sale, proceeds of sales, depreciation, amortization and/or cost of sales.

In some embodiments, the financial information includes one or more chart of accounts, one or more ledger balances and/or one or more transactions. In some embodiments, the one or more balances and/or one or more transactions comprise one or more general ledger balances and/or one or more general ledger transactions, respectively.

In some embodiments, the processing system may further receive information indicative of distributions associated with the one or more joint ventures. In some embodiments, such information may include information indicative of excess cash flow and/or capital proceeds.

The information may be received from any source(s). In some embodiments, one or more portions of the information is received from one or more of the entities 102-1 to 102-n.

In some embodiments, the processing system 106 generates information indicative of derived shares for one, some or all members, distributions, depreciation, other comprehensive income, accrued prefer return balances and/or joint venture ownership (investor claim) percentages. In some embodiments, the processing system 106 generates one or more waterfall journal entries, one or more waterfall reports and/or one or more waterfall reports approval.

Figure 2:
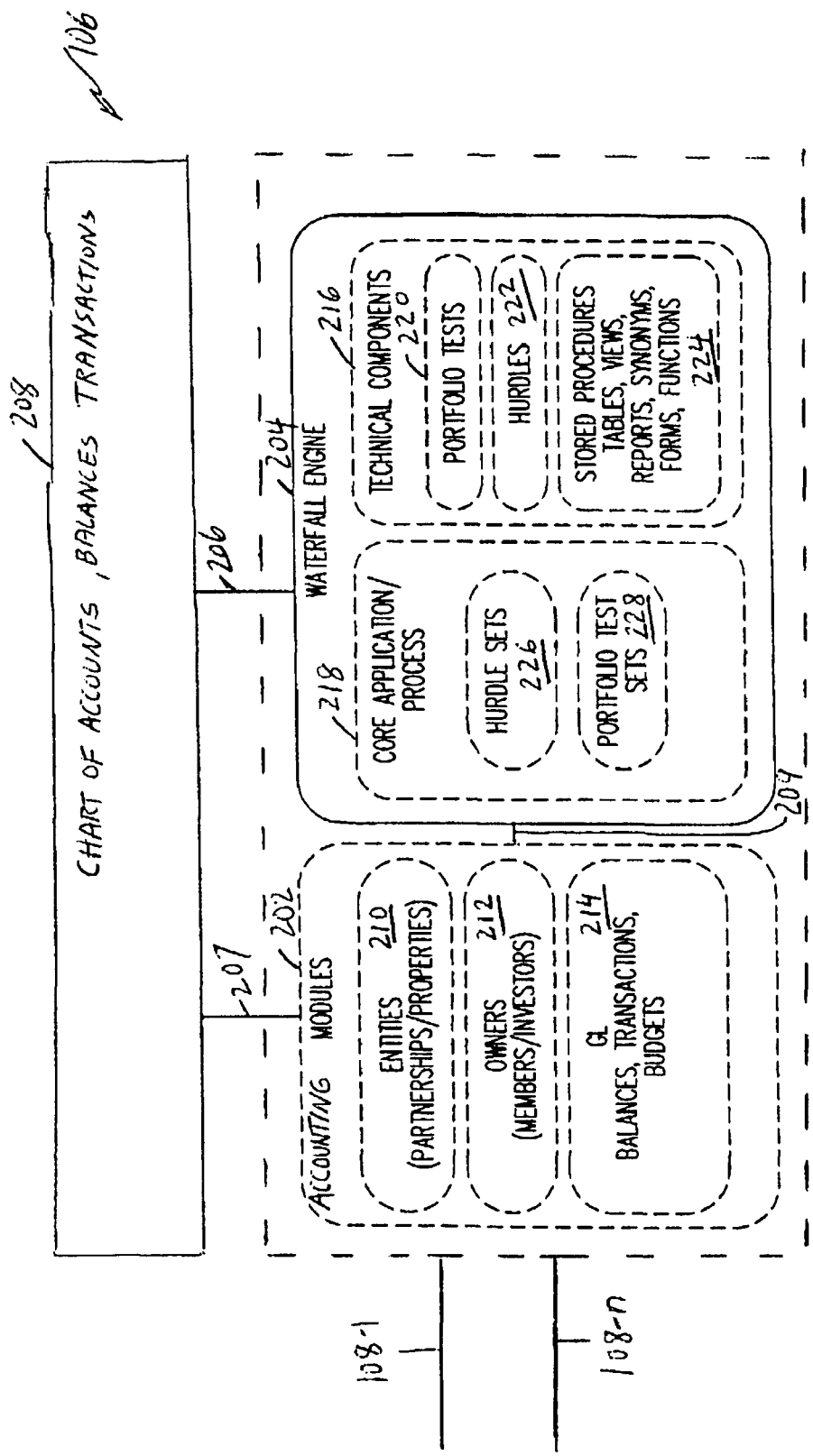
FIG. 2 is a functional block diagram of a processing system, in accordance with some embodiments.

FIG. 2 is a functional block diagram of the processing system 106, in accordance with some embodiments. Referring to FIG. 2, in accordance with some embodiments, the processing system 106 may include accounting modules 202, an engine 204 and a database 208 sometimes referred to herein as a chart of accounts, balances, transactions 208 or chart of accounts 208. The accounting module 202 may be coupled to the chart of accounts 208 by a communication link 207. The engine 204 may be coupled to the chart of accounts 208 by a communication link 208. The accounting modules 202 may be coupled to the engine 204 by a communication link 209. In some embodiments, the engine 204 comprises a waterfall engine.

The accounting modules 202 may include an entities portion 210, an owners portion 212 and a general ledger portion 214. The entities portion 210, the owners portion 212 and the general ledger portion 214 may be separate from one another, combined with one another and/or any combination thereof.

The engine 204 may include a technical components portion 216 and a core application/process portion 218. The technical components portion 216 may include a portfolio tests portion 220, a hurdles portion 222 and stored procedures, tables, views, reports, synonyms, forms and functions portion 224. The process portion 218 may include hurdles sets portion 226 and portfolio test sets portion 228.

The hurdles sets portion 226 may define one or more hurdle sets for one or more waterfalls to determine one or more distributions in accordance with the distribution plans set forth in one or more joint venture agreements. Each hurdle set may specify one or more hurdles. Each such hurdle may operate in accordance with a definition for such hurdle as set forth in the hurdles portion 222 of the technical components 216.

In some embodiments, hurdles are individual modular stored procedures or functions, which are assigned to hurdle sets. In some embodiments, each hurdle can be developed independently and integrated in the same way. In some embodiments, hurdles are of programmatic or special calculation. Programmatic hurdles are defined as hurdles which are tied directly to a stored procedure within the database that performs computation using data stored for the current partnership or property. Programs may be associated with a hurdle via an administration form, updatable by the technical developers on completion and testing of newly developed hurdle programs based upon business requirements. However, in some embodiments, hurdles within a waterfall do not always allow for a programmatic calculation, for example in cases where a fixed Fee or value is required or contractually agreed. Special calculation hurdles allow a user to select an amount from balances or transactions, where specific conditions occur. In some embodiments, this type of hurdle comprises a where clause to read information and allow for user defined calculations to occur to the resultant amounts. In some embodiments, the computed amounts for each hurdle are provided back to the core processing logic, by partnership or property and subsequently apportioned to members of the partnership based upon the investor claim priority rules. In some embodiments, claim priority may also be generic, in the distribution at the point of any hurdle within a hurdle set. Some embodiments provide for two distribution methods: pro-rata, or alternatively a user may individually select the priority of investor's claims, by member, within the partnership. In some embodiments, the distribution of priority claims for the current hurdle can, by member also be a percentage of the total computed hurdle, or a declining computation by member for each and any hurdle; as a fraction of the computed amount.

In accordance with some embodiments, the one or more hurdle sets of the engine 204 are configured by one or more users of the system to determine the distributions for each and every accounting period of the one or more joint ventures, so long as (i) executed in accordance with the sequence specified by the one or more hurdle sets (ii) provided with the information stored in the chart of accounts 208, and (iii) provided with financial information resulting from distributions associated with the most recent previous accounting period (if any).

The portfolio test sets portion 228 may define one or more portfolio test sets for one or more waterfalls. Each portfolio test set may specify one or more portfolio test. Each such portfolio test may operate in accordance with a definition for such portfolio test as set forth in the portfolio tests portion 220 of the technical components 216.

In some embodiments, the engine 204 comprises modular components that allow for the ability to integrate hurdles and/or portfolio tests in a modular fashion.

The chart of accounts 208 may have a structure that defines the submission structure of the financial statements, which may be received from partners on a year to date (YTD) basis. In some embodiments, a balance is collected and maintained for each combination of JV, Property, Account and Member. In some embodiments, this may allow for collection of the required granular financials and storage within the system. In some embodiments, distributions and depreciation reserve accounts have a balance by JV, Property (potentially), contribution/distribution/depreciation and each member within the Jv.

In some embodiments, waterfall requirement may have a direct impact on the chart of accounts design. In some embodiments, in order to provide a generic approach to the definition of waterfall hurdles, the engine 204 may need to, by hurdle, select specific balances from the chart of accounts Natural Accounting segment and other partner segments, for example the selection of initial capital contributions.

In some embodiments the Chart of Accounts structure is designed to provide for the delineation of the contributions, distributions and Income/(loss) by member of the joint venture. In some embodiments, this allows the engine 204 to select relevant contributions or distributions for preferred return calculations during the execution of the process.

In some embodiments, each partner's initial contributions are required to be separately accessible as data elements within the chart of accounts. In some embodiments, the chart of accounts definition has a specific account which is used for the storage of this information as for each joint venture member. In some embodiments, members make capital contributions in cash (initial capital contributions) with respect to each project. Initial capital contributions may be made up to the "maximum funding commitment". In some embodiments, after these contributions are met, the rest of the capital contributions are classified as additional capital contributions.

In some embodiments, the trial balance may be structured so as to provide any necessary granularity to capture any attributes desired for the waterfalls. In some embodiments, the chart of accounts provides for enough detail to support both the collection of financial statements, on a quarterly basis and the delineation of types of capital contributions, preferred returns, "Residual Distributable Capital" and investor claims.

In operation, the accounting modules 202 may receive information associated with one or more joint ventures. In some embodiments, such information identifies one or more joint ventures, one or more properties associated with one or more joint ventures and/or one or more members of one or more joint ventures.

The information may also include financial information for one or more of the joint ventures. In some embodiments, such financial information includes one or more financial statements for one or more properties of one or more joint ventures and/or one or more financial statements for one or more members of one or more joint ventures. In some embodiments, the financial statement comprises a chart of accounts that defines general ledger, as least in part.

In some embodiments, the accounting modules 202 may store one or more portions of the information in the chart of accounts 208, e.g., via communication link 207.

In some embodiments, the accounting modules 202 may include a mapping that may be used to convert one or more portions of the information into a format that the engine 204 may be adapted to receive. In accordance with some embodiments, a mapping may have any form, for example, but not limited to, a look-up table, a rule base, hardwired logic, fuzzy logic, neural networks, and/or any combination thereof. Moreover, a mapping may be embodied, for example, in software, hardware, firmware or any combination thereof.

Notably, in some embodiments, the engine 204 is adapted to receive information having the form of postings for a general ledger and/or other type of ledger. In some such embodiments, the engine 204 is adapted to receive (i) a single line item indicative of all income generated by a property, (ii) a single line item indicative of all expenses incurred for the property, (iii) a single line item indicative of all assets associated with the property and/or (iv) a single line item indicative of all liabilities associated with the property. This may simplify design of the engine 204. In such embodiments, the accounting modules 202 may comprise a mapping that may be used to generate (i) a single line item indicative of all income generated by a property, (ii) a single line item indicative of all expenses incurred for the property, (iii) a single line item indicative of all assets associated with the property and/or (iv) a single line item indicative of all liabilities associated with the property, based at least in part on the financial information supplied to the accounting modules 202.

In some embodiments, one or more portions of the information generated by the accounting modules 202 may be stored in the chart of accounts 208.

In some embodiments, the engine 204 may have the capability to receive information from an unposted journal. In some embodiments, this may support the running of waterfalls against received YTD financial statements of affairs. In some embodiments, the engine 204 may have the capability to receive balances to support the running of the waterfalls against managed NCJV's on behalf of a group of partnerships.

In accordance with some embodiments, the engine 204 determines distributions and generates financial information based at least in part on such distributions. In that regard, in some embodiments, the engine 204 selects the correct waterfall hurdle set and hurdles, computes the total of net available cash or distributable capital of a partnership or property, and for each hurdle set level (via a sequence) compute and distribute the capital. The engine 204 may read received balances in the chart of accounts, compute equity distributions and sharing and assign these computed values to accounts, properties and members.

In some embodiments, a full Trial Balance is available in real time; and the process may form the last step of a closing procedure, prior to distribution of financial statements. In some embodiments, the engine 204 may have the capability to receive information at a point a transaction is made in the processing system 106 against a partnership which has a HLBV calculation which distributes the operating income. This may simply use the waterfall to update the percentage owned field within the owners table, to support expense allocations or reports in real time.

In some embodiments, following distribution of capital to all members of the partnership, the engine 204 computes the "investors claim %" as the sum of investor's claims over the total distributable capital. In some embodiments, this percentage is used and applied against the NI of the partnership in the computation of income/gain/loss.

In some embodiments, the engine 204 generates a batch/journal, that contains, for each hurdle, the computed distributable capital, NI/Gain/Loss and expense sharing, by partner. In some embodiments, the generated batch/journals shall effectively distribute the NI at each periodic interval to the member's income and capital accounts.

The financial information generated by the engine 204 may have a format that allows the financial information to be stored in the chart of accounts 208 and subsequently retrieved by the engine 204 so as to allow the financial information to be used in determining distributions for a next accounting period. In some embodiments, this may help simplify design of the engine 204 and/or may help reduce the need for manual processes such as those employed when waterfall calculations are completed using customized spreadsheets and calculations.

In some embodiments, the engine 204 may store the financial information in the chart of accounts 208, for example, via the communication link 206. The engine 204 may thereafter retrieve such financial information from the chart of accounts 208, e.g., via the communication link 206, and may use the financial information in determining distributions for a next accounting period.

In addition, the format of the financial information may be adapted to be received by one or more accounting systems for one or more of the entities 102-1 to 102-n. This may simplify transfer of information to such systems.

Figure 3A:
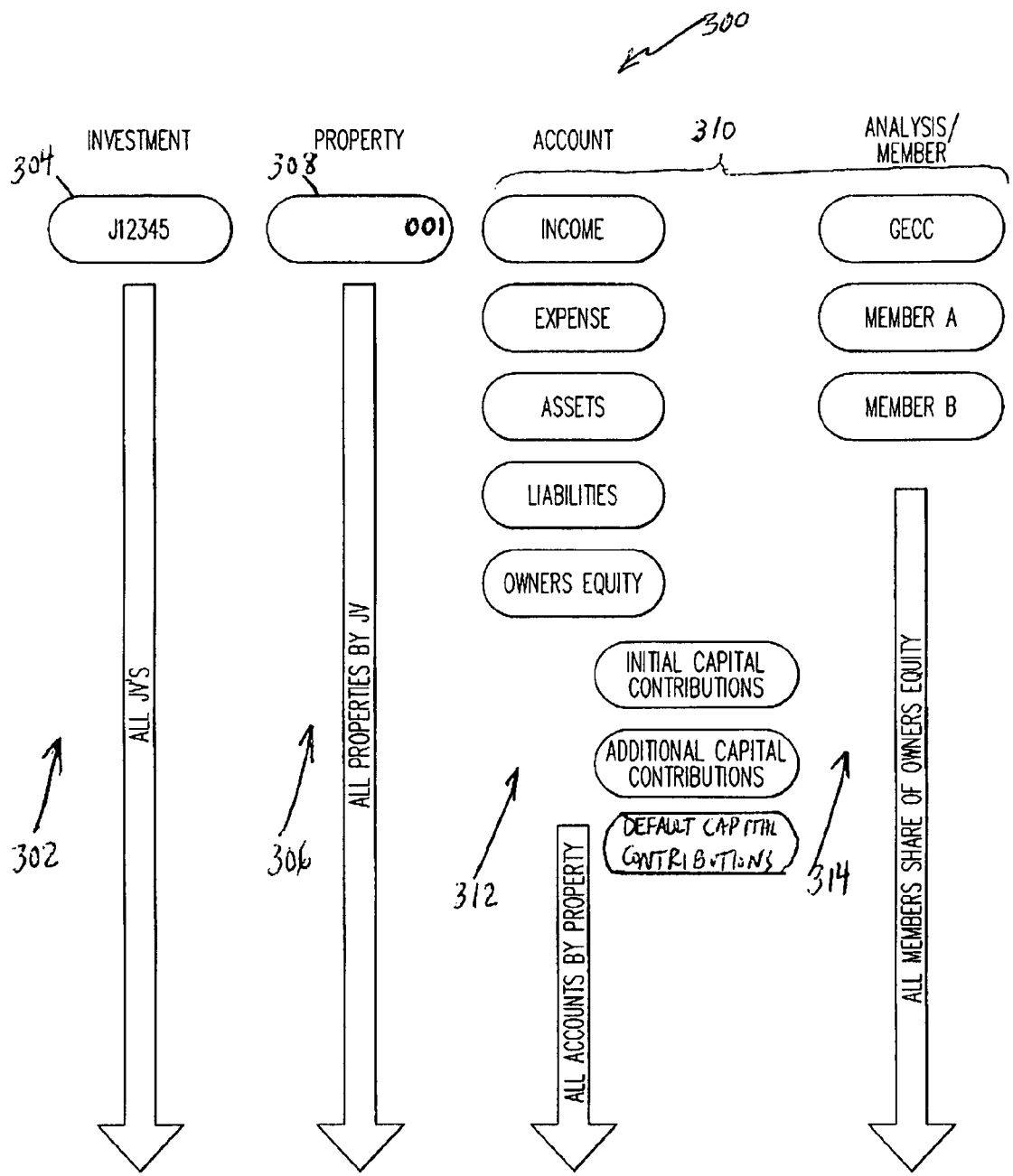
FIG. 3A is a schematic diagram of information that may be stored in a database, in accordance with some embodiments.

FIG. 3A is a schematic diagram of information 300 that may be stored in the chart of accounts 208 (FIG. 2), in accordance with some embodiments. Referring to FIG. 3A, in accordance with some embodiments, the information 300 includes information 302 indicative of all joint ventures for which the engine 204 is to determine distributions. The information 302 indicative of all joint ventures may include a information 304 indicative of a first joint venture, e.g., indicated as J12345.

The chart of accounts may further include information 306 indicative of one or more properties associated with the one or more joint ventures. In some embodiments, the information 306 indicative of all properties associated with the one or more joint ventures includes information 308 indicative of a first property, indicated as 001, associated with the first joint venture J12345.

The chart of accounts 208 (FIG. 2) may further include financial information 310 for the one or more properties of the one or more joint venture. In some embodiments, the financial information 310 includes information 312 indicative of income, expenses, assets, liabilities and/or owners equity of each property of each joint venture. In the illustrated embodiment, the financial information includes information indicative of income, expenses, assets, liabilities and/or owners equity for the first property 001. In some embodiments, one or more portions of the financial information 310 is in the form of postings for one or more general ledger accounts. In some embodiments, the information indicative of owners equity includes information indicative of initial capital contributions, additional capital contributions and/or default capital contributions.

The chart of accounts 208 (FIG. 2) may further include information 314 indicative of one or more members of the one or more joint ventures and/or each member's share of the owners' equity for each property. In some embodiments, the information indicative of one or more members may include information at each intersection between partnership/property and its owners. In some embodiments, the information indicative of one or more members includes information indicative of a first member, for example, indicated as GECC, a second member, for example indicated as member A and a third member, indicated as member B. In some embodiments, the information may include information indicative of initial capital contributions, the additional contributions and/or the default contributions of the first member, the initial capital contributions, the additional contributions and/or the default contributions of the second member and the initial capital contributions, the additional contributions and/or the default contributions of the third member and so on.

Figure 3B:
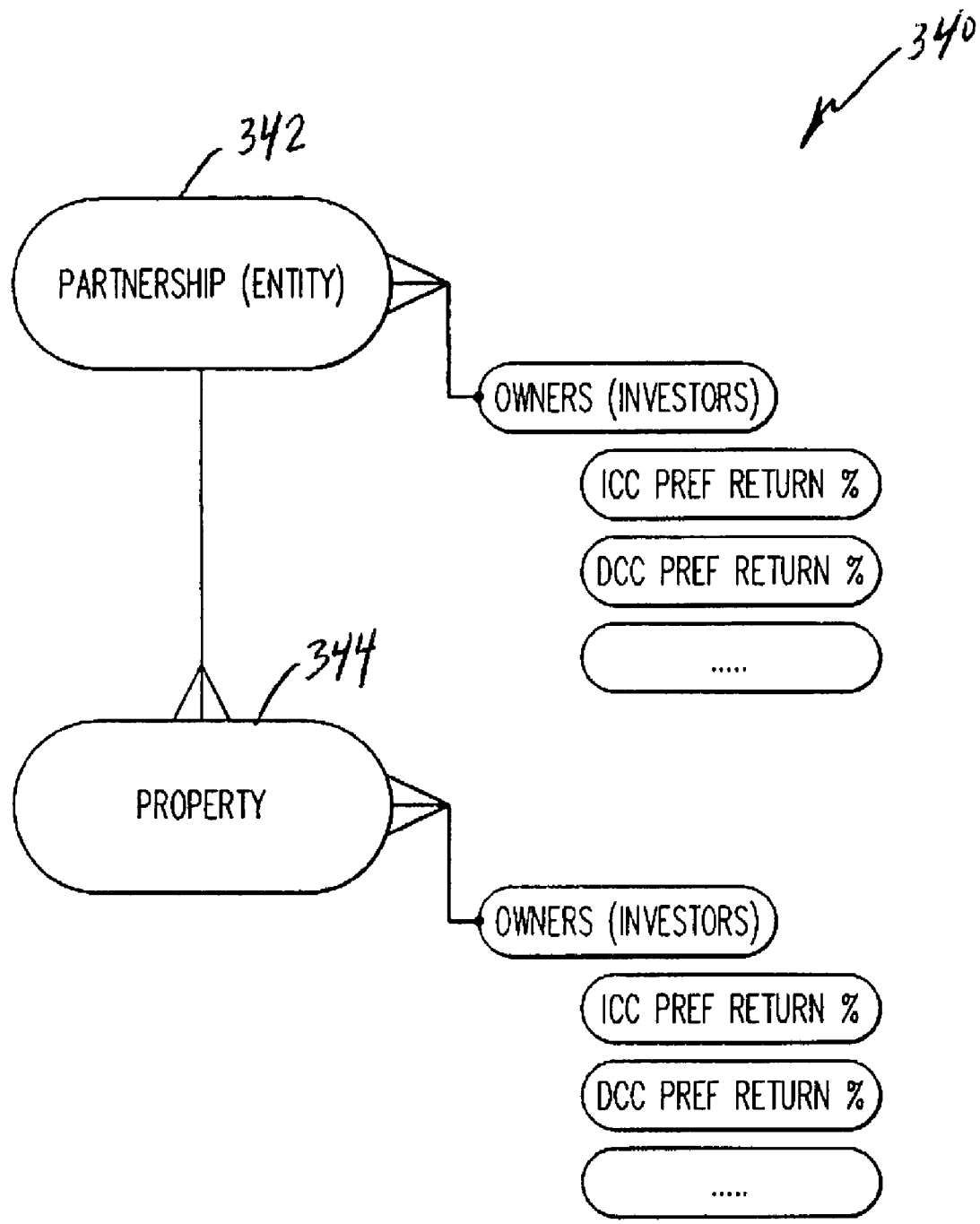
FIG. 3B is a schematic diagram of information that may be stored in a database, in accordance with some embodiments.

FIG. 3B is a schematic diagram of additional information 340 that may be stored in the chart of accounts, in accordance with some embodiments. Referring to FIG. 3B, in accordance with some embodiments, the chart of accounts may include any type of additional information 340 that may be desired. In some embodiments, the additional information may be supplied by one or more users of the processing system 106. In some embodiments, the additional information 340 may include information indicative of a preferred rate of return for initial capital contributions, a preferred rate of return for deferred capital contributions and/or preferred rates of return for any other type of capital contributions for each member of each joint venture. That is, information indicative of (i) a preferred rate of return for initial capital contributions, a preferred rate of return for deferred capital contributions and/or preferred rates of return for any other type of capital contributions for a first member of a first joint venture 342 (ii) a preferred rate of return for initial capital contributions, a preferred rate of return for deferred capital contributions and/or preferred rates of return for any other type of capital contributions for a second member of a joint venture, and every other member of the joint venture, and so on for each member of the first joint venture, and so on.

The additional information 340 may further include information indicative of a preferred rate of return for initial capital contributions, a preferred rate of return for deferred capital contributions and/or preferred rates of return for any other type of capital contributions for each member of each joint venture on a property by property basis. That is, information indicative of (i) a preferred rate of return for initial capital contributions, a preferred rate of return for deferred capital contributions and/or preferred rates of return for any other type of capital contributions for a first member with respect to a first property 344 of the first joint venture 342 (ii) a preferred rate of return for initial capital contributions, a preferred rate of return for deferred capital contributions and/or preferred rates of return for any other type of capital contributions for the first member with respect to a second property of the first joint venture and so on for each member with respect to each property of the joint venture.

In some embodiments, the additional information 340 may further include information indicative of internal rate of return rates (IRR rates), sharing ratios, residual sharing ratios and/or other types of information.

Figure 3C:
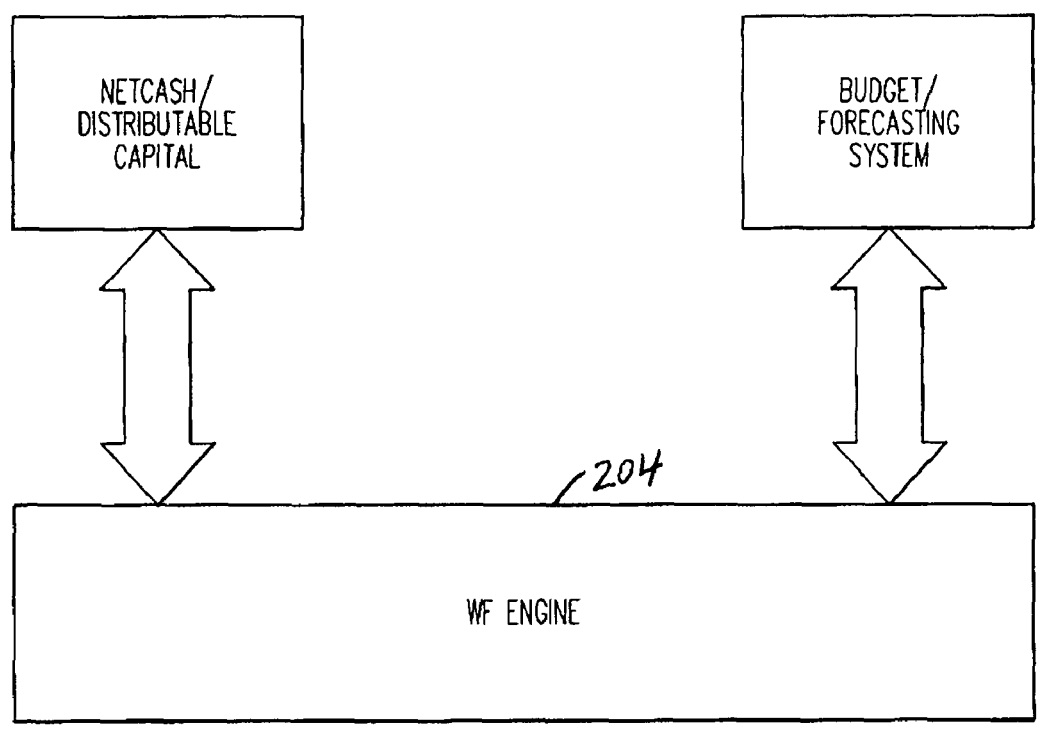
FIG. 3C is a schematic block diagram of an engine, in accordance with some embodiments.

FIG. 3C is a schematic block diagram of the engine 204, in accordance with some embodiments. Referring to FIG. 3C, in accordance with some embodiments, the engine 204 may compute one or more waterfalls upon actual financial positions (e.g. available net cash on a quarterly basis), on an ad hoc basis (e.g., due to sale of a property or joint venture), upon receipt of financial statements, and/or per a next phase budget or forecasting information. In some embodiments, a waterfall may be run against operational budget balances.

In some embodiments, the design of the processing system 106 (FIG. 1) may allow for the integration of data from various sources and of varying basis's. As stated above, in some embodiments, there are fixed or predefined formats for the sending of information from sub systems into the engine 204. In some embodiments, these formats may be transferred using web service, messaging and/or XML type formats; which at a minimum may supply enough information to support the waterfall process.

In some embodiments, for each partnership and, where applicable, each property within the partnership, a defined set of User Fields are provided to support the percentages or other values to be used by the waterfall process. In some embodiments, these values are applied to the intersection between the partnership/property and its owners.

As further described below, in some embodiments, the venture setup forms provide the capability to assign members to the joint venture. During assignment of the members, the administrator may apply the sharing ratios defined in the joint venture agreement. In some embodiments, these sharing ratios must always be equal to 100%. In some embodiments, fields are defined by entity/owner. In some embodiments, these must be consistently defined for each partnership and/or property within a partnership.

FIG. 3D is a schematic diagram of the chart of accounts 208, in accordance with some embodiments. Referring to FIG. 3D, in accordance with some embodiments, the chart of accounts may include a first segment, e.g. indicated as JV Investment, a second segment, e.g., indicated as accounts, a third segment, e.g., indicated as 3rd party segment, and a fourth segment, e.g., indicated as analysis/other.

The first segment, e.g., indicated as JV Investment, may be associated with an accounting segment, e.g., indicated as entity. In accordance with some embodiments, the JV segment defines the JV Investment and is the balancing segment. As the entry point for balanced financials is the Investment within a JV, this would be defined as the balancing segment. In some embodiments, the format of this segment may be Jxxxxx, J for Joint Venture and xxxxx pertaining to an Investment number.

The second segment, e.g., indicated as property, may be associated with an accounting segment, e.g., indicated as entity. In accordance with some embodiments, the property segment may be used to denote each property or project within the Joint Venture. In some embodiment, this segment may be concatenated with the joint venture segment as properties may be specific to venture. Having a separate segment could potentially require unique coding of the properties within a venture, which ultimately would work via using a code such as J12345001, 002, 003.

The third segment, e.g., indicated as account, may be associated with an accounting segment, e.g., indicated as account code. In some embodiments, the account segment defines a Natural Accounting Segment, which provides granularity for a trial balance financial statement submission. The structure of the account may be aligned with the Chart of Accounts structure of one or more of the members and/or administrator to provide better internal understanding of the usage of accounts.

The fourth segment, e.g., indicated as 3rd party segment, may be associated with an accounting segment, e.g., indicated as owners. In some embodiments, this segment is used to define the 3rd parties, members or partners within the joint venture. In some embodiments, this segment is used specifically to provide a breakout of the contributions made, preferred returns accrued or paid to each member of the joint venture. In some embodiments, one of the members may always have a particular designation; additional values may be used to delineate each member within the joint venture.

The fifth segment, e.g., indicated as analysis/other, may be associated with an accounting segment, e.g., indicated as department. In some embodiments, this segment is used to provide for future proofing and additional granularity of the chart of accounts moving forward.

Figure 4:
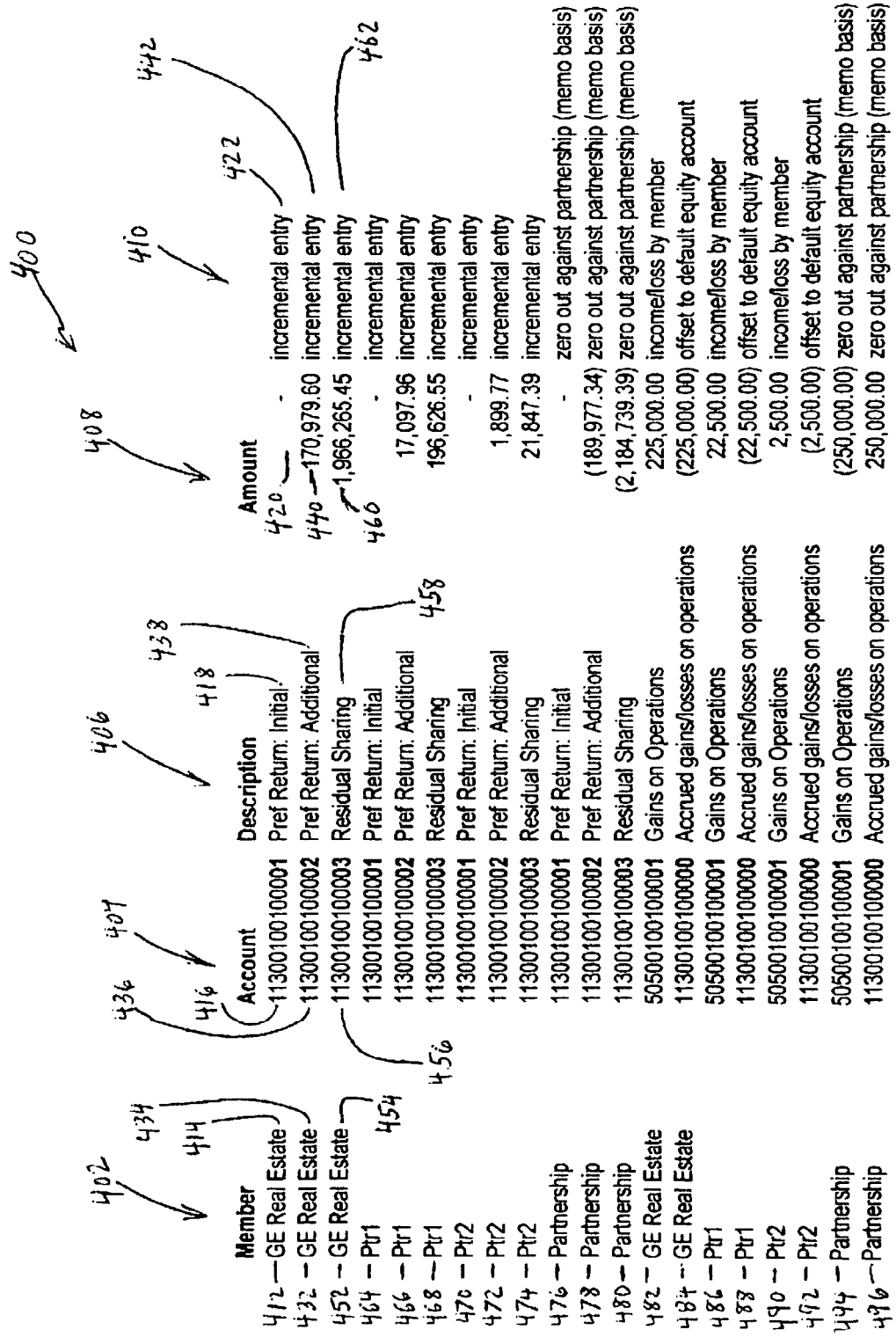
FIG. 4 is a schematic representation of financial information that may be generated by an engine, in accordance with some embodiments.

FIG. 4 is a schematic representation of financial information that may be generated by the engine 204, in accordance with some embodiments. Referring to FIG. 4, in accordance with some embodiments, the information 400 may define a plurality of entries. In some embodiments each entry represents a posting for a general ledger and/or other type of ledger.

In some embodiments, each entry includes five fields, i.e., a member name 402, an account 404, a first description 406, an amount 408 and a second description 410. The member name 402 may comprise a name of a member of the joint venture. The account 404 may define a general ledger (GL) account or other type of ledger account that is to be debited and/or credited by the amount of the entry. The first description 406 may be associated with the account 404 and may comprise a description portion of a posting for a general ledger or other type of ledger. The amount 408 may define an actual amount (cost and/or credit) associated with the entry. The second description 410 may be associated with the amount 408 and may comprise a description portion of a posting for a general ledger or other type of ledger.

For example, a first entry 412 may represent a first posting and may include a member name field 414 that specifies the name of a member, e.g., GE Real Estate, an account field 416 that specifies an account, e.g., 11300100100001, a description field 418 that specifies a description for the account, e.g., pref return: initial, an amount field 420 that specifies an amount, e.g., nil, and a description field 422 that specifies a description for the amount, e.g., incremental entry.

In some embodiments, the first entry 412 may be viewed as specifying an amount of interest that is distributed or to be distributed to an account of a member e.g., GE Real Estate, for initial capital contributions made by the member and for which the member has not yet been paid back.

A second entry 432 may represent a second posting and may include a member name field 434 that specifies the name of a member, e.g., GE Real Estate, an account field 436 that specifies an account, e.g., 11300100100002, a description field 438 that specifies a description for the account, e.g., pref return: additional, an amount field 440 that specifies an amount, e.g., 170,979.60, and a description field 442 that specifies a description for the amount, e.g., incremental entry.

In some embodiments, the second entry 432 may be viewed as specifying an amount of interest that is distributed or to be distributed to an account of a member e.g., GE Real Estate, for additional capital contributions made by the member and for which the member has not yet been paid back.

A third entry 452 may represent a third posting and may include a member name field 454 that specifies the name of a member, e.g., GE Real Estate, an account field 456 that specifies an account, e.g., 11300100100003, a description field 458 that specifies a description for the account, e.g., residual sharing, an amount field 440 that specifies an amount, e.g., 1,966,265.45, and a description field 442 that specifies a description for the amount, e.g., incremental entry.

In some embodiments, the third entry 452 may be viewed as specifying an amount of profit that is distributed or to be distributed to an account of a member e.g., GE Real Estate, for residual sharing.

The information may further include entries 464-496. Entries 464-468 and 486-488 may be viewed as specifying amounts distributed or to be distributed to accounts of another member e.g., Prt1. Entries 470-474 and 490-492 may be viewed as specifying amounts distributed or to be distributed to accounts of another member e.g., Prt2. Entries 476-478 and 494-496 may be viewed as specifying amounts distributed or to be distributed to accounts of another member e.g., partnership. Entries 482-484 may be viewed as specifying amounts distributed or to be distributed to other accounts of the first member e.g., GE Real Estate.

In some embodiments, the account may identify a GL account and/or other type of ledger account and the first description may also identify the GL account and/or other type of ledger account. In some embodiments, the description portion may be descriptive, but may not, by itself, be descriptive enough to identify the GL account and/or other type of ledger account. In some embodiments, the descriptive portion may comprise only non numerics.

In some embodiments, the amounts comprise actual amounts. In some embodiments, the amounts comprise budgeted and/or forecasted amounts.

In some embodiments, the financial information 400 generated by the engine represents a postable journal, by partnership and/or property, a report of the generated journal for approval processing and acceptance and, where applicable, a log file which shows details of the computed hurdles within the waterfall.

In some embodiments, a waterfall process performed by the engine 204 determines the distribution of total capital across all members of the partnership or property; ultimately arriving at a percentage which can be applied to the NI of the partnership for distribution.

In some embodiments, the output of a waterfall process performed by the engine 204 includes a journal entry by partnership or property which details every computed hurdle, the computation of gains or income pickup and any other sharing of expense, for example depreciation.

FIG. 5A is a schematic representation of a report 500 that may be generated by the engine 204 of the processing system 106, in accordance with some embodiments. Referring to FIG. 5A, in accordance with some embodiments, the report 500 may define a first portion 502, a second portion 504 and a third portion 506. The first portion 502 may represent a financial summary for a period, e.g., indicated as current period. The second portion 504 may represent a financial summary for a previous period. The third portion 506 may represent a financial summary of the movement or change from the previous period.

The first portion 502 of the report 500 may include a portion that indicates net operating income 508 and NBV 510 for the period. The first portion 502 of the report 500 may further include a contributions portion that may indicate initial capital contributions 514, additional capital contributions 516, default capital contributions 518, developer capital contributions 520, cost overrun contributions 522 and total capital contributions for each member 523 as well as a total of each of the above.

The first portion 502 of the report 500 may further include a distribution portion that may indicate initial capital distributions 524, additional capital distributions 526, default capital distributions 528, developer capital distributions 530, cost overrun distributions 532 and total distributions for each member 533 as well as a total of each of the above.

The first portion 502 of the report 500 may further include a waterfall portion that may indicate preferred returns for initial capital contributions 534, preferred returns for additional capital contributions 536, residual sharing ratios 538, investors claims 540, percentages 542 and totals for each of the above.

The second portion 504 of the report 500 may include a portion that indicates net operating income 548 and NBV 550 for the previous period. The second portion 504 of the report 500 may further include a contributions portion for the previous period that may indicate initial capital contributions 554, additional capital contributions 556, default capital contributions 558, developer capital contributions 560, cost overrun contributions 562 and total capital contributions for each member 563, as well as a total of each of the above.

The second portion 504 of the report 500 may further include a distribution portion for the previous period that may indicate initial capital distributions 564, additional capital distributions 566, default capital distributions 568, developer capital distributions 570, cost overrun distributions 572 and total distributions for each member 573, as well as totals of each of the above.

The second portion 504 of the report 500 may further include a waterfall portion that may indicate preferred returns for initial capital contributions 574, preferred returns for additional capital contributions 575, residual sharing ratios 576, investors claims 577 and percentages 578.

The third portion 506 of the report 500 may indicate a change in the net operating income 579, NBV 580, a change in total initial capital contributions 581, a change in total additional capital contributions 582, a change in total default capital contributions 583, a change in total developer capital contributions 584, a change in total cost overrun contributions 585 and a change in total contributions 586.

The third portion 506 of the report 500 may further indicate a change in total initial capital distributions 587, a change in total additional capital distributions 588, a change in total default capital distributions 589, a change in total developer capital distributions 590, a change in total cost overrun distributions 591 and a change in total distributions 592.

The third portion 506 of the report 500 may further include a waterfall portion that may indicate a change in preferred returns for initial capital contributions 593, a change in preferred returns for additional capital contributions 594, a change in residual sharing ratios 595, a change in total preferred returns 596, a change in investors claims 597 and a change in percentages 598.

In some embodiments, the financial summary comprises a financial summary of actual amounts. In some embodiments, the financial summary comprises a financial summary of budgeted and/or forecasted amounts.

In some embodiments, the report provides a breakdown of the JE transactions which were generated by the waterfall process. In some embodiments, the source of the report is the JE generated by the waterfall process.

In some embodiments, a report is generated after completion of the waterfall process. In some embodiments, a report is generated for each partnership or property. In some embodiments, the report forms the basis of an approval process. In some such embodiments, AMS and Finance teams of an administrator, and potentially partners, receive the waterfall report, for validation checking prior to the posting of both the received financials and the waterfall generated entries.

In some embodiments, email is used to automatically notify all parties within the JV, that a waterfall process has been run and/or the final financial statements have been submitted. In some embodiments, this allows the business to finally approve the numbers. In some embodiments, the approval process, by default, include members of both Finance and Asset Management, who validate differing aspects of the submitted financials. For example, Finance in terms of the accuracy of the financial statements and AMS in terms of the actual to budget or forecast variance of say net cash flow.

In some embodiments, the financials and the waterfall process is run every month or quarter, and on an YTD basis.

In some embodiments, it is desirable that the prior month, current computed month and the net movement be displayed for users. In some embodiments, this helps to provide a quick view of the movements and potential issues with collected data.

In some embodiments, the waterfall process can be run at any point in time during any financial year and on an ad-hoc basis to support forecasting, budgeting or sale of assets. In some embodiments, the waterfall process is used during the financial submission process, every quarter, by every partner.

FIG. 5B is a schematic representation of a report 599 generated by a waterfall process on a pooled basis, in accordance with some embodiments. Referring to FIG. 5B, in this waterfall, the total distributable capital, i.e., 6, 298, 976, is passed through waterfall hurdles and each investors claim is computed; this computed amount is subtracted from the total distributable capital in a declining method to be the basis for the next waterfall hurdle. In some embodiments, there are differing calculations based upon whether the JV is pooled or project, whether the share is pro-rata, split or shared on differing member priorities. In the illustrated embodiment, the default capital contributions are dispersed initially, then moving down the waterfall, additional capital contributions, initial capital contributions, IRR @15% and finally residual sharing of remaining equity. On the right, the picture describes that at each hurdle the equity is computed for each partner until the residual distributable capital reaches zero. In this embodiment, the values 5,042,361 and 1,256,615 are the actual investor's claim of the total distributable capital between the partners for this joint venture. In this embodiment, these are YTD (or life to date balances). The prior period balance may be subtracted from the current period balance to determine the current period gain/loss. After the final equity balance is determined for the investment, it may be run through the waterfall to determine the individual partner shares.)

In accordance with some embodiments, the system may provide a user with the ability to define and/or change one or more aspects of the operation of the processing system. In some embodiments, this may be done via a user interface. In some embodiments, a user interface may comprise a graphical user interface.

In the following description of a graphical user interface and thereafter, the term entity is sometimes used to refer to (i) a partnership, (ii) a member and/or investor in a partnership and/or (iii) a project/property of a partnership.

Figure 6:
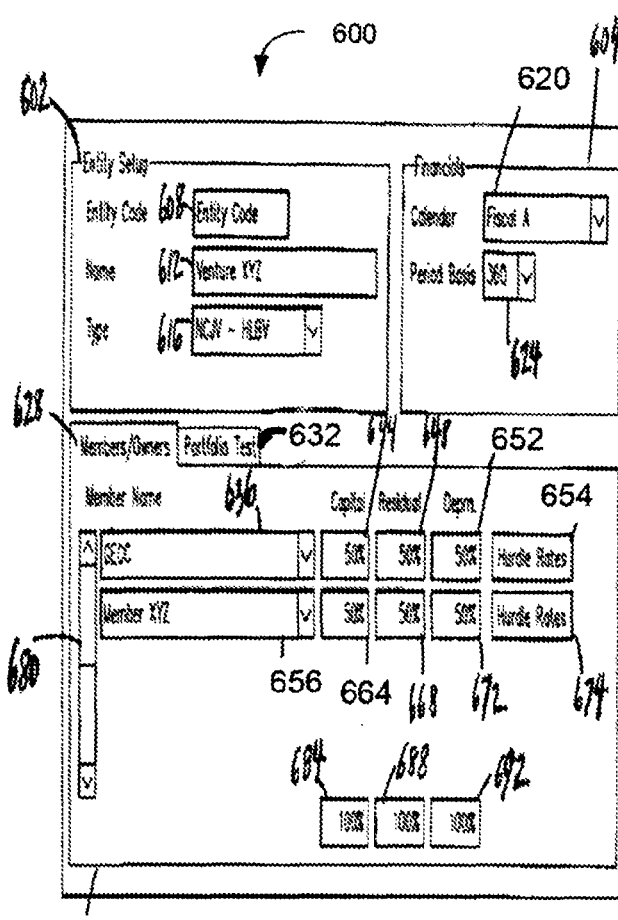
FIG. 6 is a schematic diagram of a window that provides a view in a graphical user interface, in accordance with some embodiments.

FIG. 6 is a schematic diagram of a window that provides a view within a graphical user interface that provides a user with the ability to define and/or change one or more aspects of the operation of the processing system, in accordance with some embodiments.

Referring to FIG. 6, in accordance with some embodiments, a window 600 for the graphical user interface includes a first region 602, a second region 604 and a third region 606.

The first region 602 includes a plurality of graphical editing tools that allow the user to specify various types of information. A first graphical editing tool 608 allows the user to specify an entity code, e.g., indicated as entity code. A second graphical editing 612 allows the user to specify a name of a joint venture, e.g., indicated as venture xyz. A third graphical editing tool 616 allows the user to specify a type of method to be used to determine distributions for the joint venture. e.g., indicated as non-consolidated joint venture (NCJV)—hypothetical liquidated book value (HLBV). In some embodiments, the first graphical editing tool 608 and the second graphical editing tool 612 each comprise a dialogue box within which the user may type information. The third graphical editing tool 616 may comprise a button that may be activated to initiate a drop down menu that allows the user to select the method from a list of various alternatives.

In some embodiments, the system enables the administrator to assign the venture to segments of the underlying chart of accounts, assign members and their associated sharing ratios, calendars and preferred return period bases.

The second region 604 also includes a plurality of graphical editing tools. A first graphical editing tool 620 allows the user to specify a calendar to be used to determine distributions, e.g., indicated as fiscal A. The calendar may be used to define period start/end dates for a quarter and/or other distribution period. A second graphical editing 624 allows the user to specify a period basis, e.g., indicated as 360. The period basis may be used to compute the number of outstanding days from a contribution date or end of prior year date (calendar). In some embodiments, the first graphical editing tool 620 and the second graphical editing tool 624 each comprise a button that may be activated to initiate a drop down menu that allows the user to select one of various alternatives.

The third region 606 also includes a plurality of graphical editing tools. A first graphical editing tool 628 may be activated by the user to initiate display of graphical editing tools that allow the user to specify information associated with member/owners. A second graphical editing tool 632 may be activated by the user to initiate display of graphical editing tools that allow the user to define a portfolio test (see FIG. 102). If the first graphical editing tool 628 is activated, a graphical editing tool 636 is displayed to allow the user to specify a name of a first member, e.g., indicated as GECC. The graphical editing tool 636 may comprise a button that may be activated to initiate a drop down menu that allows the user to select the name of the first member from a list of various member names. Graphical editing tools 644, 648, 652 allow the user to specify a percentage of capital, residual and depreciation, respectively, for the first member. A graphical editing tool 654 may be activated to initiate display of graphical editing tools that allow the user to specify hurdle rates and/or other information for the first member (see FIG. 200).

Under some agreements, members may share the depreciation and amortization expense. In some embodiments, Depreciation Expense/Reserve is a line item within the chart of accounts. In some embodiments, this depreciation expense is gross for the joint venture and is to be allocated based upon an agreed depreciation expense split between the partners. In some embodiments, this requires that allocation percentages shall be includes as a required field within the waterfall setup, by partner. In some embodiments, depreciation shared between partners, is recorded in separate member segments to allow the YTD (and thus incremental movement) to be computed for booking to the corporate ledger. In some embodiments, there is no requirement to collect a date of depreciation; it is assumed that depreciation charges are the reserve balance for the life of the properties and other assets within the partnership.

In some embodiments, the graphical editing tool 636 may comprise a button that may be activated to initiate a drop down menu that allows the user to select the member from a list of various members. The graphical editing tools 644-652 may each comprise a dialogue box within which the user may type a percentage.

A graphical editing tool 656 allows the user to specify a name of a second member, e.g., indicated as member XYZ. The graphical editing tool 656 may comprise a button that may be activated to initiate a drop down menu that allows the user to select the name of the second member from a list of various member names. Graphical editing tools 664, 668, 672 allow the user to specify a percentage of capital, residual and depreciation, respectively, for the second member. A graphical editing tool 674 may be activated to initiate display of graphical editing tools that allow the user to specify hurdle rates and/or other information for the second member.

In some embodiments, the graphical editing tool 656 may comprise a button that may be activated to initiate a drop down menu that allows the user to select the member from a list of various members. The graphical editing tools 664-672 may each comprise a dialogue box within which the user may type a percentage.

A graphical editing tool 680 may be activated by the user to initiate display, of information for other member/owners, in graphical editing tools 636-652 and graphical editing tools 656-672. In some embodiments, graphical editing tool 680 comprises an elevator bar and/or buttons that may be activated to initiate scrolling, through a list of member/owners, in graphical editing tools 636-652 and graphical editing tools 656-672.

The third region 606 may further include dialogue boxes 684, 688, 692 that indicate a sum of the capital percentages for all the members (e.g., a sum of the capital percentage for the first member and the capital percentage for the second member), a sum of the residual percentages and a sum of the depreciation percentages, respectively. If sum of the capital percentages, the sum of the residual percentages and/or the sum of the depreciation percentages exceeds 100%, the graphical user interface may provide a message that informs the user thereof.

Figure 7:
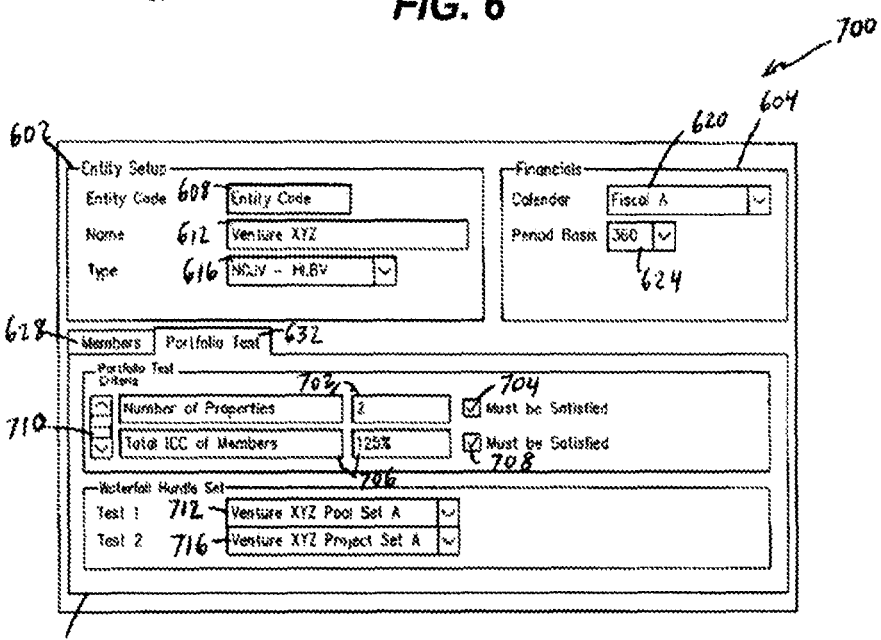
FIG. 7 is a schematic diagram of a window that provides a view in a graphical user interface, in accordance with some embodiments.

FIG. 7 is a schematic diagram of the window 600 in a state that allows the user to define a portfolio test, in accordance with some embodiments. In some embodiments, this state of window 600 is displayed if the second graphical editing tool 632 is activated. In some embodiments, a waterfall requires that investments can be grouped or pooled as a number of the waterfalls depend on whether the calculation is a pool or project (property) basis. In addition, in some embodiments, a flag, on the waterfall calculation is used to determine whether the waterfall should be pooled or applied to each property. There may be specific rules which determine whether a JV should be pooled or by property. In some embodiments, this test may be centered on whether there are multiples of properties within the venture itself.

Referring to FIG. 7, the window may include a plurality of graphical editing tools. A graphical editing tool 702 allows the user to specify a first criteria for the portfolio test, e.g., number of properties equal to 2. A graphical editing tool 704 allows the user to specify whether the first criteria must be satisfied to satisfy the portfolio test. A graphical editing tool 706 allows the user to specify a second criteria for the portfolio test, e.g., total ICC of members equal to 125%. A graphical editing tool 708 allows the user to specify whether the second criteria must be satisfied to satisfy the portfolio test. In some embodiments, the graphical editing tool 702 and the graphical editing tool 706 each comprise a button that may be activated to initiate a drop down menu that allows the user to select the criteria from a list of test criteria. The graphical editing tool 704 and the graphical editing tool 708 may each comprise a check box that may be activated to specify that the associated criteria must be satisfied to satisfy the portfolio test.

In some embodiments, the portfolio test window enables an administrator to define the portfolio test hurdles defined in the joint venture contract. In some embodiments, there may be a number of tests which need to be satisfied, the outcome of all tests and their satisfaction applicability shall determine which waterfall set of hurdles shall be applied to this entity (partnership or property).

In some embodiments, each portfolio test is linked to a procedure or stored function which computes amounts or values and determines whether the amounts or values satisfy the test, e.g., is the number of active properties allied at the partnership level equal to 2.

A graphical editing tool 710 may be activated by the user to initiate display, of information for other member/owners, in graphical editing tools 702-704 and graphical editing tools 706-708. In some embodiments, graphical editing tool 710 comprises an elevator bar and/or buttons that may be activated to initiate scrolling, through a list of member/owners, in graphical editing tools 702-704 and graphical editing tools 706-708.

A graphical editing tool 712 allows the user to specify a set of hurdles to be applied if the test is satisfied, e.g., indicated as venture XYZ pool set A. A graphical editing tool 716 allows the user to specify a set of hurdles to be applied if the test is not satisfied, e.g., indicated as venture XYZ project set A. In some embodiments, the graphical editing tool 712 and the graphical editing tool 716 each comprise a button that may be activated to initiate a drop down menu that allows the user to select the hurdle set from a list of hurdle sets.

FIG. 8 is a schematic diagram of a window 800 that allows the user to define new members, in accordance with some embodiments. Referring to FIG. 8, in accordance with some embodiments, the window 800 includes a plurality of graphical editing tools. A first graphical editing tool 802 allows the user to specify a name of a member, indicated as GERE. A second graphical editing 804 allows the user to specify a description for the member, e.g., indicated as GE Commercial Real Estate. A third graphical editing tool 806 allows the user to specify a member type for the member, e.g., indicated as investor. In some embodiments, each partner is denoted a specific type. In some embodiments, this makes it possible to determine whether the partner is a developer or investor. A fourth graphical editing tool 808 allows the user to specify whether the member is active. A fifth graphical editing tool 810 allows the user to specify an owner code for the member. In some embodiments, the owner code relates to a common list of owners, which the processing system may be able to use to generate a consolidated view and/or list of partners to which a member is exposed through one or more joint ventures.

In some embodiments, the first graphical editing tool 802, the second graphical editing tool 804 and the fifth graphical editing tool 810 each comprise a dialogue box within which the user may type information. The third graphical editing tool 806 may comprise a button that may be activated to initiate a drop down menu that allows the user to select the member type from a list of member types. The fourth graphical editing tool 808 may comprise a check box that may be activated to specify that the member is active.

In some embodiments, this window is also used for updating a member's name/description and whether the member is active. In some embodiments, a member cannot be made inactive if there are active joint ventures within the system.

In some embodiments, each member within a joint venture must be defined within the system. In some embodiments, the members are defined by an administrator and/or other user using the ownership tables. In some embodiments, hurdle rates are defined for each member.

FIG. 9 is a schematic diagram of a window 900 that allows the user to define interest rates for a member, in accordance with some embodiments.

Referring to FIG. 9, in accordance with some embodiments, a window 900 for the graphical user interface includes a first region 902 and a second region 904.

The first region 902 includes a plurality of graphical editing tools that allow the user to specify a member for which interest rates are to be defined. A first graphical editing tool 908 allows the user to specify an entity code, e.g., indicated as xxxxx. A second graphical editing tool 912 allows the user to specify a name of a member, e.g., indicated as GECC. In some embodiments, the first graphical editing tool 908 and the second graphical editing tool 912 each comprise a dialogue box within which the user may type information. In some embodiments, the first graphical editing tool 908 comprises a button that may be activated to initiate a drop down menu that allows the user to select the entity/code from a list of various entity/codes. In some embodiments, the second graphical editing tool 912 comprises a button that may be activated to initiate a drop down menu that allows the user to select the name of the member from a list of various members that have already been defined. In some embodiments, an entity/code comprises an alpha numeric code. In some embodiments, the member is an actual name or a description of the entity selected.

The second region 904 includes a plurality of dialogue boxes that indicate various types of hurdles and a plurality of graphical editing tools that allow the user to define an interest rate to be applied to each type of hurdle for the member specified in the first region 902. A first dialogue box 914 indicates a first type of hurdle, e.g., initial capital contributions. A graphical editing tool 916 allows the user to specify whether the type of hurdle indicated in the first dialogue box 914 applies to the member specified in the first region 902. In some embodiments, one or more types of hurdles may not apply to a member.

A graphical editing tool 918 allows the user to specify an interest rate for the type of hurdle indicated in the first dialogue box 914. The interest rate is sometimes referred to herein as an interest rate for preferred returns for the type of hurdle. In some embodiments, it is possible to specify a different interest rate for each type of contribution that may be made by each member.

A graphical editing tool 920 allows the user to specify a type of compounding to be applied to the type of hurdle indicated in the first dialogue box 914. In some embodiments, the type of compounding comprises a compounding frequency. In some embodiments, valid frequencies include monthly, quarterly and annually.

In some embodiments, the graphical editing tool 916 comprises a check box that may be activated to specify that the type of hurdle applies to the member. The graphical editing tool 918 may comprise a dialogue box within which the user may type a percentage. The graphical editing tool 920 may comprise a button that may be activated to initiate a drop down menu that allows the user to select the type of compounding from various types of compounding.

Other dialogue boxes 924, 934, 944, 954, 964 indicate other types of hurdles, e.g., additional capital contributions, default capital contributions, cost overrun contributions, developer priority contributions, and any other type (indicated as ??????) of contributions, respectively. Graphical editing tools 926, 928 and 930 may allow the user to specify whether the type of hurdle indicated in dialogue box 924 applies, an interest rate for the indicated type of hurdle, and a type of compounding to be applied, respectively. Graphical editing tools 936, 938 and 940 may allow the user to specify whether the type of hurdle indicated in dialogue box 934 applies, an interest rate for the indicated type of hurdle, and a type of compounding to be applied, respectively. Graphical editing tools 946, 948 and 950 may allow the user to specify whether the type of hurdle indicated in dialogue box 944 applies, an interest rate for the indicated type of hurdle, and a type of compounding to be applied, respectively. Graphical editing tools 956, 958 and 960 may allow the user to specify whether the type of hurdle indicated in dialogue box 954 applies, an interest rate for the indicated type of hurdle, and a type of compounding to be applied, respectively. Graphical editing tools 966, 968 and 970 may allow the user to specify whether the type of hurdle indicated in dialogue box 964 applies, an interest rate for the indicated type of hurdle, and a type of compounding to be applied, respectively.

A graphical editing tool 980 may be activated by the user to initiate display, of other types of hurdles, in the dialogue boxes, to allow the user to define an interest rate, if applicable, for such other types of hurdles for the member specified in the first region 902.

In some embodiments, each hurdle within the waterfall hurdle set reads the percentages above and applies them to the residual capital of the partnership or property. In some embodiments, the resultant computation is booked as a journal entry line to a specific account specified by the hurdle.

In accordance with some embodiments, the process carried out by the waterfall engine is referred to herein as a waterfall process.

In some embodiments, various waterfall hurdles and their respective rates or percentages are defined for each intersection of partnership or property (entity) and owner (member). In some embodiments, these rates/percentages are used during the waterfall process for the distribution of the partnership/properties capital, and ultimately the computation of the owners/members claim ("Investors Claim").

In some embodiments, an agreement may have one or more terms that require that specific expenses be shared between members of the partnership. In that regard, in some embodiments, an additional view is provided to allow a user to configure the accounts which store the expenses for sharing, the ratio's applied to the total expense and the accounts to which the waterfall process shall book the resultant shared expense.

FIG. 10 is a schematic diagram of a window 1000 that allows the user to define a hurdle, in accordance with some embodiments.

Referring to FIG. 10, in accordance with some embodiments, a window 1000 for the graphical user interface includes a first region 1002, a second region 1004 and a third region 1006. The first region 1002 includes a plurality of graphical editing tools. A first graphical editing tool 1008 allows the user to specify a name for a hurdle, e.g., initial capital contributions. In some embodiments, after hurdles have been developed and configured within the system, the hurdles are available to users and/or an administrator. In some embodiments, the name comprises a descriptive name that is available to an administrator when the administrator defines hurdles sets. A second graphical editing tool 1012 allows the user to specify a description for the hurdle, e.g., initial capital contributions made by joint venture members. A graphical editing tool 1016 allows the user to specify whether the hurdle is active.

In some embodiments, the first graphical editing tool 1008 and the second graphical editing tool 1012 each comprise a dialogue box within which the user may type information. The third editing tool 1016 may comprise a check box that may be activated to specify that the hurdle is active.

In accordance with some embodiments, a hurdle is a calculation, within a hurdle set, which forms part of a waterfall. In some embodiments, each hurdle is assigned to a specific function which read information from the front end 202 and/or other areas of the system and writes this information to specific accounts configured for the hurdle. In some embodiments, various types of hurdles are employed. In some embodiments, the types of hurdles may include, but are not limited to, return on capital contributions, IRR thresholds and fixed amounts for specific members of the partnership.

The second region 1004 includes a plurality of graphical editing tools that allow the user to define how amounts computed by the hurdle are to be distributed. A graphical editing tool 1020 allows the user to specify an account to debit by an amount computed by the hurdle, e.g., WF—return on ICC contributions. In some embodiment, this is the account to which the amount computed by the hurdle is distributed. A graphical editing tool 1022 allows the user to specify an account to which to credit by an amount computed by the hurdle, e.g., WF—return on ICC contributions. A graphical editing tool 1024 allows the user to specify an account to which to distribute any compounded returns, e.g., WF—return on ICC contributions. In some embodiments, hurdles and their respective computations are compounded at specific frequencies. The account specified in graphical editing tool 1024 is the account to which any compounded returns are booked.

In some embodiments, the graphical editing tools 1020, 1022 and 1024 each comprise a button that may be activated to initiate a drop down menu that allows the user to select an account from a list of accounts.

The third region 1006 also includes a plurality of graphical editing tools that allows the user to specify ranges of accounts. Amounts computed by the hurdle may be based, at least in part, on balances of the accounts specified by the ranges of accounts. In some embodiments, each account specified by the ranges of accounts has a balance that is read and used in one or more computations carried out by the hurdle.

In some embodiments, for each hurdle, the accounts, from which amounts shall be read and to which computed amounts shall be written, shall be defined. In some embodiments, the distribution of the resultant calculation may also be defined. In some embodiments, the waterfall computes a hurdle amount during a waterfall process and creates a Journal line transaction, booking the calculated amount to a specified distribution account. In some embodiments, the engine 204 allows users to select specific accounts, and thus balances or transactions, within a partnership which should be shared between members. The sharing approach may be provided through the same Investors Claim Priority functionality. In some embodiments, the engine 204, may then by partnership or property, and selected accounts for expense sharing, compute the share, using UDF's assigned at the intersection of entity and owner. The computed expense may then be apportioned by member as required and additional entries booked within the resultant waterfall journal entry.

A first graphical editing tool 1028 may be activated by the user to initiate display of graphical editing tools that allow the user to specify ranges of accounts for use in association with and/or in determining actual results, which are sometimes referred to herein as ranges of actual accounts for the hurdle. A second graphical editing tool 1032 may be activated by the user to initiate display of graphical editing tools that allow the user to specify ranges of accounts for use in association with budget and/or forecast results, which are sometimes referred to herein as ranges of budget accounts for the hurdle. In some embodiments, the ranges of actual accounts for a hurdle may be different than the ranges of budget accounts for the hurdle.

If the first graphical editing tool 1028 is activated, a graphical editing tool 1036 and a graphical editing tool 1040 are displayed to allow the user to specify a first range of accounts defined by a "from account" and a "to account", e.g., ICC and ICC, respectively. A graphical editing tool 1044 and a graphical editing tool 1048 are displayed to allow the user to specify a second range of accounts defined by a "from account" and a "to account", e.g., ICC—pref compounded and ICC—pref compounded, respectively. A graphical editing tool 1052 and a graphical editing tool 1056 are displayed to allow the user to specify a third range of accounts defined by a "from account" and a "to account", e.g., ICC—pref returns paid and ICC—pref returns paid, respectively.

In some embodiments, the graphical editing tools 1036-1056 each comprise a button that may be activated to initiate a drop down menu that allows the user to select an account from a list of accounts.

If the first graphical editing tool 1032 is activated, graphical editing tools similar to graphical editing tools 1036-1056 may be displayed to allow the user to specify three ranges of budget accounts for the hurdle.

In some embodiments, each hurdle is assigned to a physical stored procedure or function, which shall provide the programmatic logic, reading from account balances, applying calculations and returning the output to a control procedure.

Figure 11:
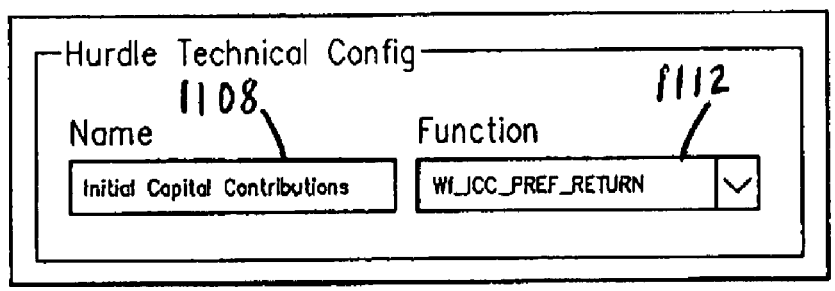
FIG. 11 is a schematic diagram of a window that provides a view in a graphical user interface, in accordance with some embodiments.

FIG. 11 is a schematic diagram of a window 1100 that allows the user to assign a procedure and/or function to a hurdle.

Referring to FIG. 11, in accordance with some embodiments, a window 1100 for the graphical user interface includes a first graphical editing tool 1108 allows the user to specify the name of a hurdle, e.g., initial capital contributions. A second graphical editing tool 1112 allows the user to specify a procedure and/or function to be assigned to the hurdle, e.g., wf_ICC_pref_return.

In some embodiments, the first graphical editing tool 1108 and the second graphical editing tool 1112 each comprise a dialogue box within which the user may type information. In some embodiments, the first graphical editing tool 1108 comprises a button that may be activated to initiate a drop down menu that allows the user to select a name of a hurdle from a list of names of hurdles. In some embodiments, the second graphical editing tool 1112 comprises a button that may be activated to initiate a drop down menu that allows the user to select a name of a function and/or procedure from a list of functions and/or procedures.

FIG. 12 is a schematic diagram of a window 1200 that allows the user to define a hurdle set, in accordance with some embodiments.

Referring to FIG. 12, in accordance with some embodiments, a window 1200 for the graphical user interface includes a first region 1202 and a second region 1204.

The first region 1202 includes a plurality of graphical editing tools. A first graphical editing tool 1208 allows the user to specify an entity code, e.g., indicated as J12345, for a joint venture that will use the hurdle set. A second graphical editing tool 1212 allows the user to specify a name of a joint venture, e.g., indicated as venture XYZ. A third graphical editing tool 1214 allows the user to specify whether the hurdle set is active. In some embodiments, the first graphical editing tool 1208 and the second graphical editing tool 1212 each comprise a dialogue box within which the user may type information. In some embodiments, the first graphical editing tool 1208 comprises a button that may be activated to initiate a drop down menu that allows the user to select the entity/code from a list of various entity/codes. In some embodiments, the second graphical editing tool 1212 comprises a button that may be activated to initiate a drop down menu that allows the user to select the name of the joint venture from a list of various joint ventures.

The second region 1204 includes a plurality of graphical editing tools that allow the user to define the hurdle set. A graphical editing tool 1216 allows the user to specify a first type of calculation to be included in the hurdle set, e.g., hurdle. In some embodiments, the type may comprise a hurdle, a fixed amount or other. A graphical editing tool 1220 allows the user to specify a first calculation that is of the first type and to be included in the hurdle set. In some embodiments, the graphical editing tool 1220 comprises a button that may be activated to initiate a drop down menu that allows the user to select the calculation from a list of calculations of the type specified in graphical editing tool 1216. Thus, if the graphical editing tool 1216 specifies that the type is hurdle, the drop down menu may allow the user to select the hurdle from a list of hurdles. In some embodiments, if the type is hurdle, then user would select a hurdle from the list of active and available hurdles, if the type were fixed, then the user could enter a specific value.

In some embodiments, promotion order, allows for a calculation at the specific hurdle level or sequence to be apportioned across the members in the partnership. A graphical editing tool 1224 allows the user to specify an order of claim priority for the first calculation specified in graphical editing tool 1220, e.g., pro rata. In some embodiments, the order of claim priority may be pro rata (e.g., equal to all members) or selective order by members. In some embodiments, "specific order" allows for a selection of order of investors claim priority, thus requiring a computation of the hurdle amount by sequence of member, reducing the distributable capital by the calculation for each member.

In some embodiments, the graphical editing tool 1224 comprises a button that may be activated to initiate a drop down menu that allows the user to select the order of claim priority from a list of various types of order of claim priority.

Other graphical editing tools allow the user to specify other calculations for the hurdle set. Graphical editing tools 1226, 1230 and 1234 allow the user to specify a second type of calculation to be included in the hurdle set, e.g., hurdle, a second calculation that is of the second type and to be included in the hurdle set, e.g., DCC prefer return, and an order of claim priority for the second calculation, e.g., pro rata, respectively. Graphical editing tools 1236, 1240 and 1244 allow the user to specify a third type of calculation to be included in the hurdle set, e.g., hurdle, a third calculation that is of the third type and to be included in the hurdle set, e.g., To GE IRR, and an order of claim priority for the third calculation, e.g., specific order, respectively. Graphical editing tools 1246, 1250 and 1254 allow the user to specify a fourth type of calculation to be included in the hurdle set, e.g., hurdle, a fourth calculation that is of the fourth type and to be included in the hurdle set, e.g., residual sharing ratio, and an order of claim priority for the third calculation, e.g., pro rata, respectively.

A graphical editing tool 1280 may be activated by the user to initiate display, of other hurdles defined for the hurdle set, in the graphical editing tools 1226, 1230, 1234, the graphical editing tools 1236, 1240, 1244 and the graphical editing tools 1246, 1250, 1254.

In some embodiments, each hurdle set is assigned to a specific entity (e.g., an entity code and/or joint venture). In some embodiments, it is desirable to have the capability to copy hurdle sets from other entities and/or templates. In that regard, a graphical editing tool 1282 may comprise a button that may be activated to allow the user to copy one or more hurdle sets from one or more other entities into the hurdle set being defined. A graphical editing tool 1284 may comprise a button that may be activated to allow the user to copy one or more hurdle sets from one or more other templates into the hurdle set being defined.

A plurality of dialogue boxes 1286, 1288, 1290, 1292 may indicate a sequence number, e.g., 10, 20, 30, 40, for the calculations specified in the graphical editing tools 1220, 1230, 1240, 1250, respectively. The sequence number associated with a calculation may indicate a position of the calculation within a sequence of calculations defined for the hurdle set. In some embodiments, the dialogue boxes 1286, 1288, 1290, 1292 comprise dialogue boxes within which the user may type a number to define the sequence numbers for the calculations specified in the graphical editing tools 1220, 1230, 1240, 1250, respectively.

In some embodiments, a hurdle set comprises a combination of hurdles, in a contractual sequence which form the entirety of the waterfall calculation. In some embodiments, there may be multiples of hurdles set for any contract, partnership or property.

In some embodiments, the selection of a hurdle set for a partnership or property depends on whether the partnership/contract has a pool test and whether the pool test is satisfied. In some embodiments, if a contract has no pool test, there is at least one waterfall hurdle set. In some embodiments, if a partnerships/contract has a pool test, there is a minimum of two waterfall hurdle sets. In some embodiments, there may also be a waterfall hurdle set for each and every intersection of pool test and property.

In some embodiments, the sequence of calculations and/or the number of calculations may change during the agreement. Thus, in some embodiments, it is desirable to have the ability to change hurdles sets in accordance therewith.

FIG. 13 is a schematic diagram of a window 1300 that allows the user to define a selection of order of claim priority for a calculation, in accordance with some embodiments.

Referring to FIG. 13, in accordance with some embodiments, a window 1300 for the graphical user interface includes a first region 1302 and a second region 1304. The first region 1302 includes a plurality of graphical editing tools that allow the user to define the calculation for which the selection of order of claim priority is to be defined. A graphical editing tool 1308 allows the user to specify a type of calculation, e.g., hurdle, for which the selection of order of claim priority is to be defined. A graphical editing tool 1312 allows the user to specify a calculation that is of the specified type and for which the selection of order of claim priority is to be defined. In some embodiments, the graphical editing tool 1312 comprises a button that may be activated to initiate a drop down menu that allows the user to select the calculation from a list of calculations of the type specified in graphical editing tool 1308.

A dialogue box 1316 may indicate a sequence number, e.g., 30, for the calculation specified in the graphical editing tool 1312. The sequence number associated with the calculation may indicate a position of the calculation within a sequence of calculations defined for a hurdle set.

The second region 1304 includes a plurality of graphical editing tools that allow the user to define the selection of order of claim priority for the hurdle. A graphical editing tool 1320 allows the user to specify a first member in the order of claim priority for the calculation specified in graphical editing tool 1312, e.g., GE Real Estate. In some embodiments, the graphical editing tool 1320 comprises a button that may be activated to initiate a drop down menu that allows the user to select the member from a list of members.

A dialogue box 1324 may indicate a sequence number, e.g., 10, for the member specified in the graphical editing tool 1320. The sequence number associated with the member may indicate a position of the member within an order of claim priority being defined for the calculation.

A dialogue box 1324 may indicate a sequence number, e.g., 20, for the member specified in the graphical editing tool 1320. The sequence number associated with the member may indicate a position of the member within an order of claim priority being defined for the calculation. In some embodiments, the dialogue box 1324 comprises a dialogue box within which the user may type a number to define the sequence number for the member specified in the graphical editing tool 1320

A graphical editing tool 1328 allows the user to specify a second member in the order of claim priority for the calculation specified in graphical editing tool 1312. In some embodiments, the graphical editing tool 1328 comprises a button that may be activated to initiate a drop down menu that allows the user to select the member from a list of members.

A dialogue box 1332 may indicate a sequence number, e.g., 20, for the member specified in the graphical editing tool 1324. The sequence number associated with the member may indicate a position of the member within an order of claim priority being defined for the calculation.

A graphical editing tool 1380 may be activated by the user to initiate display, of other members and the associated sequence numbers, in the graphical editing tools 1320, 1324 and graphical editing tools 1328, 1332.

In some embodiment, the window 1300 is used to define claim priority orders by entity and hurdle set/hurdle.

The hurdles may be arranged in a sequence, such that, for each hurdle or step within the waterfall agreement, the total Distributable Capital balance of the joint venture (or property where applicable) reduces by the amount, shared between members, of the previous hurdle.

For example, a first hurdle may specify that income/gains below a first threshold are to be distributed in accordance with a distribution plan, sometimes referred to herein as an investor claim priority, defined by the first hurdle. A second hurdle may specify that income/gains in excess of the first threshold and below a second threshold are to be distributed in accordance with a distribution plan defined by the second hurdle. A third hurdle may specify that income/gains in excess of the second threshold and below a third threshold are to be distributed in accordance with a distribution plan defined by the third hurdle. And so on. Thus, each hurdle may be used to compute a distributable portion of the total capital within a joint venture to one or more of the entities involved in the joint venture.

Figure 14A:
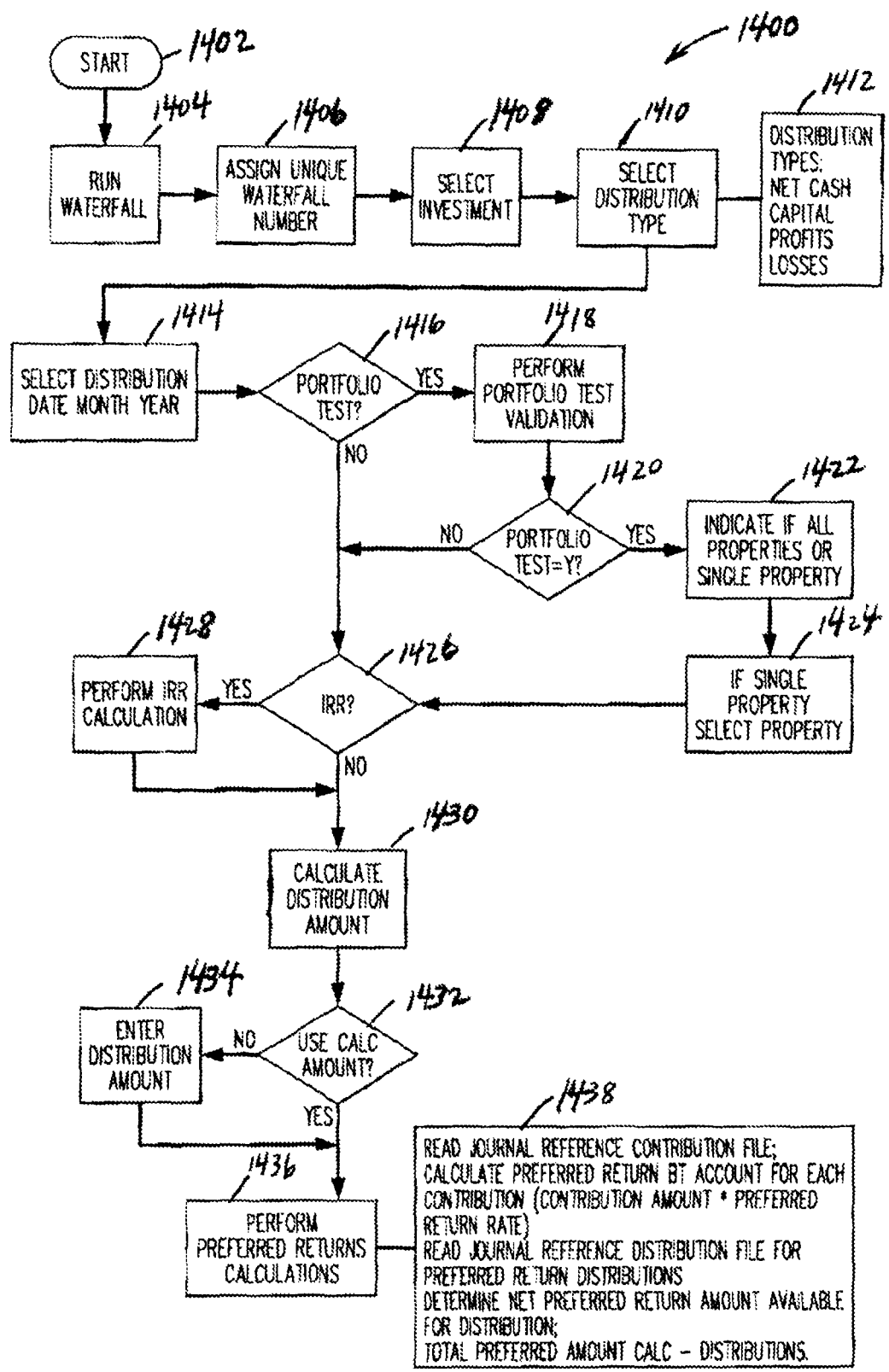
FIGS. 14A-14B are a flow chart of a method, in accordance with some embodiments.
Figure 14B:
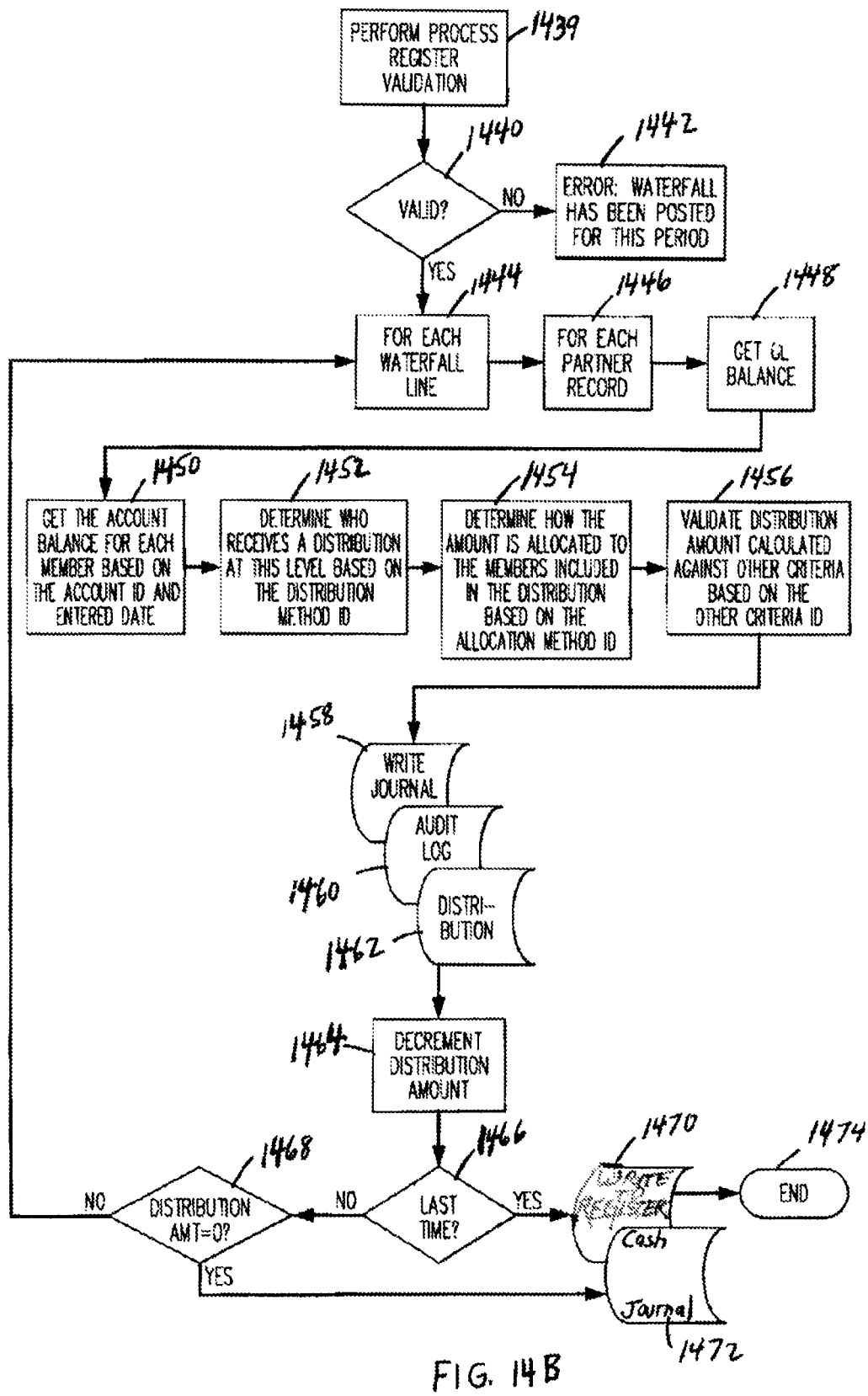

FIGS. 14A-14B are a flow chart of a method 1400 according to some embodiments. In some embodiments, one or more portions of the method may be performed by the processing system 106 (FIG. 1). As described hereinafter, in some embodiments, data may be requested from and supplied by an administrator (or other user). However, unless stated otherwise, data may be supplied by any source(s) of data.

Referring to FIG. 14A, the method may start at 1402. At 1404, a program to perform accounting for a distribution may be initiated at 1404. The program may be initiated by an administrator (or other user) that desires the accounting. At 1406, a unique designator (e.g., a unique waterfall number) may be assigned to the accounting. In some embodiments, the administrator may be prompted to supply (and/or may supply) the unique designator. At 1408, an investment, for which to perform accounting, may be selected. In some embodiments, the administrator may be prompted to select (and/or may select) the investment for which to perform accounting. At 1410, a type of distribution may be selected. In some embodiments, the administrator may be prompted to select (and/or may select) the type of distribution. As indicated at 1412, different types of distribution may include net cash, capital, profits, and losses. At 1414, a distribution date (e.g., day, month, year) may be selected. In some embodiments, the administrator may be prompted to select (and/or may select) the distribution date.

At 1416, the method may determine whether a portfolio test is to be performed. In some embodiments, the administrator may be prompted to determine (and/or may determine) whether such portfolio test is to be performed.

At 1418, if a portfolio test is to be performed, portfolio test validation may be performed. In some embodiments, portfolio test validation may be performed in accordance with a method described hereinafter with respect to FIGS. 16A-16B. In some embodiments, portfolio test validation may comprise determining whether criteria for a portfolio test is satisfied. A variable may be used to indicate whether the criteria is satisfied. For example, a variable referred to herein as portfolio test may be set equal to "Y" if the criteria is satisfied and "N" if the criteria is not satisfied.

At 1420, if criteria for a portfolio test is satisfied, then at 1422, the method may determine whether to proceed for all properties or a single property. In some embodiments, the administrator may be prompted to indicate whether to proceed for all properties or a single property. If it is determined to proceed for a single property, then at 1424, a property is selected. In some embodiments, the administrator may be prompted to select the property.

At 1426, the method may determine whether to provide an internal rate of return (sometimes referred to herein as IRR). In some embodiments, determining whether to apply an internal rate of return comprises determining whether the agreement includes terms that specify an internal rate of return will be provided. In some embodiments, the administrator may be prompted to determine and/or may determine whether an internal rate of return is to be provided. If an internal rate of return is to be provided, then at 1428, an internal rate of return calculation may be performed.

At 1430, a distribution amount may be calculated. At 1432, the method may determine whether to use the calculated amount. In some embodiments, the administrator may be prompted to determine and/or may determine whether to use the calculated amount. If the calculated amount is not to be used, then at 1434, the administrator may be prompted to enter and/or may enter a distribution amount.

At 1436, preferred returns may be calculated. As indicated at 1438, in some embodiments, calculating preferred returns may include (1) reading a journal reference contribution file; (2) calculating a preferred return by account for each contribution as follows: preferred return=contribution amount*preferred rate of return; (3) reading a journal reference distribution file for preferred return distributions; (4) determining a net preferred return amount available for distribution as follows: net preferred return amount available for distribution=total preferred amount calc—distributions.

Referring to FIG. 14B, at 1439, process register validation may be performed. In some embodiments, process register validation may comprise determining whether an accounting has already been posted for the period. The process register may be "valid" if an accounting has not been posted for the period and "not valid" if an accounting has already been posted for the period. At 1440, if the process register is not valid, an error message may be generated at 1442.

If the process register is valid, then at 1444, processing for a line of the accounting may begin. As stated above, in some embodiments, the accounting may comprise a waterfall. At 1446, a partner record may be read. At 1448, a general ledger balance may be determined for the partner.

At 1450, an account balance may be determined for the partner. In some embodiments, the account balance may be determined by reading the account balance from a database based at least in part on an account ID and an entered date.

At 1452, the method may determine which partners may receive a distribution based on this line of the accounting. In some embodiments, the partners that may receive a distribution based on this line may be determined based at least in part on a distribution method ID.

At 1454, the method may determine how the amount is allocated to the partners determined at 1452. In some embodiments, the determination may be based at least in part on an allocation method ID.

At 1456, the calculated distribution amount may be validated. In some embodiments, the calculated distribution amount may be validated against other criteria based at least in part on an other criteria ID.

At 1458, data is stored in a journal. At 1460, data is stored in an audit log. At 1462, data is stored in a distribution. At 1464, the distribution amount is decremented.

At 1466, the method may determine whether this is the last line of the accounting. If this is not the last line of accounting, then at 1468, the method may determine whether the distribution amount is equal to zero. If the distribution amount is not equal to zero, then execution may return to 1444 and processing for a next line of the accounting may begin.

The method may repeat 1444-1468 until processing for all lines of the accounting is complete and the distribution amount is not equal to zero.

If this is the last line of the accounting or the distribution amount is equal to zero, then at 1470, data may be stored in the register. At 1474, data may be stored in the cash journal. At 1474, the method may end.

Figure 15:
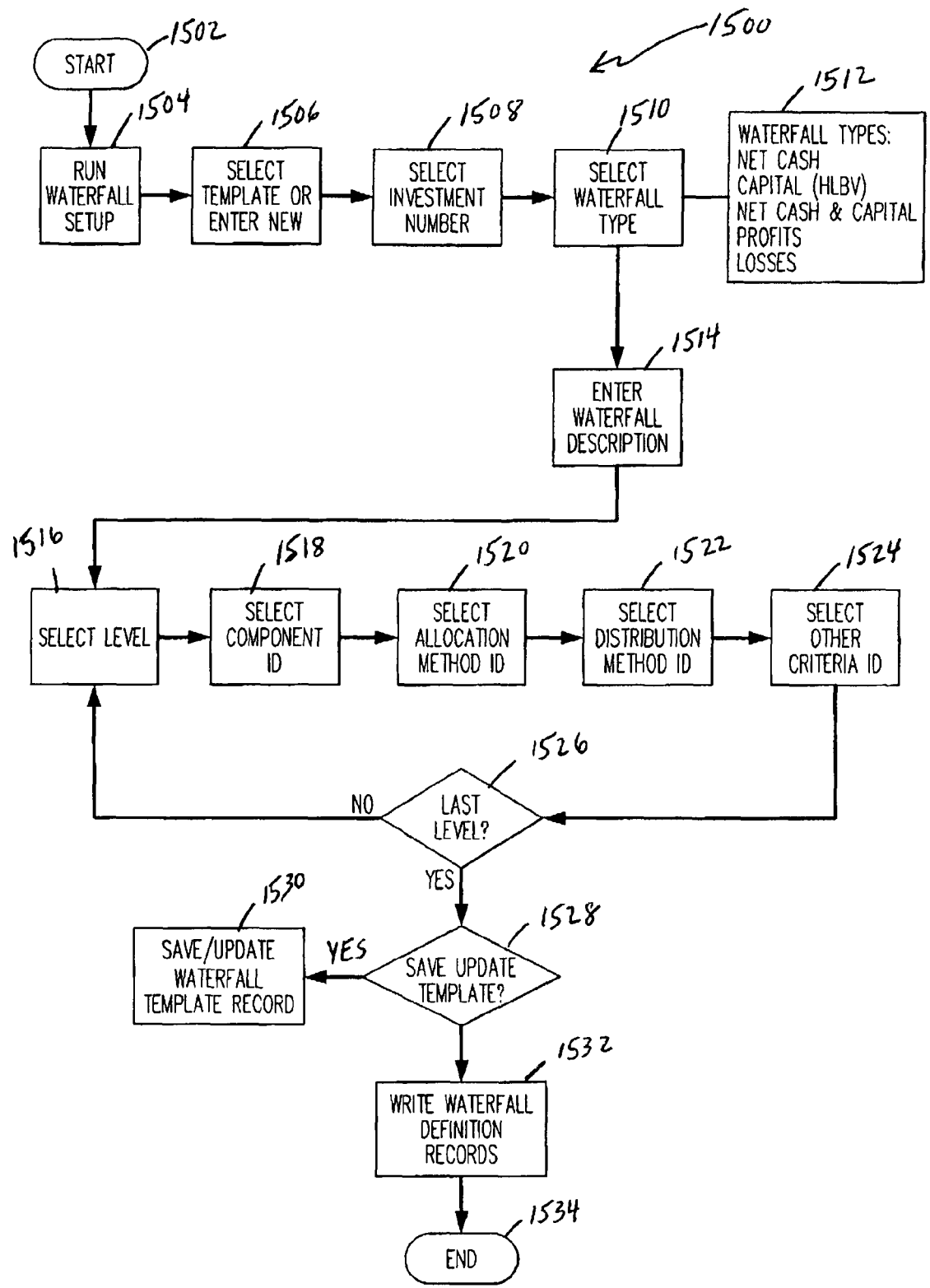
FIG. 15 is a flow chart of a method, in accordance with some embodiments.

FIG. 15 is a flow chart of a method 1500 according to some embodiments. In some embodiments, one or more portions of the method may be performed by the processing system 106 (FIG. 1). In some embodiments, one or more portions of the method may be used in setting up a waterfall.

Referring to FIG. 15, the method may start at 1502. At 1504, a program to setup a waterfall may be initiated. The program may be initiated by an administrator (or other user). At 1506, a template may be selected or a new template may be entered. In some embodiments, the administrator may be prompted to specify and/or may specify the template or enter the new template. At 1508, an investment, for which to perform accounting, may be selected. In some embodiments, an administrator may be prompted to select and/or may select the investment. At 1510, a type of waterfall may be selected. In some embodiments, the administrator may be prompted to select and/or may select the type of waterfall. As indicated at 1512, different types of waterfalls may include net cash, capital (HLBV), net cash & capital, profits and losses. At 1514, a waterfall description may be entered. In some embodiments, the administrator may be prompted to enter and/or may enter the waterfall description.

At 1516, a level may be selected. In some embodiments, an administrator may be prompted to select and/or may select the level. At 1518, a component ID may be selected. In some embodiments, the administrator may be prompted to select and/or may select the component ID. At 1520, an allocation method ID may be selected. In some embodiments, an administrator may be prompted to select and/or may select the allocation method ID. At 1522, a distribution method ID may be selected. In some embodiments, the administrator may be prompted to select and/or may select the distribution method ID. At 1524, other criteria ID may be selected. In some embodiments, an administrator may be prompted to select and/or may select the other criteria ID.

At 1526, the method may determine whether this is the last level of the waterfall. In some embodiments, an administrator may be prompted to specify whether this is the last level. If this is not the last level, then execution may return to 1516 and selections for a next level of the accounting may begin.

If this is the last level of the waterfall, then at 1528, the method may determine whether the template is to be saved/updated. In some embodiments, an administrator may be prompted to specify whether the template is to be saved/updated. If the template is to be saved/updated, then at 1530, the method may save/update the template. If the template is not to be saved/updated, then at 1532, the method may write waterfall definition records.

The method may repeat 1516-1526 until at 1526, the method determines that last level of the waterfall has been selected.

The method may end at 1534.

Figure 16A:
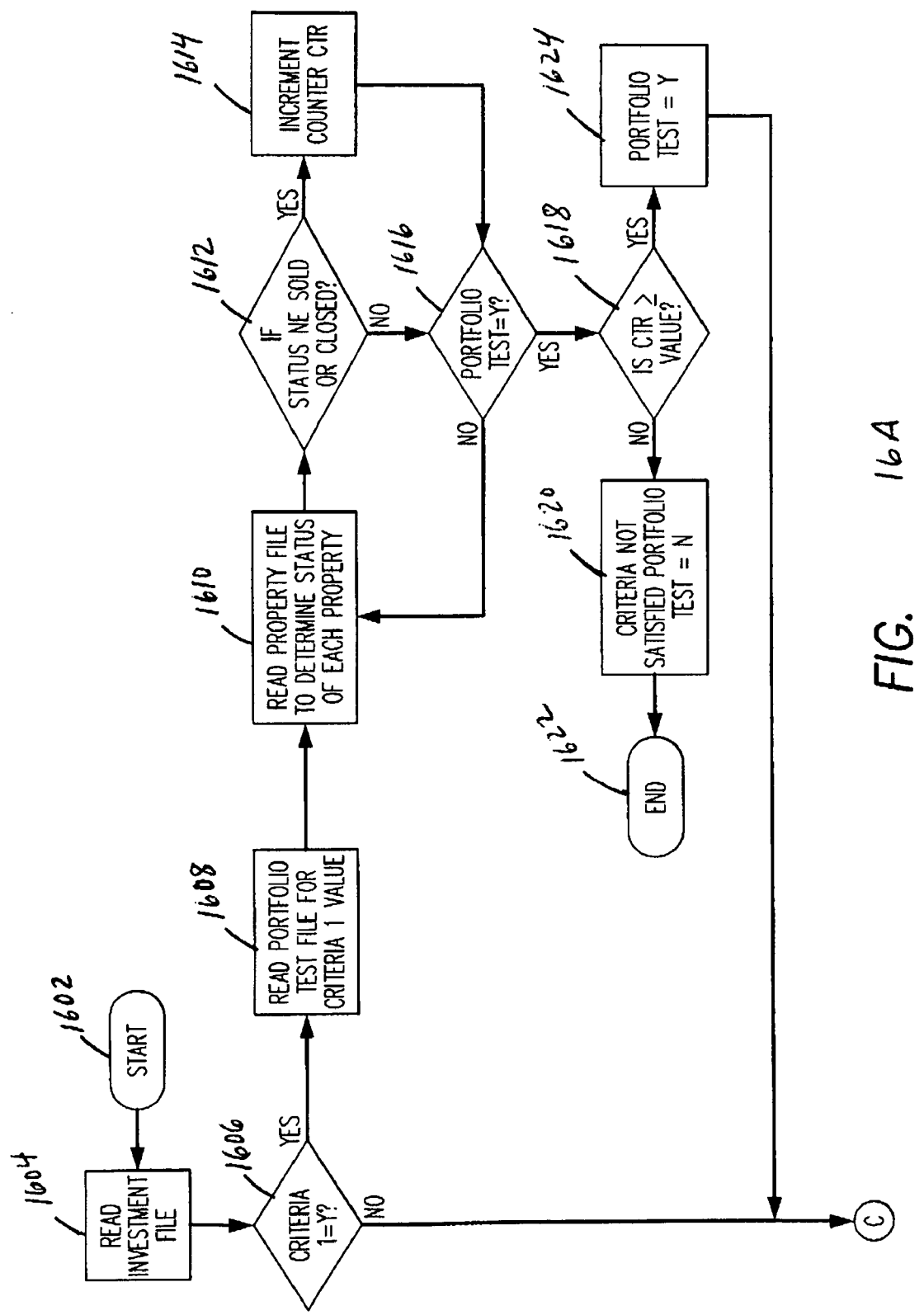
FIGS. 16A-16C are a flow chart of a method, in accordance with some embodiments.
Figure 16B:
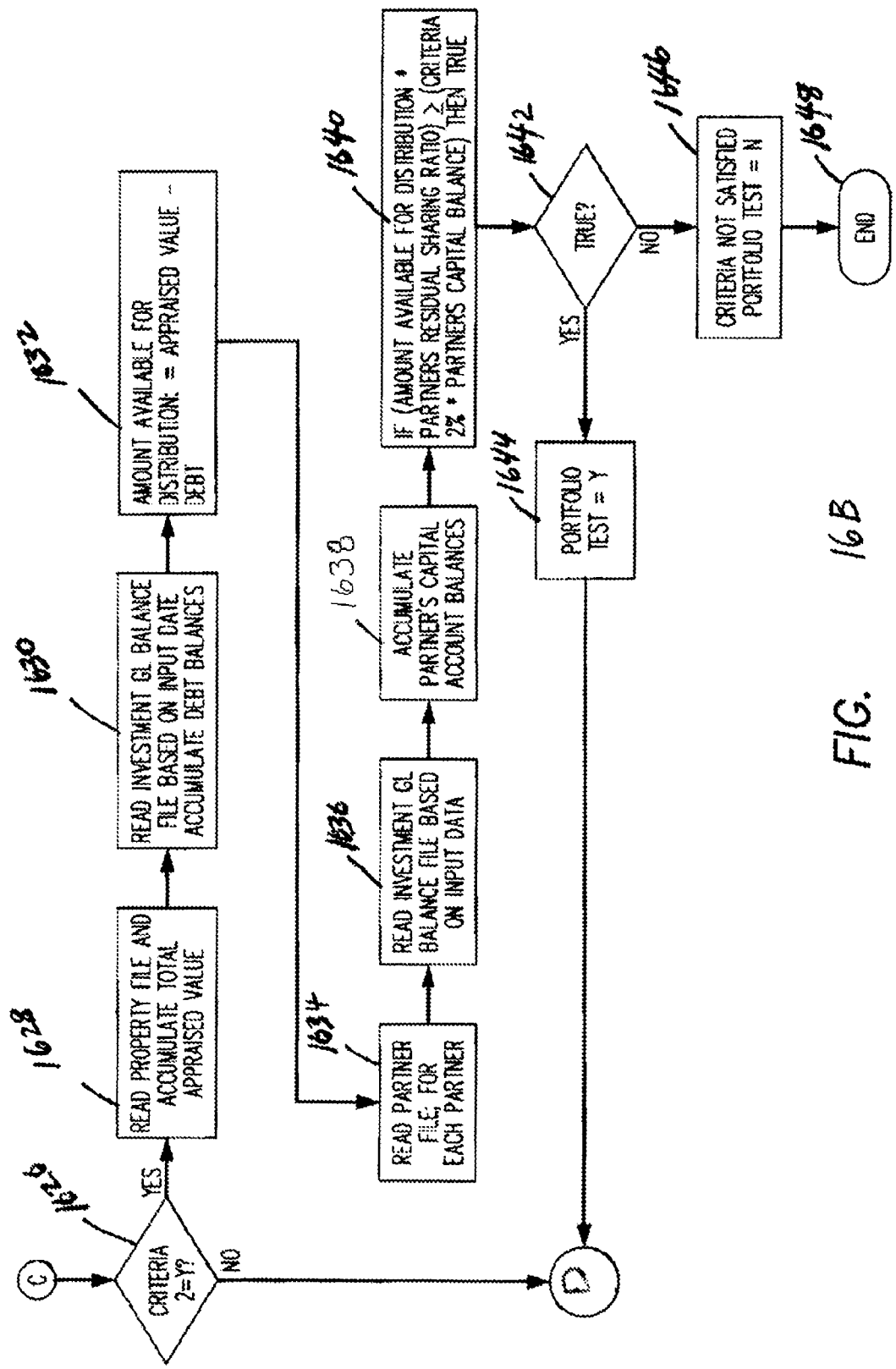
Figure 16C:
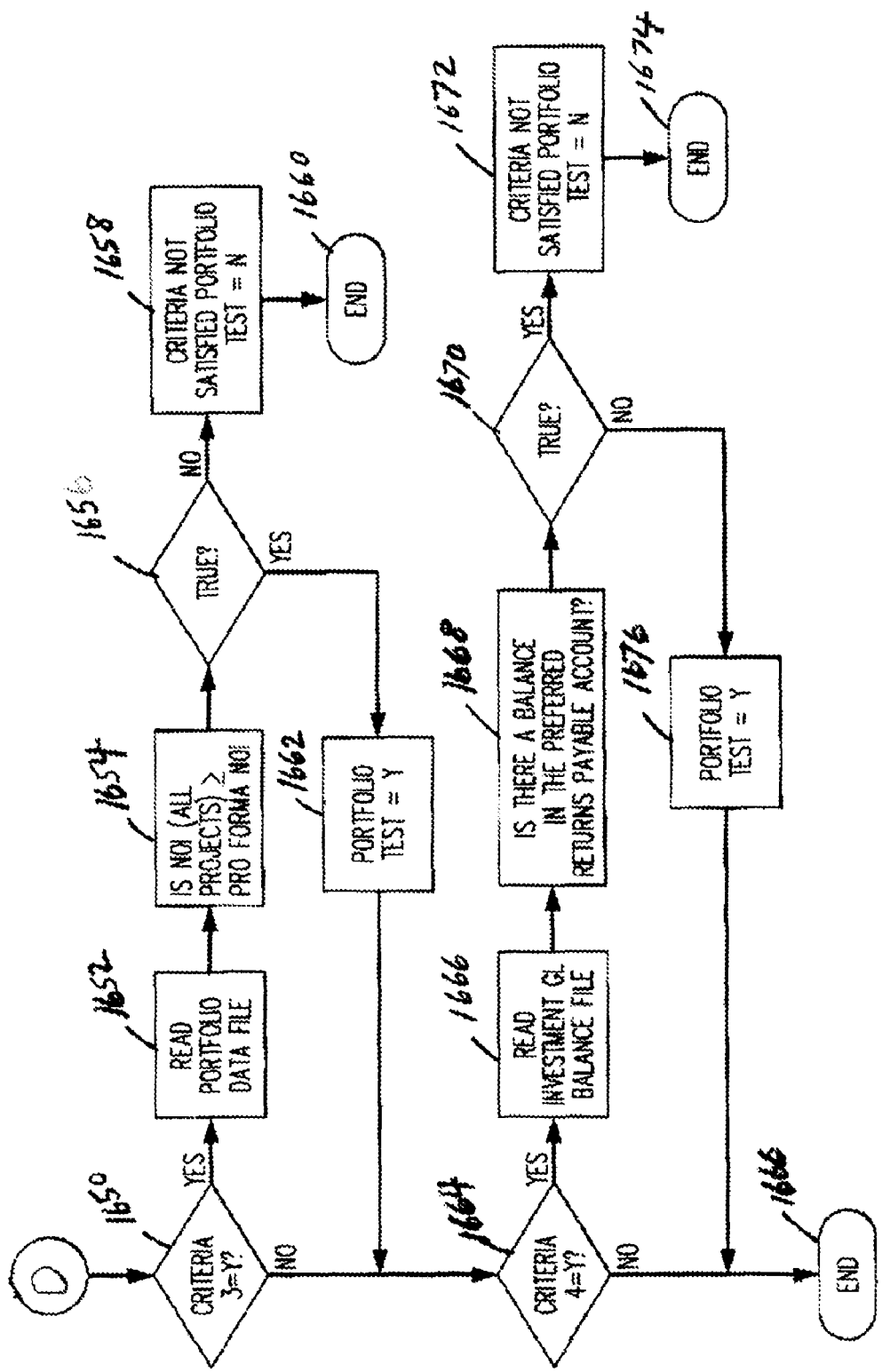

FIGS. 16A-16C are a flow chart of a method 1600 according to some embodiments. In some embodiments, one or more portions of the method may be performed by the processing system 106 (FIG. 1). In some embodiments, the method may be used to perform a portfolio test. As described hereinafter, in some embodiments, data may be requested from and supplied by an administrator (or other user). However, unless stated otherwise, data may be supplied by any source(s) of data.

Referring to FIG. 16A, the method may start at 1602. At 1604, an investment file may be read. At 1606, the method may determine whether a variable, referred to herein as criteria, has a value equal to 1. If criteria has a value equal to 1, then at 1608, the method may read a portfolio test file for the value of criteria. At 1610, the method may read a property file to determine a status of each property. At 1621, the method may determine whether the status is not equal to sold or closed. If the status is equal to sold or closed, then at 1614, the method may increment a counter referred to herein as CTR. At 1616, the method may determine whether portfolio test is equal to "Y". If portfolio test is not equal to "Y", then execution may return to 1610.

If portfolio test is equal to "Y", then at 1618, the method may determine whether the counter CTR has a value greater than equal to the value of a variable referred to herein as value. If the counter CTR does not have a value greater than or equal to the value of the variable value, then at 1620, the method may set satisfied portfolio test to "N" and the method ends at 1622. If at 1618, the counter CTR is greater than or equal to the value of the variable value, then at 1624, portfolio test is set equal to "Y".

After setting portfolio test at 1624, and if at 1606 the value of criteria is not equal to 1, then execution proceeds to 1626 (FIG. 16B).

Referring to FIG. 16B, at 1636, the method determines whether criteria has a value equal to 2. If criteria has a value equal to 2, then at 1628, the method may read a property file and accumulate a total appraised value. At 1630, the method reads an investment GL balance file based on input date accumulated debt balances.

At 1632, the method may set the value of a variable referred to herein as distribution is equal to the value of appraised value minus debt.

At 1634, the method read a investment GL balance file based on the input data. At 1638, the method may accumulate the partner's capital account balances.

At 1640, if the product of amount available for distribution and partners residual sharing ration is greater than or equal to criteria 2%*partners capital balance then the method sets the value of a variable, referred to herein as true, equal to "TRUE". At 1642, the method determines whether value is equal to "TRUE". If true is not equal to "TRUE", then at 1646, the method sets portfolio test to "N" and execution proceeds to 1648 and execution ends.

If at 1642, true is equal to "TRUE", then at 1644, the method sets portfolio test to "Y" and execution jumps to 1650 (FIG. 16C). Execution also jumps to 1650 (FIG. 16C) if at 1636, criteria does not have a value equal to 2.

Referring to FIG. 16C, at 1650, the method may determine whether criteria has a value equal to 3. If criteria has a value equal to 3, then at 1652, the method may read a portfolio data file. At 1654, the method may determine whether NOI for all projects is greater than or equal to pro form a NOI and if not, at 1658, the method sets portfolio test equal to "N" and execution ends at 1660.

If at 1656, the method determines that NOI for all projects is greater than or equal to pro form a NOI, then at 1662, the method sets portfolio test equal to "Y". At 1664, the method may determine whether criteria has a value equal to 4. If criteria does not have a value equal to 4, then at 1666, execution ends.

If at 1664, criteria has a value equal to 4, then at 1666, the method may read an investment GL balance file. At 1668, the method may determine if there is a balance in the preferred returns payable account, and if so, at 1672, the method may set portfolio test equal to "N" and execution ends at 1674.

If at 1670, there is not a balance in the preferred returns payable account, then at 1676, the method may set portfolio test equal to "Y" and execution may proceed to 1666.

Figure 17A:
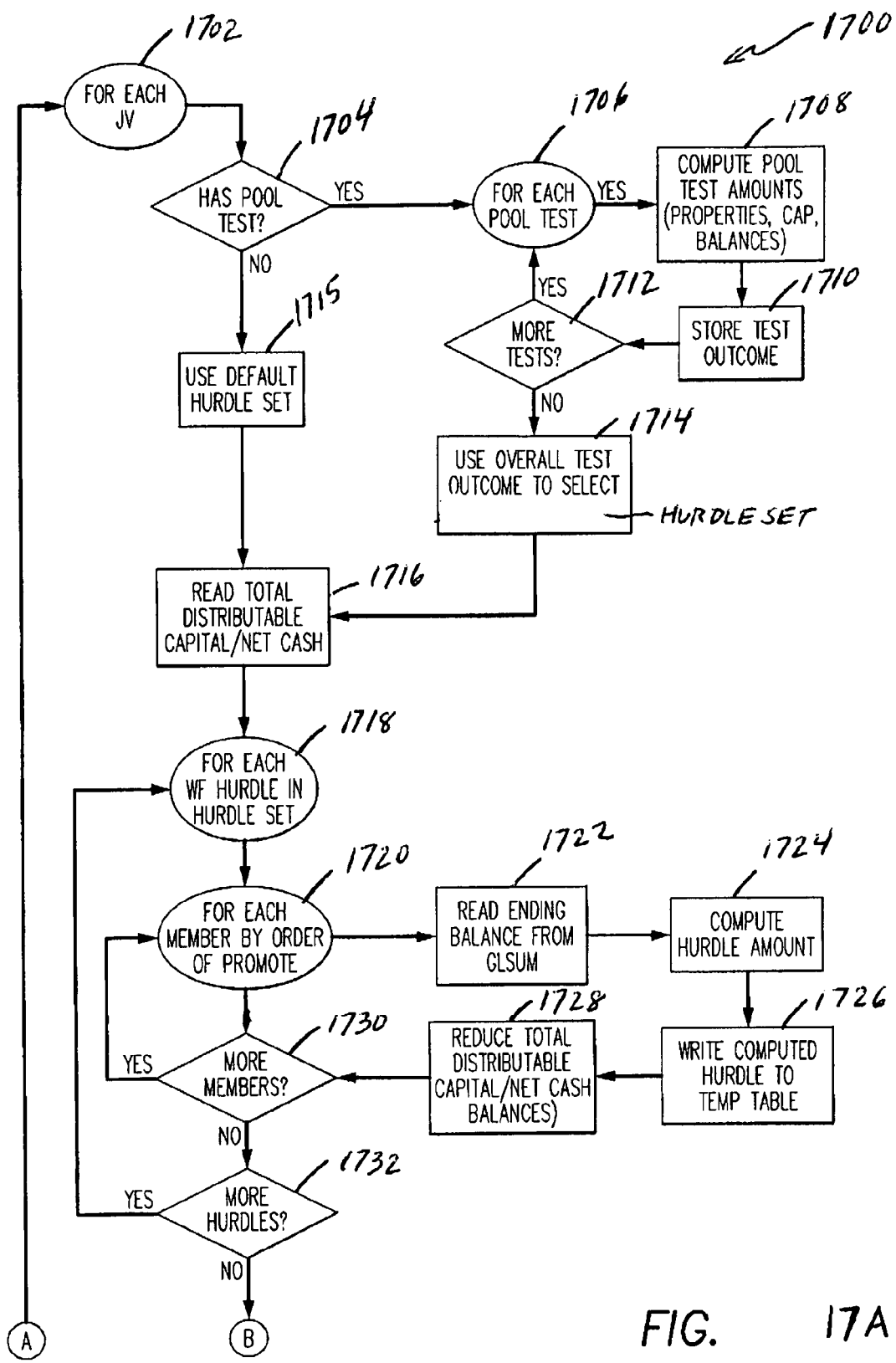
FIGS. 17A-17B are a flow chart of a method, in accordance with some embodiments.
Figure 17B:
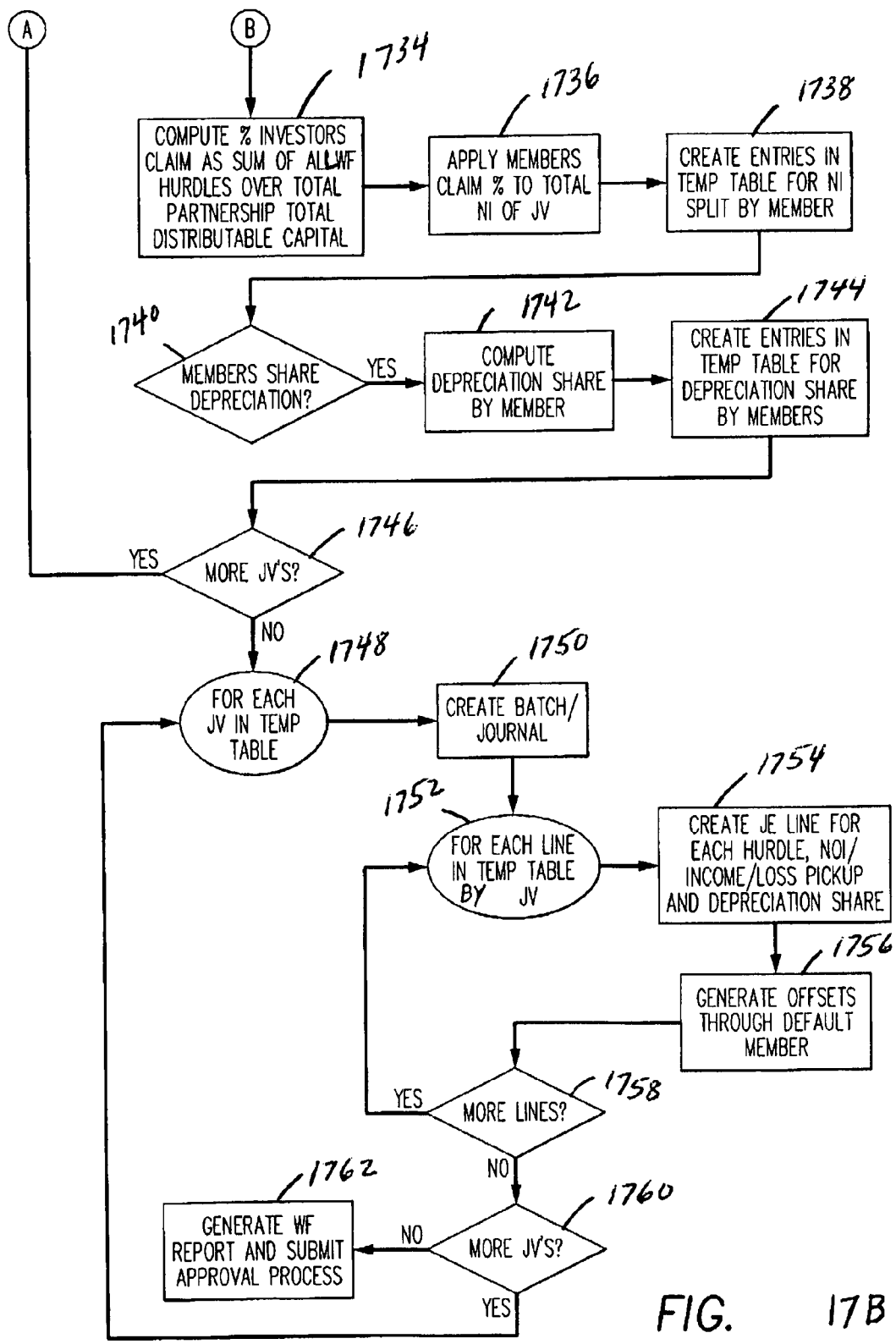

FIGS. 17A-17B are a flow chart of a method 1700 according to some embodiments. In some embodiments, one or more portions of the method may be performed by the processing system 106 (FIG. 1). In some embodiments, the method may be used to perform a waterfall calculation.

Referring to FIG. 17A, the method may start at 1702 for a first joint venture. At 1704, the method may determine whether the joint venture has a pool test. If the joint venture does not have a pool test, the method may proceed to 1706 for a first pool test, and at 1708, the method may compute pool tests amounts for properties, capital contributions and balances. At 1710, the method may store a test outcome. At 1712, the method may determine whether there are more pool tests. If the method determines that there are more pool tests, then execution may return to 1706. The method may repeat 1706-1712 until all the pool tests have been computed and outcomes have been stored.

If at 1712, the method determines that there are no more pool tests, then at 1714, the method may use an overall test outcome to select a hurdle set and execution proceeds to 1716.

If at 1704, the method determines that the joint venture does not have a pool test, then at 1715, the method selects a default hurdle set and execution proceeds to 1716.

At 1716, the method may read the total distributable capital/net cash. The method may proceed to 1718 for a first hurdle in the hurdle set, and may proceed to 1720 for a first member by order of promote. At 1722, the method may read ending balance from GLSUM. At 1724, the method may compute a hurdle amount. At 1726, the method may write the computed hurdle to a temp table. At 1728, the method may reduce the total distributable capital/net cash balances. At 1730, the method may determine whether there are more members in the joint venture. If there are more members, execution may return to 1720 for the next member. The method may repeat 1720-1730 until there are no more members, i.e., a hurdle amount has been computed and written and the total distributable capital/net cash balances have been reduced for each member.

If at 1730, the method determines that there are no more members, then at 1732, the method may determine whether there are more hurdles in the hurdle set. If there are more hurdles, at execution may return to 1718 for the next hurdle. The method may repeat 1718-1732 until there are no more hurdles.

If at 1732, the method determines that there are no more hurdles, then at 1734 (FIG. 17B), the method computes percent inventors claim as sum of all hurdles over the total partnership and total distributable capital.

Referring to FIG. 17B, at 1736, the method may apply the members percent claim to the total NI of the joint venture. At 1738, the method may create entries in a temp table for NI split by member. At 1740, the method may determine whether the members share depreciation. If so, at 1742, the method may compute depreciation shares by member. At 1744, the method may create entries in the temp table for the depreciation shares by member. At 1746, the method may determine whether there are more joint ventures. If there are more joint ventures, execution may return to 1702 (FIG. 17A). The method may repeat 1702-1746 until there are no joint ventures.

If at 1746, the method determines that there are no joint ventures, execution continues at 1748 for a first joint venture in the temp table. At 1750, the method creates a batch/journal. Execution continues at 1752 for a first line in the temp table by joint venture. At 1754, the method creates a journal entry line for each hurdle, NOI, income, loss pickup and depreciation share. At 1756 the method generates offsets through a default member.

At 1758, the method may determine whether there are more lines. If there are more lines, execution may return to 1752. The method may repeat 1752-1758 until there are no more lines.

If at 1758, the method determines that there are no more lines, then at 1760, the method may determine whether there are more joint ventures. If there are more joint ventures, execution may return to 1748. The method may repeat 1748-1760 until there are no more joint ventures.

If at 1760, the method determines that there are no joint ventures, then at 1762, the method may generate a waterfall report and submit the report to the approval process.

Figure 18:
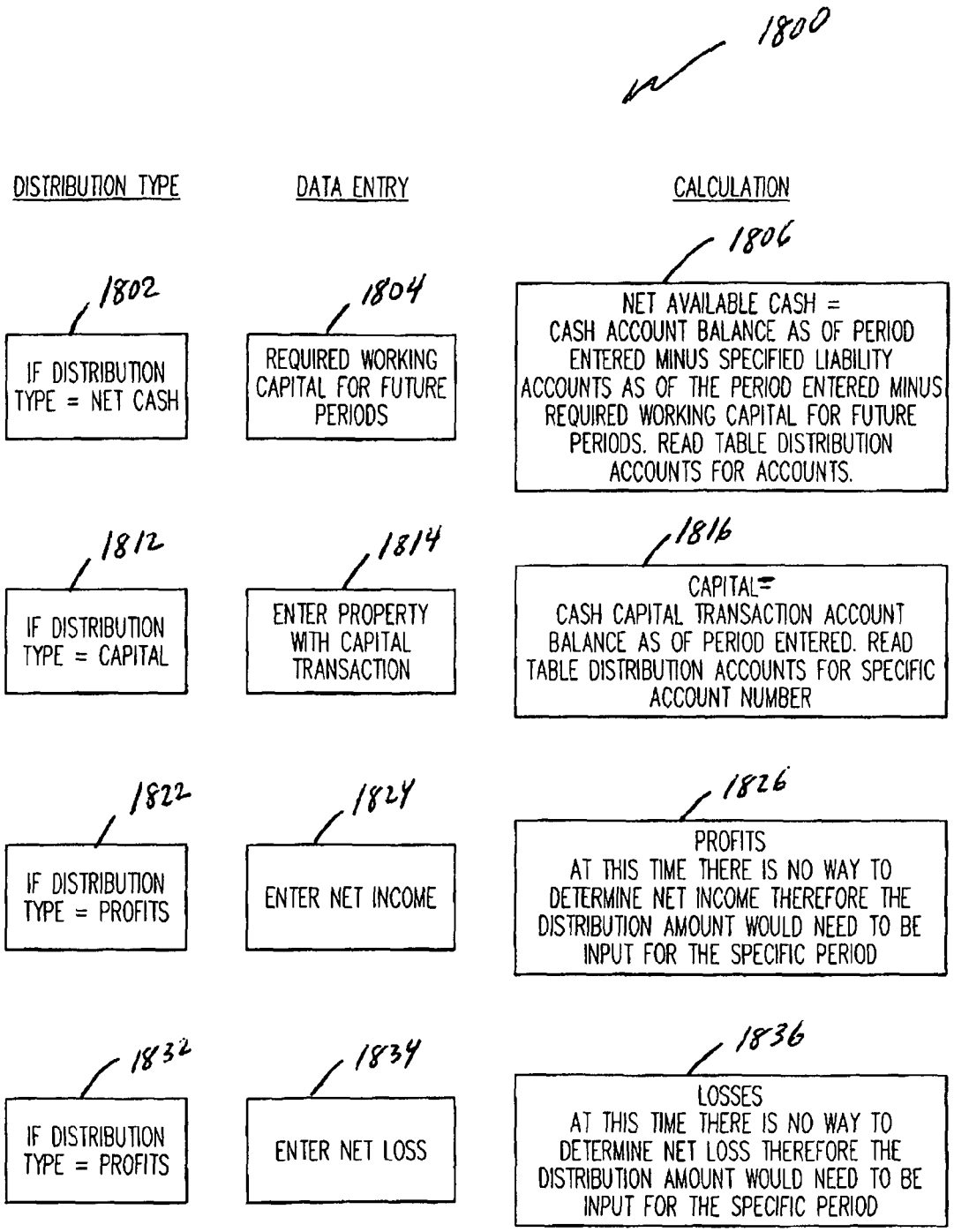
FIG. 18 is a flow chart of a method, in accordance with some embodiments.

FIG. 18 is a flow chart of a method 1800 according to some embodiments. In some embodiments, one or more portions of the method may be performed by the processing system 106 (FIG. 1). In some embodiments, the one or more portions of the method may be used in a waterfall. In some embodiments, one or more portions of the method may be used in determining a distributable amount.

Referring to FIG. 18, at 1802, if the distribution type is equal to net cash, then at 1804, the method may determine that there is required working capital for future periods. At 1806, the method may determine that net available cash is equal to the cash account balance as of the period entered less specified liability accounts of the period entered and less required working capital for future periods. The method may read the table distribution accounts for accounts.

At 1812, if the distribution type is equal to capital, then at 1814, a property with a capital transaction may be entered. In some embodiments, an administrator and/or another user may be prompted to enter the property. At 1816, the method may determine that capital is equal to a cash capital transaction account balance as of the period entered. The method may read table distribution accounts for a specific account number.

At 1822, if the distribution type is equal to profits, then at 1824, net income may be entered. In some embodiments, an administrator and/or another user may be prompted to enter the net income. At 1826, the method may determine that at this time, there is no way to determine net income, therefore, the distribution amount would need to be input for the specific period, and no calculation may be performed.

At 1832, if the distribution type is equal to profits, then at 1834, net loss may be entered. In some embodiments, an administrator and/or another user may be prompted to enter the net loss. At 1836, the method may determine that at this time, there is no way to determine net loss, therefore, the distribution amount would need to be input for the specific period, and no calculation may be performed.

Figure 19:
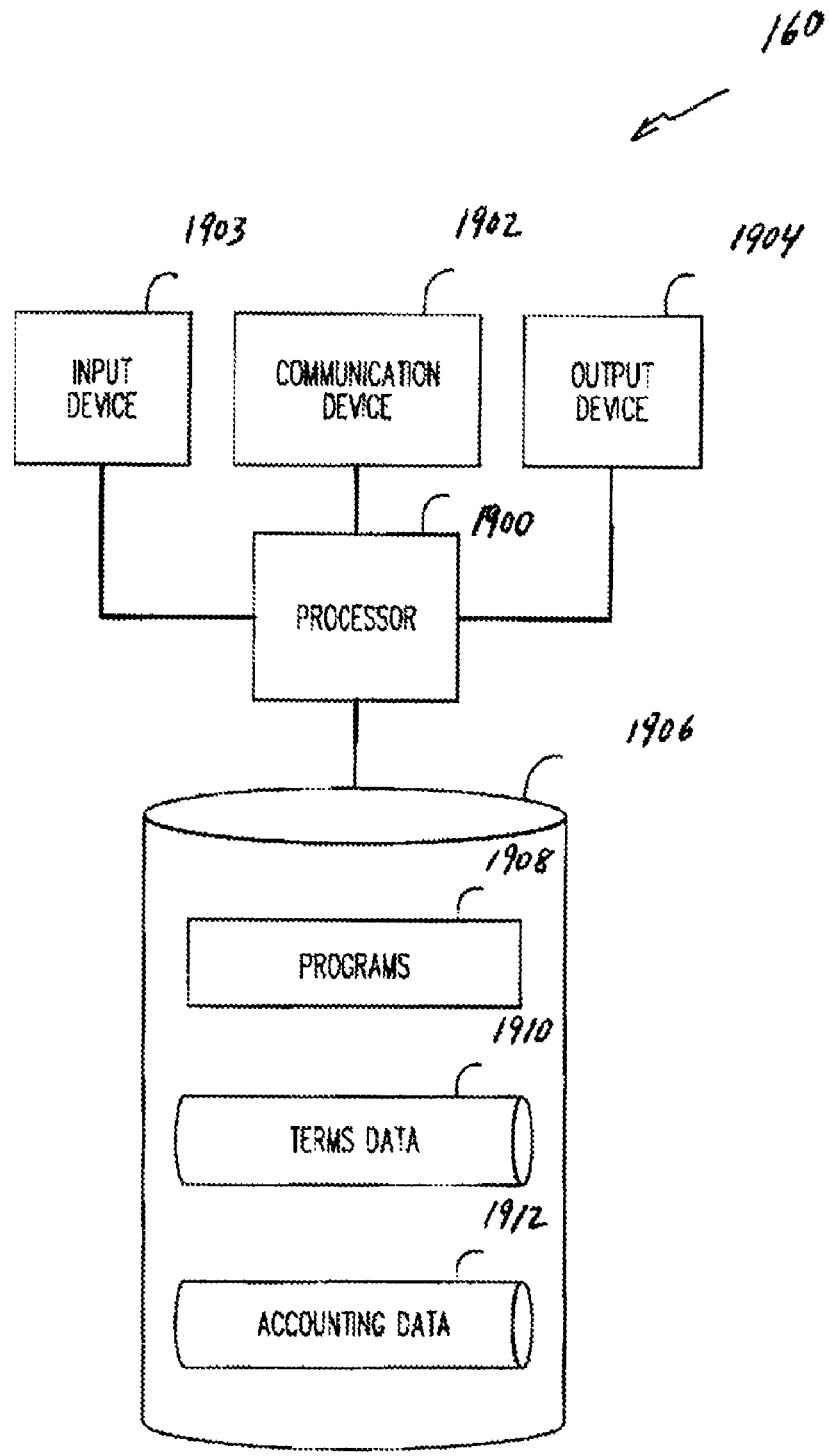
FIG. 19 is a block diagram of a processing system, in accordance with some embodiments.

FIG. 19 is a block diagram of one embodiment of the processing system 106. Referring to FIG. 19, in this embodiment, the processing system 106 includes a processor 1900 operatively coupled to a communication device 1902, an input device 19019, an output device 1904 and a storage device 1906. The communication device 1902 may be used to facilitate communication with other devices and/or computers 104-1 to 104-n of the one or more entities 102-1 to 102-n.

The input device 19019 may comprise, for example, one or more devices used to input data and information, such as, for example: a keyboard, a keypad, a mouse or other pointing device, a microphone, knob or a switch, an infra-red (IR) port, etc. The output device 1904 may comprise, for example, one or more devices used to output data and information, such as, for example: an IR port, a docking station, a display, a speaker, and/or a printer, etc. The storage device 1906 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 1906 may store one or more programs 1908, which may include one or more instructions to be executed by the processor 1900 to perform one or more portions of a joint venture and/or one or more portions of one or more embodiments of one or more processes disclosed herein.

In some embodiments, one or more of the one or more programs 1908 may include one or more criteria that may be used in carrying out one or more portions of one or more joint venture and/or one or more portions of one or more embodiments of one or more processes disclosed herein.

In some embodiments, storage device 1908 may store one or more databases, including, for example, terms data 1910 for one or more joint ventures and/or accounting data 1912 for one or more joint ventures. In some embodiments, one or more of the databases may be used in carrying out one or more portions of a joint venture and/or one or more portions of one or more embodiments of one or more processes disclosed herein.

Other programs and/or databases may also be employed. In some embodiments, one or more of the one or more databases may comprise a relational database or other type of database.

In some embodiments, one or more of the one or more programs 1908 may be configured as a neural-network or other type of program using techniques known to those skilled in the art.

The terms data may be received from any source(s). In some embodiments, the data may be received from one or more sources within the processing system 106. In some embodiments, data may be received via the communication device 1902. In some embodiments, data may be received from the storage device 1906. In some embodiments, terms data may be supplied by a user via a user interface. In some embodiments, a user interface may comprise a graphical user interface. In some embodiments, the data may be received from one or more sources outside the processing system 106. In some embodiments, the data may be receive from one or more sources within the processing system and one or more outside the processing system 106. In some embodiments, data may be received from a combination of two or more of the above. In some embodiments, data may be received from one or more sources in lieu of and/or in addition to one or more of the sources described herein.

In some embodiments, processing system 106 may be in communication with, or have access to, market data (e.g., via communication device 1902).

In some embodiments, processing system 106 may be operated by one or more administrators carrying out one or more portions of one or more joint ventures. In some embodiments, processing system 106 may be operated by a financial institution carrying out one or more portions of one or more joint ventures.

In some embodiments, the processing system 106 may comprise an engine 204 that provides one, some or all of the following capabilities: defining a contract, via a wizard/configuration step process, applying standard calculations of waterfall hurdles across all contracts, entities, partnerships and properties, computing investors claims per partnership or property, computing investors claims on unposted YTD Journals—to support the running of waterfall process against pre-posted received financial statements from partners, computing investors claims on ending balances—where waterfall is to be run against partnerships which are managed directly, generating journal entry containing entries to book based upon incremental movements for (i) each hurdle within a waterfall, the total percentage investors claim (statistical account), (ii) the income/loss pickup by investor/member of partnerships, (iii) the increase or decrease in capital of the partnership (offset to gain/income pickup) by member, and (iv) share of depreciation and other expense as defined within the contract, generating a waterfall report—to support approval processing and acceptance of financial statements received from partnerships or the inverse, generating a submission to an approval process.

In some embodiments, a waterfall setup, configuration, changes and/or running are the responsibility of a submitting partner and/or other user. In some embodiments, based upon the business process and any requirement to ensure that the data structures remain consistent, there may be two levels of configuration In some embodiment, a first level of configuration allows a system administrator to complete the basis of the joint venture setups, for example venture code (venture segment of chart of accounts), sharing ratios, properties, portfolio testing, etc. In some embodiments, on completion of this setup the partners will then, via their access rights to the system, automatically be able to access and approve or request changes to the base configuration. In some embodiments, this approach ensures that the correct data structures, chart of accounts and mapping configurations are deployed for each venture.

In some embodiments, a second level of configuration is the waterfall and its hurdles. In some embodiments, this definition is to be completed by a partner and/or other user. In some embodiments, following review of the JV configuration, performed by a system administrator, the partner and/or other user then setup and configure the JV waterfall. In some embodiments, this process includes defining the waterfall Hurdles which are used to compute the "Investors Claim". In some embodiments, the partner is not able to create new contribution, distribution and other types as these components have impact on the accounting entries and/or data elements and process. In some embodiments, if a partner and/or other user requires additional types of data components, such as contributions, such partner and/or other user need to request these of an administrator. In some embodiments, it is unlikely that this occurs because the administrator sets up the joint venture based upon the joint venture agreement, and thus is aware of any specific contractual clauses which would require the creation of new chart of account values or other critical data components.

In some embodiments, when a partner and/or other user has completed the configuration of the waterfall, it would be desirable to run a test of the waterfall to review and approve the results and to ensure that the waterfall is configured correctly. In some embodiments, this requires that the partner and/or other user enter dummy values, potentially, as test data to be run through the waterfall, for example the "residual distributable capital", contributions of members etc.

In some embodiments, waterfall hurdles during the waterfall process are required to generate transactions. In some embodiments, these amounts are booked as additional journal entries within their respective preferred return account, by capital contribution type. In some embodiments, the aggregation of capital contribution and preferred return accounts is known as the total capital contribution, by type. For example "total initial capital contributions" is the sum of the initial capital contributions account and initial capital contributions preferred return account, less any capital contributions which have been distributed.

In some embodiments, members make capital contributions in cash (initial capital contributions) with respect to each project. Initial capital contributions may be made up to the "maximum funding commitment". In some embodiments, after these contributions are met, the rest of the capital contributions are classified as additional capital contributions.

In some embodiments, additional capital contributions are cash contributions provided to the "capital of the partnership" made on behalf of the active members of the partnership, following the initial capital contributions or project capital contributions.

In some embodiments, cost overrun capital contributions are those additional capital injections which are hurdled during projects which have cost overruns. Investors and members may apply differing preferred return rates to cost overrun capital contributions. In some embodiments, the chart of accounts definition has a specific account which is used for the storage of this information as for each joint venture member.

In some embodiments, developer priority capital contributions are specific to contracts where there is development or construction as part of the partnership agreement. These are specific agreement items which reflect the developer's claims in partnerships.

In some embodiments, if any member that fails to make timely contributions is considered a delinquent member. In some embodiments, the other members, "non-delinquent members", may contribute the delinquent members additional capital contributions, as a loan, into the partnership. In some embodiments, these default capital contributions are interest bearing, based upon rates within the agreement, and are subject to preferred returns to the contributing member.

There may be various other types of contributions, over and above the contribution types, above, which are common to contractual agreements. It is important that a generic approach to the creation of new contribution types, their supporting accounts within the system and computations when applied to hurdles are taken into account.

In some embodiments, each type of Capital Contribution (identified by an account within the chart of accounts) is defined within the contractual joint venture agreement. In some embodiments, the chart of accounts definition has a specific account which is used for the storage of all of the above information as for each joint venture member.

As stated above, in some embodiments, there may be numerous members of a joint venture. In some embodiments, the system chart of accounts provides for delineation of the JV, property within the JV, natural accounting segment and other analysis fields. In some embodiments, one of the analysis segments contains a reference to a partner within the joint venture, so as, for example to provide a split of the contributions, distributions, preferred returns and income/gain share, by partner. This approach enables a roll forward of balances by partner. In some embodiments, this is critical to the waterfall hurdle calculations. In some embodiments, each member and their contributions are recorded separately; requirement of contract, thus computing the preferred returns for each partner is possible.

In some embodiments, the members equity contributions and distributions are recorded by joint venture and property, Property (where applicable) and member, within the financial statements and chart of accounts. In some embodiments, the date of the distribution is also captured, as this is relevant for the computation of outstanding days for preferred returns associated with the contribution type.

In some embodiments, the basis of breaking out each contribution within the current year is so that a date of contribution is also populated, the date of the contribution is a key driver to the computation of preferred returns within the waterfall hurdle process. The daily average basis can then accurately be computed.

In some embodiments, from a chart of accounts perspective, the opening year and current year contributions and distributions are captured within separate accounts. In some embodiments, this enables the contributions for previous year(s) and current year to be broken out, allowing for additional analytics and validation.

As stated above, in some embodiments, an internal rate of return (IRR rate) is specified within a joint venture contract. In some embodiments, the IRR is a percentage of cash flow, at a point in time, derived from the partnership, properties or other entities. In some embodiments, depending on the contractual terms, the IRR is applied to the contributions made by partners at a percentage rate. For example, a rate may be applied to the contributions made by partners within a 12 month period (if sold within that 12 month period) whereas a differing rate may be applied if the property is not sold within a 12 month period. In some embodiments, depending on the contractual terms, the IRR is applied to the contributions made by partners and distributions to the partners at a percentage rate.

In some embodiments, the system includes a function to calculate an IRR threshold. This function may be embedded in the definition of a specific hurdle(s) during the contract setup and is based at least in part on some or all of the following input parameters:

target IRR—an IRR % to compute IRR threshold as of a balance sheet date input account group—an account or account ranges that will be queried by the function (e.g. initial capital contributions (ICC), additional capital contributions (ACC))

partnership entity—a partnership entity ID (if null, the function will retrieve all investors within the partnership and calculate the whole partnership IRR threshold investor entity—an investor entity ID (null signifies all investors)

department—a department code that denotes a waterfall entry point entity, If investor entity is not empty, it means all properties if nothing passed in.

balance sheet date—a date that the waterfall is executed data type—data type can be actual, estimate or budget, where actual and estimate data types indicate that transactions should be retrieved from a journal table, and budget data type indicates that transactions should be retrieved from one or more budget tables budget type—required if data type is budget.

The target IRR, input account group, partnership entity, investor entity, and department may be derived from the hurdle configuration for the waterfall. The balance sheet date, data type and budget type may be supplied by a user at a time that a waterfall is run.

In accordance with some embodiments, the function receives information indicative of relevant transactions and calculates an amount of a cash flow required to reach the target IRR as of the balance sheet date. In some embodiments, the function retrieves a data entry date and a functional currency amount for all contribution and distribution transactions in one or more general ledger (GL) transaction tables, and calculates the threshold as of the balance sheet date.

For example, in a joint venture having two partners, a first one of the partners may make contributions and distributions and as follows:

| Data Entry Date | Contribution and Distribution Amount |
| --- | --- |
| Jan. 15, 2004 | (135,000,000) |
| Mar. 26, 2004 | (11,091,703) |
| Apr. 30, 2004 | 5,763,649 |
| Jun. 30, 2005 | (1,436,120) |
| Jul. 31, 2004 | (1,368,291) |
| Aug. 31, 2004 | (1,175,182) |
| Sep. 30, 2004 | (714,930) |
| Oct. 31, 2004 | (1,237,395) |
| Nov. 5, 2004 | 738,271 |
| Nov. 30, 2004 | (684,474) |
| Dec. 30, 2004 | 3,821,223 |
| Jan. 31, 2005 | 790,336 |

-continued

| Data Entry Date | Contribution and Distribution Amount |
|---|---|
| Feb. 28, 2005 | (829,778) |
| Apr. 30, 2005 | 968,920 |
| Jun. 6, 2005 | (761,420) |
| Jun. 30, 2005 | (1,051,641) |
| Aug. 7, 2005 | 1,174,591 |
| Nov. 7, 2005 | 5,565,014 |
| Jan. 24, 2006 | 330,695 |
| Mar. 7, 2006 | (957,973) |
| Apr. 3, 2006 | (957,973) |
| Apr. 19, 2006 | 801,262 |
| Jul. 17, 2006 | 638,311 |
| Sep. 13, 2006 | 629,932 |
| Oct. 16, 2006 | 930,551 |
| Dec. 8, 2006 | 5,725,278 |

The agreement for the joint venture may specify that until the first partner has an IRR=8.25%, the cash flow is to be split 75% and 25% between the first partner and the second partner, respectively. Thus, one of the hurdles in the waterfall may specify that until the first partner has an IRR=8.25%, the cash flow is to be split 75% and 25% between the first partner and the second partner, respectively. On Mar. 31, 2007, there may be 250 MM available to distribute.

Based on the input parameters, the IRR threshold function retrieves information indicative of the relevant transactions (which in this example are the contributions and distributions listed above) and calculates the IRR threshold as the amount of the last cash flow required to hit the target IRR as of the balance sheet date (which in this example is Mar. 31, 2007). In this example, the IRR threshold will be 169,564,932. Note that based on the agreement, and because 75% of the 250 MM available to distribute (i.e. 250 MM*75%=187.5 MM) is greater than the calculated IRR threshold (i.e., 169,564,932), the second partner will record (169,564,932/75%)*25%=56,521,444.

In some embodiments, the IRR threshold function is employed in (e.g., used in the configuration of) one or more hurdles of one or more waterfalls.

In some embodiments, the IRR threshold function is used to compute the IRR threshold for the partnership, a single investor, a sub partnership, or a single property.

In some embodiments, the IRR threshold function is a user defined function implemented in a structured query language (SQL).

In some embodiments, the IRR can be taken by members based upon other hurdles, calculations, preferred return amounts and/or other thresholds. An example of this could be a hurdle which uses the IRR rather than the preferred return, if the preferred return is less than the return which would be distributable using the IRR. In some embodiments, the IRR rate must be defined in the system. In some embodiments, the IRR rate is specified by each member and joint venture.

In some embodiments, preferred return rates are percentages which are used in the calculation of interest (or preferred returns) on an average daily balance basis, pertaining to the capital contributions made by members within the joint venture. Each type of capital contribution may have its own preferred return rate (percentage).

In some embodiments, preferred returns are a calculation of average interest, applied on an average daily balance basis multiplied by the preferred return rates referred to in the contractual agreement. In some embodiments, capital contributions are sourced from balances submitted within financial statements and are delineated by account within the chart of accounts.

In some embodiments, preferred returns can be computed and allocated to each member based upon the additional capital contribution preferred return rates, on an average daily balance basis, compounded quarterly or annually and computed each quarter. In some embodiments, the chart of accounts definition has a specific account which is used for the storage of this information as for each joint venture member. In some embodiments, for compounding, the contribution balance and preferred return to date on this contribution is used in computing the preferred returns. In some embodiments, the paid contributions is required to show that preferred returns were distributed from the partnership; hence the total contribution is contribution—paid contributions. In some embodiments, this is true of all accounts according to their specific accounts.

In some embodiments, preferred returns may be compounded on a quarterly or annual basis. This effects the calculation of the preferred return. Compounding the preferred return means computing the preferred return based upon the contribution (non-compounded) or on the contribution and the sum of the preferred returns (compounded). In some embodiments, the chart of accounts Account segment is used to delineate the owner equity, contribution and distribution balances received from the partners. In some embodiments, the partner is required to breakout the contributions and distributions for each partner and submit the contributions within the financial statements. In some embodiments, if the preferred return is compounded, on any basis, the waterfall computes the preferred return on either the sum of the contribution balance account or a combination of the contribution and preferred return accounts.

In some embodiments, on computation of preferred returns as part of the waterfall hurdles, computed amounts are created as transactions and booked into the respective preferred return accounts for each member of the JV, following approval from the partner(s). In some embodiments, this information or the bookings are effectively the output of the waterfall, or the investors claim. In some embodiments, these are broken out by waterfall hurdle. In some embodiments, a partner uses these numbers to apply to their books, and then resubmit their final financial statements.

In some embodiments, when a preferred return is paid, it is important that the date of the distribution/payment is captured. This date affects the interest calculation (preferred return calculation) as it affects the daily average balance of equity held by each member within the joint venture.

In some embodiments, it is important the payments of any preferred returns are clearly identified as an account or line item within collected financial statement. In some embodiments, a date should also be captured within the financial statement of the total payment or distribution.

In some embodiments, any payment or distribution of preferred returns reduces the overall capital contributions of any member, as follows.

XXX000000000—Initial Capital Contributions
XXX000000001—Initial Capital Contributions—Preferred Returns
XXX000000002—Initial Capital Contributions—Returns Paid In some embodiments, the aggregation of all of the above accounts equals the total initial capital contributions. In the above example the last three accounts are used to delineate the capital contribution, preferred return and preferred returns paid. The previous section of the account number denotes the section of the trial balance, in this case owners equity. In some embodiments, the dates of each contribution, preferred returns accrued and paid are required, as this feeds the next periods preferred returns calculation (average daily balance).

In some embodiments, returns on capital, which are not distributed, can, based upon contractual terms, be compounded at intervals throughout a financial year. The frequency of compounding undistributed returns can be defined as Monthly, Quarterly or Annually. In some embodiments, when returns are compounded, they are booked to a specific account, by entity, so as to allow, by hurdle, for the principle and compounded balances to be included in the calculation, or not, as the requirement may be. In some embodiments, the compounding is defined at the contractual level, hence for each entity/owner the frequency of the compounding of undistributed preferred returns are to be configured.

In some embodiments, the dates of all contributions and distributions are captured and used to define the preferred return rate calculations and the IRR calculations. In some embodiments, this date is used to determine the number of "outstanding days" between event date and current balance sheet date of the financial period. In some embodiments, the contribution date is a required field on the submitted financial statement; this for example can be a descriptive piece of information on the transactions submitted. In accordance with some embodiments, this date must always have been within the quarter that the information is submitted.

In some embodiments, the calculation of preferred returns on contributions is based upon an average daily balance and is computed much like interest, hence for contributions made prior to the current year, the following balance sheet date and ending date of prior year is used for the calculation of outstanding days, as follows. In some embodiments, for contributions/distributions made within the current year, the outstanding day's calculation uses the contribution/distribution date and balance sheet date, based upon the following formulae:

outstanding days=balance sheet date-ending date of previous financial year current year outstanding days=balance sheet date-contribution date+1(day of funding)

In some embodiments, this creates a requirement to store the actual date that a contribution is made during data collection. In some embodiments, each contribution, by contribution type is tested to see if the contribution date was made in the current financial year or prior years; the average balance calculation shall then be accurate.

In some embodiments, gross outstanding preferred returns, both accrued and compounded is computed and recorded each time the waterfall process is executed. In some embodiments, as with capital and other investor claims activity, the preferred returns accrued, compounded; is tracked at a partnership, sub partnership or property level. In some embodiments, all gross preferred returns accrued, compounded and promoted are recorded within the investor investment entities using, where applicable, department codes to track such returns at a sub partnership and/or property level in alignment with the JVA agreement.

In some embodiments, the preferred return calculations leverage preferred return rates, specified at the JVA level, and applied to outstanding capital on a daily average basis. In some embodiments, capital, being the basis of the preferred return calculation is tracked in the investor investment entities. In some embodiments, the waterfall process uses the contractual rates of preferred returns for their respective types, and obtain the average daily balances using and/or from the investor investment entities.

In some embodiments, the waterfall process uses the waterfall entry point (entity ID) to determine where to obtain the average daily balance. In some embodiments, the waterfall may compute the average daily balance based upon the aggregation of capital contributions less capital distributions+compounded preferred returns, by capital type. Some embodiments use a query to obtain the average daily balance. Such query may select from all investor investment entities for the current contract where the department code is equal to the waterfall entry point. In cases where the entry point is the default (i.e. the @ sign in the accounting module) the waterfall process will aggregate activity where the department code in the investor investment entities is equal to @, or default.

In some embodiments, preferred returns are calculated based upon daily weighted average. The average balance may be affected by business events which affect the capital balance for any given capital type. Business events may consist of contributions, and distributions of capital and compounding of preferred returns.

As stated above, in some embodiments, the preferred return for a specific capital account is determined by calculating the accrued interest from the contribution date to each distribution date using the following equation:

In some embodiments, the preferred return for a specific capital account is determined as follows:

(1) calculate accrued interest from the contribution date to each distribution date using the following equation:

preferred return=(capital contributions−distributions)× preferred return rate×(days outstanding/days in fiscal year), where:
preferred return rate may be a contract level parameter that will be entered once within the waterfall configuration,
days outstanding may be a dynamic calculation of days that are outstanding between any given business event, and
days in year is a contract level parameter, which could be, for example, 365, 360 or 260, (2) at each compound date, increment the capital balance by the amount of interest accrued to that date, and (3) repeat (1) and (2) for each distribution date and compound date, respectively, until a defined end date is reached.

In some embodiments, preferred return calculations may be impacted by future business events and/or amendments to existing contracts.

Figure 20A:
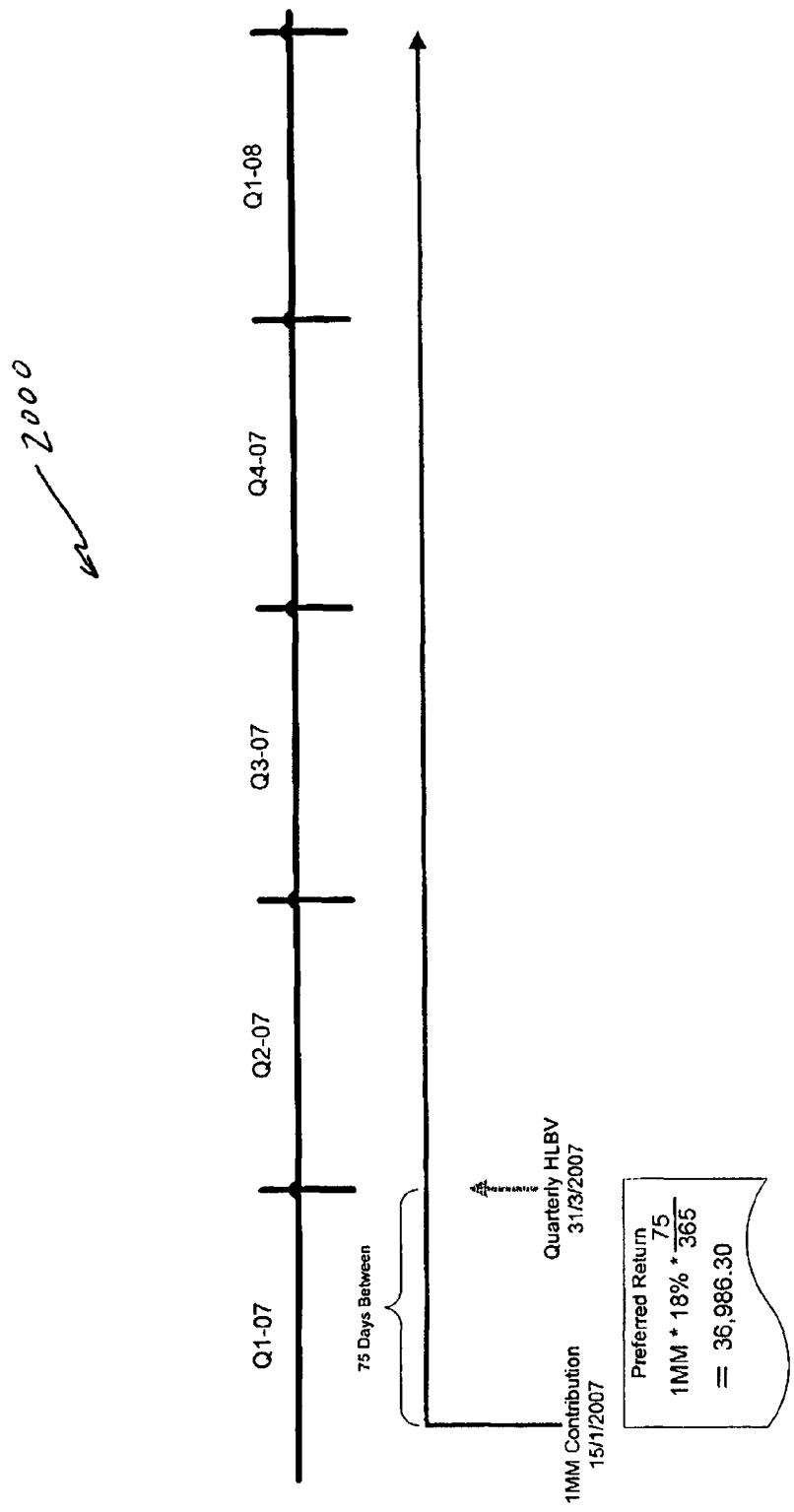
FIGS. 20A-20C are diagrammatic representations showing an example of how preferred returns may be computed for one member of a partnership, in accordance with some embodiments.
Figure 20B:
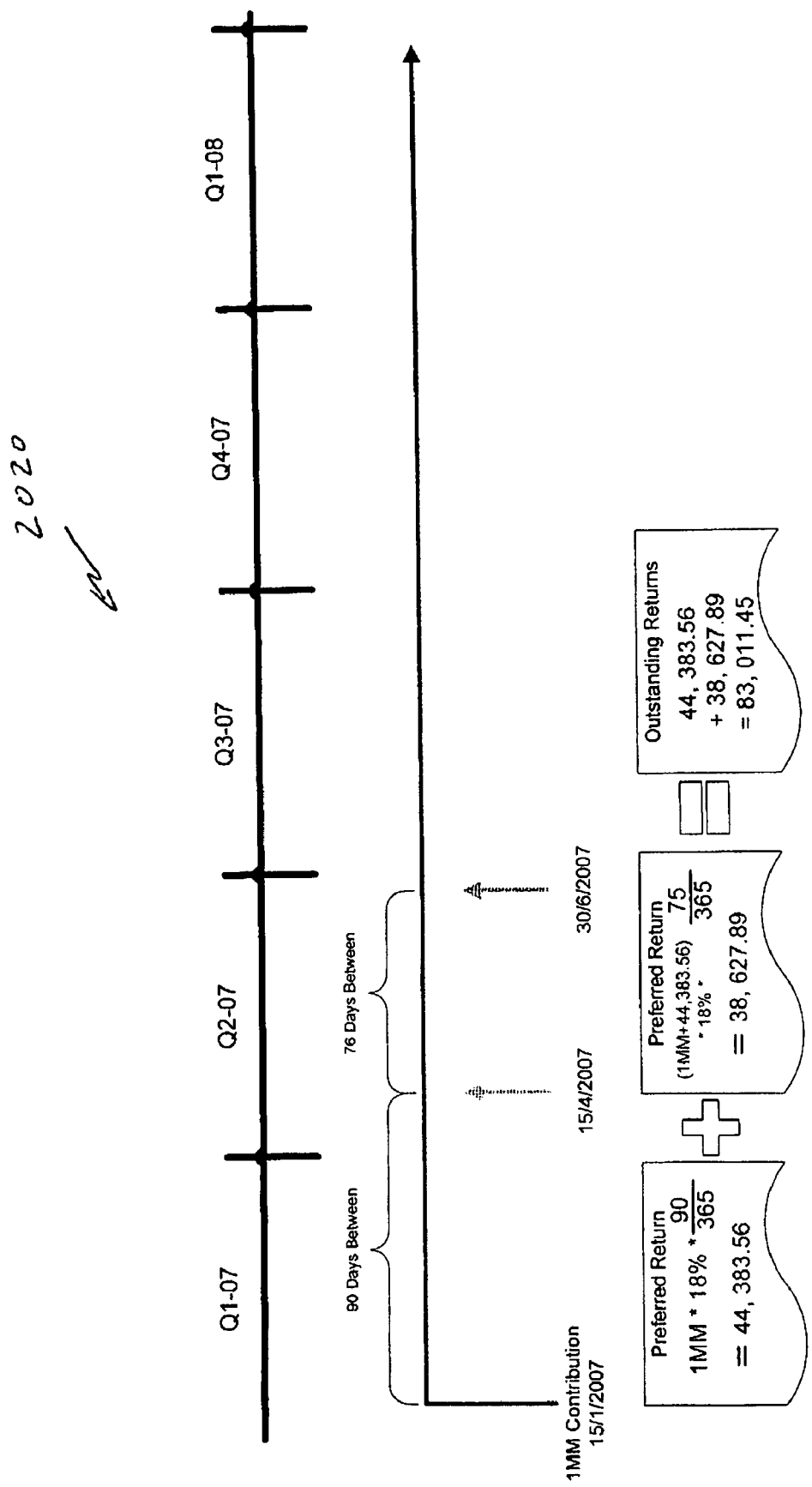
Figure 20C:
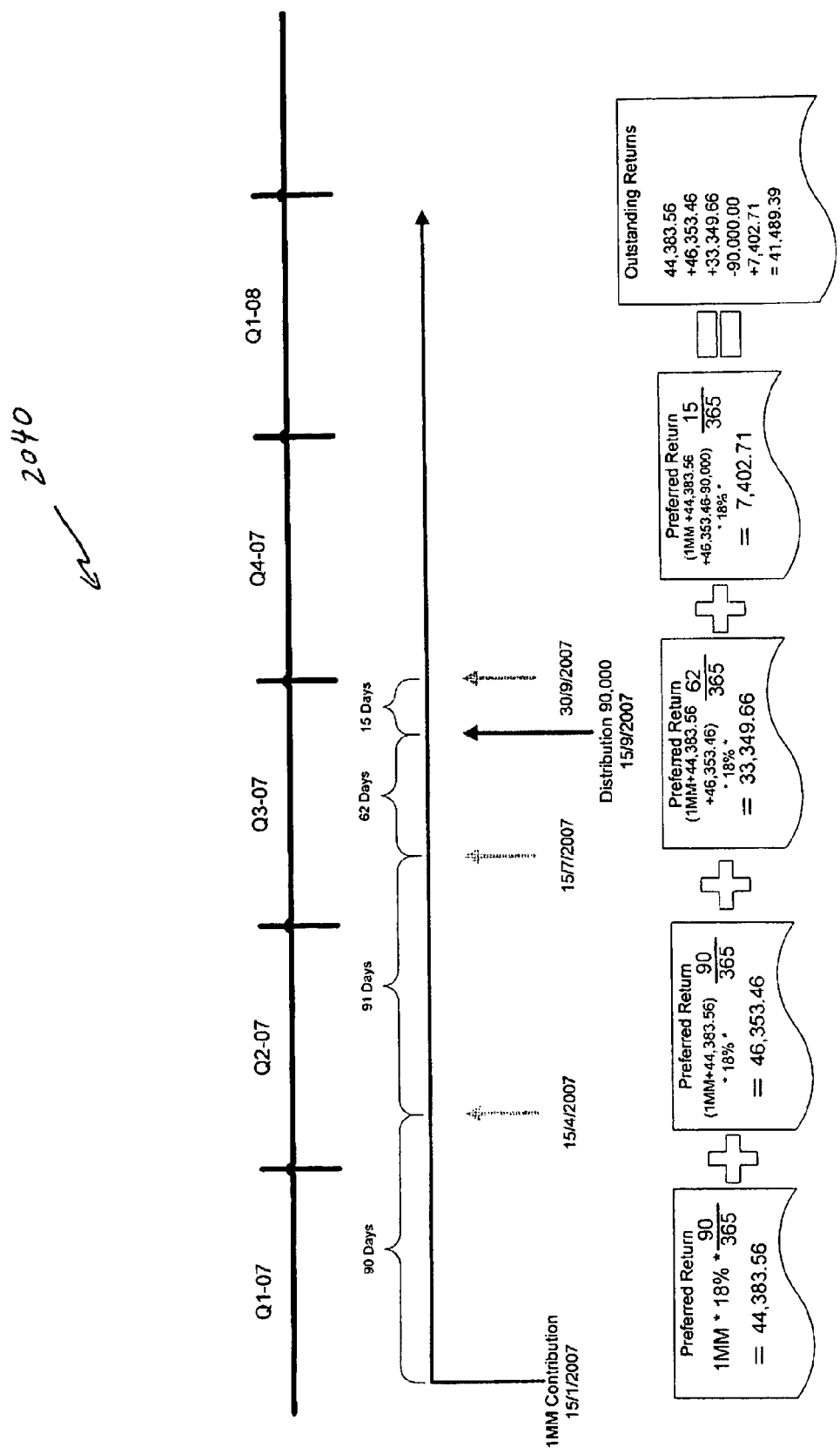

FIGS. 20A-20C are diagrammatic representations showing an example of how preferred returns may be computed for one member of a partnership, in accordance with some embodiments. Notably, in some embodiments, preferred returns may be computed for all members (of the partnership) that have contributed capital.

FIG. 20A is diagrammatic representation 2000 showing an example of how preferred returns may be computed for a member of a partnership at a first balance sheet date (e.g., the end of a first quarter). Referring to FIG. 20A, in this example, a member of a joint venture makes a capital contribution of 1 MM on Jan. 15, 2007 and the contract specifies that the return rate for such a contribution by this member is 18%. The contract also specifies that compounding will occur quarterly on the anniversary date and that the number of days in the year is 365. No other capital activity occurs between Jan. 15, 2007 and Mar. 31, 2007.

In this example, preferred returns accrue at the end of the quarter, i.e., Mar. 31, 2007. The amount of the preferred returns may be computed by a capital proceeds waterfall at the end of such quarter. The number of days outstanding is computed as 75, i.e., the total number of days between the initial contribution and the end of the quarter. There are no other business events that impact the capital balance of 1 MM and compounding is scheduled next for the Apr. 15, 2007. Thus, the outstanding preferred returns for this member is computed using the balance (1 MM), the rate (18%), the number of days outstanding (75) and the number of days in the year (365). In this example, the preferred returns at the end of the quarter is 36,986.30.

FIG. 20B is diagrammatic representation 2020 showing an example of how preferred returns may be computed for the member at a second balance sheet date (e.g., the end of a second quarter). Referring to FIG. 20B, in this example, a new business event occurs by the end of the second quarter. The new business event is a compounding of the preferred returns outstanding on Apr. 15, 2007 on the 1 MM capital contribution. Consequently, in accordance with some embodiments, two computations are made and aggregated to determine the total outstanding preferred returns for the 1 MM capital contribution.

The first computation computes the preferred returns as of Apr. 15, 2007. The number of days outstanding is computed as 90, i.e., the total number of days between the initial contribution and the business event, in this case compounding of the preferred returns. Preferred returns are computed using the unreturned capital balance (1 MM), the rate (18%), the number of days outstanding (90) and the number of days in the year (365). In this example, the compounded preferred returns as of Apr. 15, 2007 is 44,383.56.

The second computation computes the preferred returns at the end of the second quarter (the second balance sheet date), i.e., Jun. 30, 2007. A new "days outstanding" is computed as 75, this being the difference between the compounding business date and the balance sheet date, which is the period for which we are running the preferred return calculation. Note that a balance sheet date is not a physical business event, it becomes a pseudo business event in the example because it is the end date to which we want to compute preferred returns. The outstanding capital balance as of Apr. 15, 2007 is 1 MM+ compounded preferred returns, which as stated above, is 44,383.56 in this example. The preferred returns between the compounding business event and the balance sheet date is computed as (1 MM+44,383.56)*18%*75/365, equating to an accrued amount of preferred returns of 38,627.89.

The outstanding preferred returns is computed as a sum of the first computation and the second computation. In this example, the outstanding preferred returns at the end of the second quarter is 83,011.45.

FIG. 20C is diagrammatic representation 2040 showing an example of how preferred returns may be computed for the member at the end of a third balance sheet date (e.g., the end of a third quarter). Referring to FIG. 20C, in this example, a distribution from the partnership, which (via the HLBV waterfall) affects the outstanding preferred returns, occurs before the end of the third quarter. Consequently, there are effectively four specific computations of preferred returns, four business events, two compounding events from initial capital, one event of distribution of preferred returns and the balance sheet date itself. Note that the pseudo business events of each quarter prior to Sep. 30, 2007, the new balance sheet date, are not recomputed, as these are not real business events that impact capital or the preferred return calculation, at the new balance sheet date.

In this example, compounding occurs twice, i.e., on Apr. 15, 2007 and on Jul. 15, 2007, as the example assumes a compounding quarterly on the anniversary date. The calculation of the preferred returns use days outstanding of 90 and 91, respectively. A distribution at Sep. 15, 2007 effectively reduces the outstanding preferred returns by 90,000 and thus affects the outstanding capital balance. Between Sep. 15, 2007 and Sep. 30, 2007 (the balance sheet date), the distribution has affected the accrued and compounded preferred return calculation; resulting in an accrued amount of preferred returns of 7,402.71.

A first computation computes the preferred returns on Apr. 15, 2007. A second computation computes the preferred returns on Jul. 15, 2007. A third computation computes the preferred returns on Sep. 15, 2007. A fourth computation computes the preferred returns at the balance sheet date, i.e., Sep. 30, 2007. The outstanding preferred returns is computed as a sum of the first computation, the second computation, the third computation and the fourth computation, less the amount of the distribution at Sep. 15, 2007.

In some embodiments, the system includes one or more functions to calculate preferred returns. In some embodiments, one or more of such functions is employed in (e.g., used in the configuration of) one or more hurdles of one or more waterfalls. In some embodiments, one or more of the preferred returns functions may calculate a preferred return in accordance with one or more methods disclosed herein.

As stated above, in some embodiments, the system allows one or more portfolio tests to be defined for each contract. The results from the portfolio tests may be used to determine whether to run the waterfall on a project or pooled basis. In some embodiments, a pooled basis waterfall for a contract will have a different set of hurdles than a project basis waterfall for the same contract.

In some embodiments, if a pooled basis waterfall is executed, the waterfall process may retrieve operating profits/losses for the entity from the accounts which have been populated with entity financial data from the entity defined as the "entry point". Capital may be retrieved from the related investment entities. In some embodiments, the entry point will always be a partnership or sub partnership entity. If a project basis waterfall is executed, the waterfall process may retrieve operating profits/losses from all entities below and including the "entry point". This may include all the relevant properties within the partnership and may apply to both the NOI and the capital data. The capital data may be retrieved from the investment entities and utilize the department code to include only the relevant property and partnership data.

Some methods for calculating capital and NOI for both scenarios are described below.

A waterfall that uses hypothetical liquidated book value (HLBV) is sometimes referred to herein as a HLBV waterfall.

In some embodiments, an HLBV waterfall computes the total distributable capital of a partnership prior to distributing it via the waterfall. In some embodiments, the total distributable capital is defined as the sum of all contributions (of any type) less all distributions (of any type), for all investors (in aggregate) with respect one, some or all properties within a joint venture.

In some embodiments, the current year's YTD gross income number from the partnership, sub partnership and/or properties (depending on a waterfall entry point) is added to the above amount.

In some embodiments, a two step process is used to determine the total distributable capital. A first step may include determining a sum of all contributions made by all of the members and a sum of all distributions made to all of the members with respect to one, some or all properties within a joint venture. The sum of all distributions may be subtracted from the sum of contributions to determine a difference therebetween. This difference is sometimes referred to herein as total capital.

In some embodiments, it may be desirable to determine the total distributable capital for all properties in a joint venture. In such embodiments, the contributions and distributions used in determining the total capital may include the contributions made by all of the members and the distributions made to all of the members, respectively, with respect to all of the properties within a joint venture.

In some embodiments, it may be desirable to determine the total distributable capital with respect to only certain properties in a joint venture. In such embodiments, the contributions and distributions used in determining the total capital may include contributions made by all of the members and the distributions made to all of the members, respectively, with respect to only such certain properties within a joint venture.

In that regard, in some embodiments, an entity is defined as an entry point for a waterfall and the waterfall determines the total distributable capital for the entity (defined as the entry point) and any children of the entity (defined as the entry point). In such embodiments, the contributions and distributions used in determining the total capital may include contributions made by all of the members and the distributions made to all of the members, respectively, with respect to the entity (defined as the entry point) and children of the entity.

Thus, the total capital may represent the total capital for the entry point and its children. In some embodiments, an entry point is used to denote the promotion of capital for a specific sub partnership and its associated children. In some embodiments, this allows a user of the system to choose to track capital at an entry point or any project/property.

In some embodiments, this is carried out by limiting the contributions and distributions used in determining the total capital to contributions and distributions, respectively, with department codes that are the same as the waterfall entry point and any of the children of the waterfall entry point.

A second step in the process may include determining a YTD income/loss with respect to one, some or all properties within a joint venture.

As further described below, in some embodiments, the income/loss is determined with respect to all properties in a joint venture. This may be carried out by summing the income/loss of all properties in the joint venture.

In some embodiments, the income/loss is determined with respect to only certain properties in a joint venture. This may be carried out by summing the income/loss of properties. In some embodiments, for example, a waterfall determines the income/loss with respect to an entry point and any children of the entry point. This may be carried out by summing the income/loss of the entry point entity and any children of the entry point entity.

In some embodiments, total YTD income/loss is determined by summarizing all the accounts specified in the chart of accounts table, where the flag "Include in Net Income" is set to "Yes".

In some embodiments, the process will summarize all the activity in the assigned accounts for the waterfall entry point entity, and all of its children. In some embodiments, the children are included in the calculation because of the way that financial activity may be stored within the partnership entities. In that regard, in some embodiments, financial activity is booked in the partnerships systems and not initially consolidated.

In some embodiments, the YTD income/loss is added to the total capital to determine the total distributable capital. The total distributable capital may be used in the waterfall process to determine investors claims.

Figure 21:
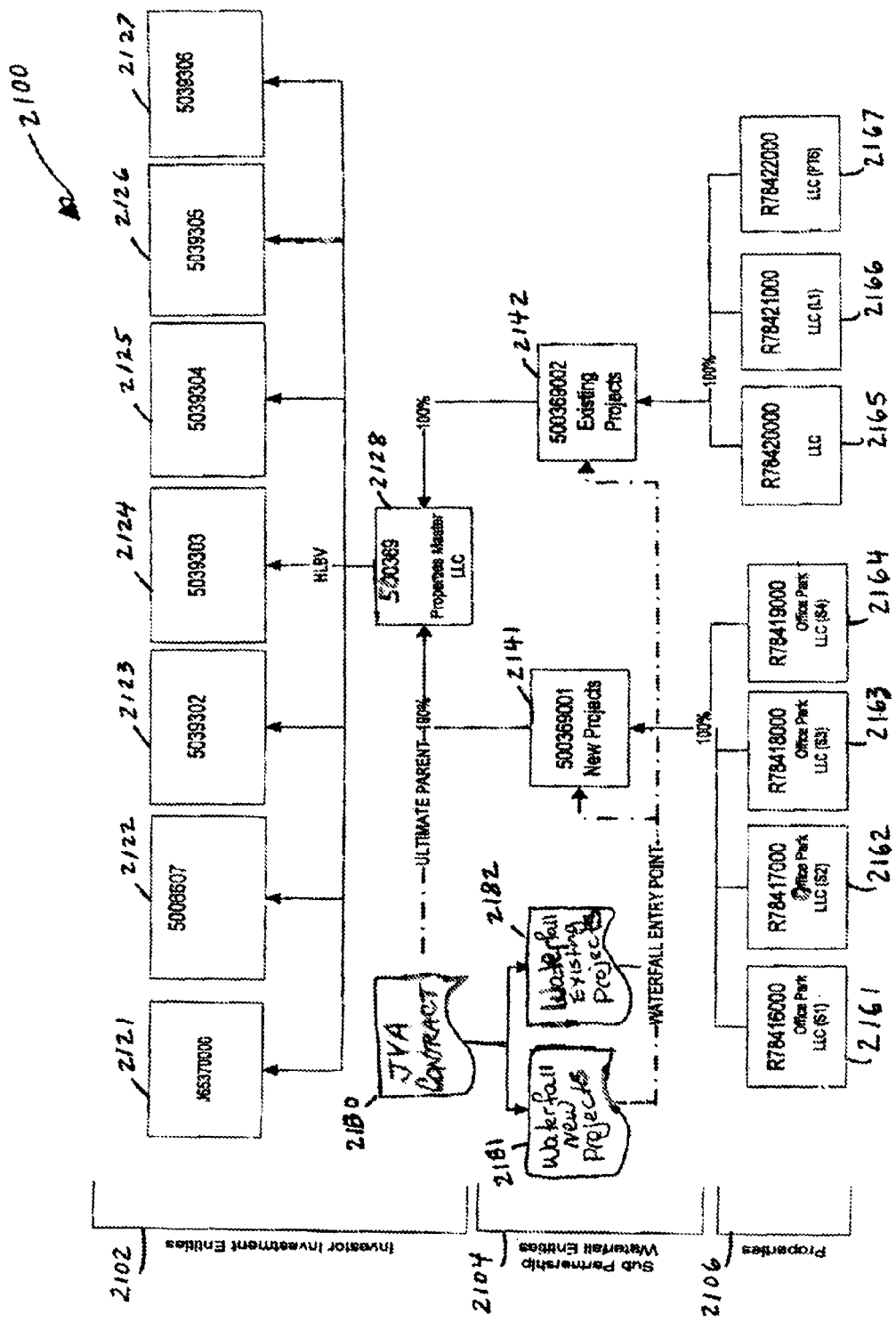
FIG. 21 is a diagrammatic representation of information associated with a joint venture, in accordance with some embodiments.

FIG. 21 is a diagrammatic representation of information associated with a joint venture, in accordance with some embodiments. In some embodiments, one some or all portions of the information may be stored in and/or used by the processing system 106 to determine a total distributable capital amount on one or more balance sheet dates.

Referring to FIG. 21, in accordance with some embodiments, the diagrammatic representation 2100 includes a first portion 2102, a second portion 2104 and a third portion 2106. The first portion 2102 defines a plurality of investor investment entities for a joint venture. The second portion 2104 defines a plurality of sub-partnership waterfall entities for the joint venture. The third portion 2106 defines a plurality of properties for the joint venture.

The investor investment entities for the joint venture may include investor investment entities 2121-2128. The sub-partnerships may include new projects sub-partnership 2141 and an existing projects sub-partnership 2142. The first sub-partnership may include a first property 2161, a second property 2162, a third property 2163 and a fourth property 2164. The second sub-partnership 2142 may include a fifth property 2165, a sixth property 2166 and a seventh property 2167. The first property 2161, the second property 2162, the third property 2163 and the fourth property 2164 are sometimes referred to herein as children of the first sub-partnership 2141. The fifth property 2165, the sixth property 2166 and the seventh property 2167 are sometimes referred to herein as children of the second sub-partnership 2142.

The joint venture may be defined by a joint venture contract, e.g., JVA contract 2180. Two waterfalls, indicated as waterfall new projects 2181 and waterfall existing projects 2182 may be associated with the new projects sub-partnership 2141 and the existing projects sub-partnership 2142, respectively.

In some embodiments, the investor investment entities are stored in and/or sourced through ownership tables in the accounting module 202 (FIG. 2) and/or chart of accounts 208 (FIG. 2), as the direct owners of the JVA Ultimate Parent.

In some embodiments, a total distributable capital amount is determined with respect to all the properties within the joint venture. In that regard, in some embodiments, an entry point for a waterfall is the partnership and the total distributable capital is determined with respect to all of the properties in the joint venture.

The contributions and distributions used in determining the total capital may include the contributions made by all of the members 2121-2127 and distributions made to all of the members 2121-2127, respectively, with respect to all of the properties within the joint venture. Thus, in some embodiments, all investor investment entities are taken into account, in the determination. In some embodiments, the investor investment entities are sourced through the ownership tables in the accounting module and/or chart of accounts, as the direct owners of the JVA Ultimate Parent. The income/loss may be determined by summing the income/loss of all properties in the joint venture.

In some embodiments, a total distributable capital amount is determined with respect to less than all properties within the joint venture. In that regard, in some embodiments, one sub-partnership is defined as an entry point and a total distributable capital amount is determined with respect to that sub partnership and children of that sub-partnership (without the other sub-partnership and the children of the other sub-partnership). If the new projects sub-partnership 2141 is the entry point, a total distributable capital amount may be determined with respect to the new projects sub-partnership 2141 and children of the new projects sub-partnership 2141, e.g., the first property 2161, the second property 2162, the third property 2163 and the fourth property 2164. Thus, the contributions and distributions used in determining the total capital may include contributions made by all of the members 2121-2127 and the distributions made to all of the members 2121-2127, respectively, with respect to the new projects sub-partnership 2141 and children of the new projects sub-partnership 2141, e.g., the first property 2161, the second property 2162, the third property 2163 and the fourth property 2164. Thus, in some embodiments, all investor investment entities are taken into account, in the determination. In some embodiments, the investor investment entities are sourced through the ownership tables in the accounting module and/or chart of accounts, as the direct owners of the JVA Ultimate Parent. The income/loss may be determined by summing the income/loss of the new projects sub-partnership 2141 and children of the new projects sub-partnership 2141, e.g., the first property 2161, the second property 2162, the third property 2163 and the fourth property 2164.

If the existing projects sub-partnership 2142 is the entry point, a total distributable capital amount may be determined with respect to the existing projects sub-partnership 2142 and children of the existing projects sub-partnership 2142, e.g., the fifth property 2165, the sixth property 2166 and the seventh property 2167.

In some embodiments, total distributable capital amount is determined with respect to one or more individual properties. For example, a first total distributable capital amount may be determined with respect to the first property 2161. A second distributable capital amount may be determined with respect to the second property 2162. And so on.

In some embodiments, it is possible that no activity is being booked in the children of the new projects entity, in cases where the business is tracking capital and at the higher level. In some embodiments, however, the computation will always look to summarize any children's activity within the ranges defined by the distribution configuration table.

Some embodiments provide functionality to allow the business to share different types of activity, such as total income, depreciation, and FAS141. In some embodiments, the distributions configuration table provides the functionality to allow the business to share different types of activity, such as total income, depreciation, and FAS141. In some embodiments, these are specified for each waterfall using flags on the distribution configuration table.

In some embodiments, a waterfall determines the investor's claims percentage and applies that percentage against the summarized income/expense sharing ranges that have been defined in the distributions configuration table.

In some embodiments, the waterfall entry point is important in this computation, as the waterfall process may compute each type of income/expense share, and summarize this amount taking any activity from the waterfall entry point and all of its children.

In some embodiments, one or more portions of the above description for total distributable capital may be used in a waterfall that does not use HLBV.

In some embodiments, if portfolio tests are setup for the contract, all required portfolio tests must pass for the waterfall to run on a project basis. If a required portfolio test fails, the waterfall engine may stop further tests, log the reason in the audit log table, and proceed with the pooled basis waterfall. In some embodiments, users have the ability to override the portfolio test definition on the contract (when they exist) and simply choose to run the waterfall on a project or pooled basis.

In some embodiments, two portfolio tests are provided: remaining project and member value. In some embodiments, the remaining project test requires that that there is at least n number of projects (properties) left within the joint venture to have calculated distributions on a project basis. In accordance with some embodiments, the member value test requires that all members of the joint venture must have a specific value or interest within the investment at the time of proposed distribution of proceeds. As an example, each member's interest in the joint venture must be greater than 115% of the sum of their unreturned capital contributions.

In some embodiments, portfolio testing may be provided as an option for all JV/Waterfall configurations as not all contracts require portfolio tests. In some embodiments, if a contract doesn't have portfolio tests, users can only setup pooled basis waterfall for the contract and thus the pooled basis waterfall will always be run.

In some embodiments, one or more of the portfolio tests may be defined in the system in a manner that is similar to how hurdles may be defined at the JVA contract level.

In some embodiments, one or more other portfolio test calculation may be defined in addition to and/or in lieu of one or more of the portfolio tests described above.

In some embodiments, there are two types of sharing ratios utilized to calculate each partner's share; (1) capital sharing ratios and (2) residual sharing ratios. In some embodiments, capital sharing ratios are the percentage which the partner participates as prescribed per the agreement for a joint venture, e.g. their investment in the joint venture as a percentage of the total capital value of the JV. In some embodiments, when the initial capital contributions are made, they are based upon the capital sharing ratios:

capital sharing ratio=member initial capital contribution/total initial contributions of all members In some embodiments, residual sharing ratios are used to distribute available net cash and capital to members.

In some embodiments, data is collected from the partners via three methods, electronic spreadsheet upload of full trial balance, file submission/upload or interface and/or manually entered by joint venture accountants. In some embodiments, the methods of collection are provided based upon the capabilities of each joint venture partner. In some cases a partner may have an internal system which provides its own full trial balance, which is uploaded via file and mapped. Other partners may be provided with the integration tools of the system, where the financial statements are manually entered and, via standard processes, integrated into the system. In some embodiments, this latter approach may be the same approach used by joint venture accountants.

In some embodiments, the collection process includes a number of submissions of financial statements, initially taking the prepared financial statements from the partner pre-waterfall. The output of the waterfall, e.g. the "investor's claims" at each hurdle is then provided during the process. The partner then agrees and applies these entries to their books and resubmits a final financial statement. On final submission, the waterfall process may not be executed, instead the financials may be provided to the appropriate groups, electronically for approval.

In some embodiments, it is possible for an entire waterfall calculation or an individual hurdle calculation to be impacted by the results or performance of other joint ventures. In this regard, in some embodiments, it is desirable that financial statements for all joint ventures are stored and collected on a standardized basis (re: standard chart of accounts design), allowing the waterfall module, where hurdles are defined, to look outside the existing joint venture structure and waterfall calculation, to select, use and compute other information from other joint ventures as part of the hurdles computation.

In some embodiments, for each partner or venture, validation of the collected information by property or venture includes required or complete submission of all financial statements from partners, prior to allowing the waterfalls to be run against such data received. The validation would not allow the acceptance of the financial information unless all information had been received from the partners, using the waterfall configuration and interdependencies as the basis for this validation. Once all financial statements had been validated and received for interdependent ventures, the waterfall application could then be run and compute the investor's claims.

In some embodiments, a balance sheet date is the date at which the financial statements submitted from the partners are accounted for. In some embodiments, it is desirable to request that members submit the financial statements within 45 days following the quarter close. In some embodiments, all the waterfall transactions are performed on a quarter lag, Thus, the recording of the investor's claim movement, within the Finance System, refers to the prior quarter's activity within the partnership, which in some embodiments, is effectively the last day of the quarter that the financial statements are being submitted.

Some embodiments may include approval, booking of output of waterfall in joint venture financials and the ultimate receipt of the final financial statements. In some embodiments, it is desirable to then close periods of the system and to open a subsequent period after such approval, booking of output of waterfall in joint venture financials and the ultimate receipt of the final financial statements. In some embodiments, this may effectively lock the prior period's financial information and readies the system to receive the financial statements in the following period.

In some embodiments, financial statements are provided on an YTD basis, hence prior to posting them into the system. The incremental movement over last periods balance may be computed, created as a journal entry and posted.

In some embodiments, it is desirable that the posting, roll forward and opening period process is automated, across all joint ventures, so as to eliminate manual processes.

In some embodiments, calendars are defined to provide input into the waterfall calculations, re: outstanding day's calculations. In some embodiments, calendars are used to notify the partners that a partner has not submitted their financial statements, e.g. used also for tracking of partner financials submissions.

In some embodiments, one, some, or all of the following functions are pre-defined within the system and employed in (e.g., used in the configuration of) one or more hurdles:

| GENERIC COMPONENTS | |
| --- | --- |
| Code | Description |
| G100 | G100 Preferred Returns - Default Capital Contribution |
| G101 | G101 Default Capital Contribution |
| G102 | G102 Preferred Returns - Excess Contributions |
| G103 | G103 Excess Contributions |
| G104 | G104 Preferred Returns - Additional Capital Contributions |
| G105 | G105 Additional Capital Contributions |
| G106 | G106 Preferred Returns - Initial Capital Contributions |
| G107 | G107 Initial Capital Contributions |
| G108 | G108 Capital Sharing Ratios |
| G109 | G109 IRR Threshold |
| G110 | G110 Residual Sharing ratios |

| GENERIC COMPONENTS | |
| --- | --- |
| Code | Description |
| G111 | G111 Priority Preferred Returns - Additional Capital Contribution |
| G112 | G112 Priority - Additional Capital Contribution |

| CUSTOM COMPONENTS | |
| --- | --- |
| Code | Description |
| C500 | C500 Accrued & unpaid condominium conversion fees |
| C501 | C501 Applied to GECC Member without limit. |
| C502 | C502 Subordinated Profit due and owing. |
| C503 | C503 Preferred Loan Guaranty Capital Contribution |
| C504 | C504 NonPreferred Loan Guaranty Capital Contribution |
| C505 | C505 Deferred Fees |
| C506 | C506 Project A and Project B Loss Accounts |
| C507 | C507 Preferred Return-Deferred Equity |
| C508 | C508 Preferred Return-Cost Overrun Contribution |
| C509 | C509 Cost Overrun Contribution |
| C510 | C510 Deferred Equity |
| C511 | C511 Capital Proceeds |
| C512 | C512 Special Contributions |
| C513 | C513 Incentive Fee |
| C514 | C514 Amount distributed to the original investor. |
| C515 | C515 Preferred Deferred Developer Fee |
| C516 | C516 Deferred Developer Fee |
| C517 | C517 Cost Savings |
| C518 | C518 50% Each Member |
| C519 | C519 Preferred Return-Developer Priority Amount |
| C520 | C520 Developer Priority Amount |
| C521 | C521 Adjusted Residual Sharing Ratios |
| C522 | C522 Net Cash Flow Sharing Ratios |
| C523 | C523 Remaining Contributions |
| C524 | C524 Remaining Contributions - Using Residual Cash Flow Sharing Ratios |
| C525 | C525 Preferred Returns Default Contributions |
| C526 | C526 Preferred Returns on Additional Contributions |
| C527 | C527 Unreturned Capital Contributions |
| C528 | C528 Preferred Return Account(s) |
| C529 | C529 Project Capital Contribution Account |
| C530 | C530 Pool Credited Project Preferred Return Account |
| C531 | C531 Non Pool Credited Project Preferred Return Account |
| C532 | C532 Unreturned Funds Preferred Return Accounts |
| C533 | C533 Cash Contribution Balance |
| C534 | C534 Pledged Contribution Balance |
| C535 | C535 Unsecured Contribution Balance |
| C536 | C536 Master Purchase Agreement |
| C537 | C537 Preferred Return Super Equity Capital Contribution |
| C538 | C538 Tax Payment Advances |
| C539 | C539 Accrued and Unpaid Principal Reduction Payments |
| C540 | C540 Super Equity Capital Contribution |
| C541 | C541 Unpaid Environmental Payments |
| C542 | C542 Preferred Returns Upgrade Capital Contribution |
| C543 | C543 Upgrade Capital Contribution |
| C544 | C544 Preferred Returns Special Capital Contribution |
| C545 | C545 Preferred Returns Discretionary Capital Contributions |
| C546 | C546 Discretionary Capital Contributions |
| C547 | C547 GECC 2nd Mortgage |
| C548 | C548 GECC 1st Mortgage |
| C549 | C549 Project C Sale or Refinance |
| C550 | C550 Preferred Shortfall Capital Contribution |
| C551 | C551 Shortfall Capital Contribution |
| C552 | C552 Class A Capital Contribution |
| C553 | C553 Preferred Return Abandoned Target Capital Contribution |
| C554 | C554 Abandoned Target Capital Contribution |
| C555 | C555 Preferred Return Class A Capital Contribution |
| C556 | C556 $90,783 Class A Exit Fee |
| C557 | C557 10% Preferred Return on Capital Contribution Balance |
| C558 | C558 2% Preferred Return on Capital Contribution Balance |
| C559 | C559 Class A Fee |
| C560 | C560 Default Loans |
| C561 | C561 Sales Fees |
| C562 | C562 Asset Management Fee Accounts |

CUSTOM COMPONENTS

| Code | Description |
|---|---|
| C563 | C563 Aggregate Accounts |
| C564 | C564 Disposition Management Fee Account |
| C565 | C565 Promote True Up Account |
| C566 | C566 Guaranteed Payment Return Account |
| C567 | C567 Make Whole Calculation |
| C568 | C568 90/10 Preferred Return Additional Capital Contribution |
| C569 | C569 90/10 Additional Capital Contribution |
| C570 | C570 50/50 Preferred Return Additional Capital Contribution |
| C571 | C571 50/50 Additional Capital Contribution |
| C572 | C572 Preferred Return Deferred Payment Account |
| C573 | C573 Contribution Fee |
| C574 | C574 11% Gross Return Account |
| C575 | C575 11.25% Gross Return Account |
| C576 | C576 Refunded Pursuit Costs |
| C577 | C577 Preferred Return Abandoned Project Account |
| C578 | C578 Abandoned Project Account |
| C579 | C579 Contribution Protection Amount |
| C580 | C580 Incentive Distribution Amount |
| C581 | C581 Preferred Return Unreturned Liquidated Contribution |
| C582 | C582 Unreturned Liquidated Contribution |
| C583 | C583 Preferred Return Refunded Pursuit Costs |
| C584 | C584 Class A Redemption Premium |
| C585 | C585 Preferred Return Class A Capital Contribution |
| C586 | C586 Preferred Return Indemnity Reimbursement |
| C587 | C587 Indemnity Reimbursement |

| DB Code | Distribution Base |
|---|---|
| DB01 | DB01 All Members |
| DB02 | DB02 GECC Member |
| DB03 | DB03 Developer Member(s) |
| DB04 | DB04 Manager Member |
| DB05 | DB05 Developer Limited Partner |
| DB06 | DB06 Developer Partner(s) |
| DB07 | DB07 GECC Limited Partner |
| DB08 | DB08 Developer General&Limited Partners |
| DB09 | DB09 All Partners |
| DB10 | DB10 Limited Partner(s) |
| DB11 | DB11 Investor Partner |
| DB12 | DB12 General Partner |
| DB13 | DB13 Limited Members |
| DB14 | DB14 Cash Flow Reserve Account |
| DB15 | DB15 Contribution Protection Trust Account |

| MB Code | Measurement Base |
|---|---|
| MB01 | MB01 Until Account equals 0 |
| MB02 | MB02 Capital Sharing Ratio Until Balance = 0 |
| MB03 | MB03 90% |
| MB04 | MB04 10% |
| MB05 | MB05 In Proportion To Member Account Balance until it = 0 |
| MB06 | MB06 Lesser of Cost Savings from Project D or $300,000 |
| MB07 | MB07 Lesser of Cost Savings from Project E or $175,000 |
| MB08 | MB08 60% |
| MB09 | MB09 40% |
| MB10 | MB10 Lesser of Cost Savings or $250,000 |
| MB11 | MB11 Reduced to $950,000.00 |
| MB12 | MB12 50% |
| MB13 | MB13 65% |
| MB14 | MB14 35% |
| MB15 | MB15 Amount that would be distributed to Outside Investors |
| MB16 | MB16 Capital Contribution Ratios |
| MB17 | MB17 (Level 9 aggregate distribution/.878) * .122 |
| MB18 | MB18 (Level 10 aggregate distribution/.8) * .20 |
| MB19 | MB19 80% |
| MB20 | MB20 20% |
| MB21 | MB21 75% |
| MB22 | MB22 25% |
| MB23 | MB23 Maximum Residual Cash Flow |
| MB24 | MB24 Maximum Residual Capital Proceeds |
| MB25 | MB25 Residual Sharing Ratios |
| MB26 | MB26 0.5% |
| MB27 | MB27 19.5% |
| MB28 | MB28 24.5% |
| MB29 | MB29 Fixed %'s See Performance Conditions for Distribution |
| MB30 | MB30 Capital Sharing Ratios |
| MB31 | MB31 70% |
| MB32 | MB32 30% |
| MB33 | MB33 Limited Partnership Agreement |
| MB34 | MB34 In Proportion to Tax Liability Deficiency Amounts |
| MB35 | MB35 55% |
| MB36 | MB36 45% |
| MB37 | MB37 Intermidiate Sharing Ratios |
| MB38 | MB38 $138,000.00 |
| MB39 | MB39 Ratio of Shortfall Cap Contr and 2nd Mortg Shortfall |
| MB40 | MB40 $7,000,000.00 |

| OC Code | Other Criteria |
|---|---|
| OC01 | OC01 Must Satisfy Portfolio Test |
| OC02 | OC02 Portfolio Test Not Satisfied |
| OC03 | OC03 Until IRR Threshold of 17% is achieved |
| OC04 | OC04 Until IRR Threshold of 20% is achieved |
| OC05 | OC05 Completion Date has occurred |
| OC06 | OC06 Completion Date has not occurred |
| OC07 | OC07 Until IRR Threshold of 18% is achieved |
| OC08 | OC08 Until IRR Threshold of 16% is achieved |
| OC09 | OC09 Until IRR Threshold of 15% is achieved |
| OC10 | OC10 Until IRR Interim Threshold of 10% is Achieved |
| OC11 | OC11 Until IRR Residual Threshold of 25% is Achieved |
| OC12 | OC12 Until Developer Member Initial Capital Contrib = 200,000 |
| OC13 | OC13 Before Subordination Termination Date |
| OC14 | OC14 After Subordination Termination Date |
| OC15 | OC15 Until GECC IRR = 12% |
| OC16 | OC16 Until IRR = 15% |
| OC17 | OC17 Developer Member still manager |
| OC18 | OC18 Developer Member no longer manager |
| OC19 | OC19 Developer Partners Initial Capital Contribution = 0.00 |
| OC20 | OC20 Developer Partners Initial Capital Contribution > 0.00 |
| OC21 | OC21 All Pooled Projects w/ NOI (Total Capitalization) >= 9% |
| OC22 | OC22 At least 1 Pooled Project w/ NOI (Total Capitalization) < 9% |
| OC23 | OC23 Project F Presale Requirement not satisfied |
| OC24 | OC24 Project F Requirement satisfied |
| OC25 | OC25 Until GECC IRR = 14% |
| OC26 | OC26 Until GECC IRR = 16% |
| OC27 | OC27 50% of Remaining GR Condominium Proceeds |
| OC28 | OC28 50% of Remaining Marsh Condominium Proceeds |
| OC29 | OC29 Distributable Operating Cash Flow |
| OC30 | OC30 Up to Initial $500,000.00 due Developer Members |
| OC31 | OC31 In Excess of $500,000.00 |
| OC32 | OC32 Only If GECC IRR Threshold of 17% is achieved |
| OC33 | OC33 Until IRR = 17% or 6,000,000(includs Pref.Initial Contrib paymnts) |
| OC34 | OC34 Until GECC IRR = 15% |
| OC35 | OC35 Until GECC IRR = 17.5% |
| OC36 | OC36 Until GECC IRR = 20.0% |
| OC37 | OC37 Removal Event or Default Add Capital Contribution Event has occurred |
| OC38 | OC38 Until IRR Threshold of 13% is achieved |
| OC39 | OC39 NOI >=$1,630,000.00 (NOI Threshold) |
| OC40 | OC40 NOI <$1,630,000.00 (NOI Threshold) |
| OC41 | OC41 Until GECC IRR = 8.5% |
| OC42 | OC42 Cash Return < 11.0% of Initial Capital Contribution |
| OC43 | OC43 Until Matching IRR Threshold is achieved (need to calculate) |
| OC44 | OC44 Until GECC IRR = 13% |
| OC45 | OC45 Distribute Project G Only |
| OC46 | OC46 Other Projects Excluding Project G |

-continued

| OC Code | Other Criteria |
|---|---|
| OC47 | OC47 Excludes Project H |
| OC48 | OC48 First $3,000,000 |
| OC49 | OC49 Next $10,000,000 |
| OC50 | OC50 Until IRR Threshold of 22% is achieved |
| OC51 | OC51 Partnership has fewer than 4 projects |
| OC52 | OC52 Until GECC IRR = 9% |
| OC53 | OC53 Project I Tax Event = Yes |
| OC54 | OC54 Until GECC IRR = 10% |
| OC55 | OC55 Until All GECC Contributions plus $1,260,000 have been received |
| OC56 | OC56 Until All GECC Contributions have been received |
| OC57 | OC57 Until IRR Threshold of 19% is achieved |
| OC58 | OC58 Until IRR = Deferred Fee IRR |
| OC59 | OC59 Until GECC IRR = 13.5% |
| OC60 | OC60 77.78% |
| OC61 | OC61 22.22% |
| OC62 | OC62 IRR >= 9% for 3 Consecutive Months |
| OC63 | OC63 Until GECC IRR = 18% |
| OC64 | OC64 Until IRR Threshold of 17.5% is achieved |
| OC65 | OC65 75% of remaining Net Cash |
| OC66 | OC66 25% of remaining Net Cash |
| OC67 | OC67 Class B Capital Accounts reduced to 0 |
| OC68 | OC68 Contribution Protection Shortfall |
| OC69 | OC69 Until GECC IRR = 25% |

As used herein, "database" may refer to one or more related or unrelated databases. Data may be "stored" in raw, excerpted, summarized and/or analyzed form.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

While various embodiments have been described, such description should not be interpreted in a limiting sense. It is to be understood that modifications of such embodiments, as well as additional embodiments, may be utilized without departing from the spirit and scope of the invention, as recited in the claims appended hereto.

What is claimed is:

1. A method comprising:
receiving information associated with a joint venture, the information including an agreement that includes terms that specify how to distribute, to members of the joint venture, a distributable portion of total capital within the joint venture;
determining an amount of a distribution based at least in part on the agreement;
determining financial information for the joint venture based at least in part on the amount of the distribution;
storing the financial information in a database;
retrieving the financial information from the database using a processing system;
providing a graphical user interface to allow a user to define a hurdle set, the hurdle set being a plurality of process steps of a process to determine a distributable portion of total capital within the joint venture and the graphical user interface including a first graphical editing tool that allows the user to specify a first calculation to be included in the hurdle set by allowing the user to select the first calculation from a list of calculations of a first type;
defining a hurdle set in response to input to the graphical user interface;
determining, in the processing system, an amount of a distribution based at least in part on the financial information and the hurdle set, the determining comprising:
determining whether one or more pool tests are to be applied to the joint venture;
computing pool test amounts, including at least properties, capital contributions, and balances, for each of the one or more pool tests;
determining an overall test score for the joint venture based on the one or more pool tests applied to the joint venture;
selecting, from one or more hurdle sets including the hurdle set defined by the user, a hurdle set to use in a calculation of the distribution amount based on the overall test score for the joint venture;
calculating the distribution amount for each hurdle in the selected hurdle set for each member of the joint venture; and
providing an output of the distribution amount for each hurdle in the selected hurdle set for each member of the joint venture.

2. The method of claim 1 wherein the determining an amount of a distribution based at least in part on the information comprises:
determining an amount of a distribution based at least in part on the agreement indicative of financial performance of the joint venture for the accounting period.

3. The method of claim 1 wherein determining financial information for the joint venture based at least in part on the amount of the distribution comprises:
determining an amount of a capital contribution to the joint venture based at least in part on the amount of the distribution.

4. The method of claim 1 wherein storing the financial information in a database comprises:
storing a posting for a ledger in the database.

5. The method of claim 4 wherein storing a posting for a ledger comprises:
storing a posting for a general ledger.

6. An apparatus comprising:
a processing system to receive information associated with a joint venture, the information including an agreement that includes terms that specify how to distribute, to members of the joint venture, a distributable portion of total capital within the joint venture, determine an amount of a distribution based at least in part on the agreement, determine financial information for the joint venture based at least in part on the amount of the distribution, store the financial information in a database, retrieve the financial information from the database, provide a graphical user interface to allow a user to define a hurdle set, the hurdle set being a plurality of process steps of a process to determine a distributable portion of total capital within the joint venture and the graphical user interface including a first graphical editing tool that allows the user to specify a first calculation to be included in the hurdle set by allowing the user to select the first calculation from a list of calculations of a first type, defining the hurdle set in response to input to the graphical user interface; and determine an amount of a distribution based at least in part on the financial information and the hurdle set, wherein to determine the amount of the distribution comprises using a processor for:
  determining whether one or more pool tests are to be applied to the joint venture;
  computing pool test amounts, including at least properties, capital contributions, and balances, for each of the one or more pool tests;
  determining an overall test score for the joint venture based on the one or more pool tests applied to the joint venture;
  selecting, from one or more hurdle sets including the hurdle set defined by the user, a hurdle set to use in a calculation of the distribution amount based on the overall test score for the joint venture
  calculating the distribution amount for each hurdle in the selected hurdle set for each member of the joint venture; and
  providing an output of the distribution amount for each hurdle in the selected hurdle set for each member of the joint venture.

7. The apparatus of claim 6 wherein the processing system comprises:
  a processing system to determine an amount of a distribution based at least in part on the agreement indicative of financial performance of the joint venture for the accounting period.

8. The apparatus of claim 6 wherein the processing system comprises:
  a processing system to receive information associated with a joint venture and determine an amount of interest based at least in part on a capital contribution to the joint venture.

9. The apparatus of claim 6 wherein the processing system comprises:
  a processing system to receive information associated with a joint venture, determine an amount of a distribution based at least in part on the information and determine an amount of a capital contribution to the joint venture based at least in part on the amount of the distribution.

10. The apparatus of claim 6 wherein the processing system comprises:
  a processing system to receive information associated with a joint venture, determine an amount of a distribution based at least in part on the information, determine financial information for the joint venture based at least in part on the amount of the distribution and store a posting for a ledger in the database.

11. The apparatus of claim 10 wherein the processing system comprises:
  a processing system to receive information associated with a joint venture, determine an amount of a distribution based at least in part on the information, determine financial information for the joint venture based at least in part on the amount of the distribution and store a posting for a general ledger.

12. A computer program product comprising:
  a storage medium having stored thereon instructions that if executed by a machine, result in the following:
  receiving information associated with a joint venture, the information including an agreement that includes terms that specify how to distribute, to members of the joint venture, a distributable portion of total capital within the joint venture;
  determining an amount of a distribution based at least in part on the agreement;
  determining financial information for the joint venture based at least in part on the amount of the distribution;
  storing the financial information in a database;
  retrieving the financial information from the database using a processing system;
  providing a graphical user interface to allow a user to define a hurdle set, the hurdle set being a plurality of process steps of a process to determine a distributable portion of total capital within the joint venture and the graphical user interface including a first graphical editing tool that allows the user to specify a first calculation to be included in the hurdle set by allowing the user to select the first calculation from a list of calculations of a first type;
  defining the hurdle set in response to input to the graphical user interface;
  determining, in the processing system, an amount of a distribution based at least in part on the financial information and the hurdle set, the determining comprising:
  determining whether one or more pool tests are to be applied to the joint venture;
  computing pool test amounts, including at least properties, capital contributions, and balances, for each of the one or more pool tests;
  determining an overall test score for the joint venture based on the one or more pool tests applied to the joint venture;
  selecting, from one or more hurdle sets including the hurdle set defined by the user, a hurdle set to use in a calculation of the distribution amount based on the overall test score for the joint venture
  calculating the distribution amount for each hurdle in the selected hurdle set for each member of the joint venture; and
  providing an output of the distribution amount for each hurdle in the selected hurdle set for each member of the joint venture.

13. The computer program product of claim 12 wherein the determining an amount of a distribution based at least in part on the information comprises:
  determining an amount of a distribution based at least in part on the agreement indicative of financial performance of the joint venture for the accounting period.

14. The computer program product of claim 12 wherein determining an amount of a distribution based at least in part on the information comprises:
  determining an amount of interest based at least in part on a capital contribution to the joint venture.

15. The computer program product of claim 12 wherein determining financial information for the joint venture based at least in part on the amount of the distribution comprises:
  determining an amount of a capital contribution to the joint venture based at least in part on the amount of the distribution.

16. The computer program product of claim 12 wherein storing the financial information in a database comprises:
  storing a posting for a ledger in the database.

17. The method of claim 1 wherein receiving information associated with a joint venture comprises:
  receiving at least a portion of the information associated with the joint venture from the database.

18. The method of claim 1 wherein receiving information associated with a joint venture comprises:
  retrieving the information associated with the joint venture from the database using the processing system.

19. The method of claim 1 wherein the information associated with the joint venture comprises information indicative of an amount of a capital contribution made by each member of the joint venture and a rate of return for each member of the joint venture.

20. The method of claim 1 wherein receiving information associated with a joint venture comprises:

receiving, in the processing system, a posting for a ledger.

21. The method of claim 1 wherein the graphical user interface includes a second graphical editing tool that allows the user to specify an order of claim priority for the first calculation by allowing the user to select the order of claim priority from a list of various types of order of claim priority.

22. The method of claim 1 wherein the graphical user interface includes a second graphical editing tool that allows the user to specify a second calculation that is of a second type and included in the hurdle set.

23. The method of claim 1 wherein the graphical user interface includes a first sequence number that is associated with the first calculation and indicates a position of the first calculation with a sequence of calculations for the hurdle set.

24. The method of claim 23 wherein the graphical user interface includes dialogue box within which the user may type the first sequence number.

* * * * *